(12) United States Patent
Sitnikov et al.

(10) Patent No.: US 12,292,317 B2
(45) Date of Patent: May 6, 2025

(54) ULTRASONIC FLOW METER ASSEMBLY

(71) Applicant: Mueller International, LLC, Atlanta, GA (US)

(72) Inventors: Timofey Sitnikov, Harrison, TN (US); Jeremy Alan McCraven, Kannapolis, NC (US); Chris Gyeong Suk Kang, Marietta, GA (US); Wendell Presslar Bowie, II, Mooresville, NC (US); Paul A. Burrell, Mount Ulla, NC (US); Paul S. Gifford, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 513 days.

(21) Appl. No.: 17/683,111

(22) Filed: Feb. 28, 2022

(65) Prior Publication Data
US 2023/0273056 A1  Aug. 31, 2023

(51) Int. Cl.
 *G01F 1/66* (2022.01)
 *G01F 1/661* (2022.01)
 *G01F 1/667* (2022.01)

(52) U.S. Cl.
 CPC .............. *G01F 1/662* (2013.01); *G01F 1/661* (2013.01); *G01F 1/667* (2013.01)

(58) Field of Classification Search
 CPC .......... G01F 1/662; G01F 1/661; G01F 1/667; G01F 15/003; G01F 15/005;
 (Continued)

(56) References Cited

U.S. PATENT DOCUMENTS

| 691,904 A | 1/1902 | Hallbergh |
|---|---|---|
| 1,165,429 A | 12/1915 | Mass |

(Continued)

FOREIGN PATENT DOCUMENTS

| CA | 2476119 | 2/2005 |
|---|---|---|
| CA | 2777973 | 8/2020 |

(Continued)

OTHER PUBLICATIONS (122-2056) Ball, Marty Scott; Office Action for Canadian patent application No. 3, 125,681, filed May 23, 2012, mailed Oct. 28, 2022, 4 pgs.

(Continued)

*Primary Examiner* — Giovanni Astacio-Oquendo
*Assistant Examiner* — Dilara Sultana
(74) *Attorney, Agent, or Firm* — Taylor English Duma LLP

(57) ABSTRACT

An ultrasonic flow meter assembly includes a meter housing comprising an upper housing and a lower housing, the lower housing defining a first piezo mount, a second piezo mount, a first reflector mount and a second reflector mount; a first piezoelectric transducer supported on the first piezo mount and a second piezoelectric transducer supported on the second piezo mount; a first reflector mounted to the first reflector mount and defining a first reflective surface, the first reflective surface vertically aligned with the first piezoelectric transducer; and a second reflector mounted to the second reflector mount and defining a second reflective surface, the second reflective surface vertically aligned with the second piezoelectric transducer; wherein the first and second reflectors are configured to reflect ultrasonic signals from the first piezoelectric transducer to the second piezoelectric transducer.

44 Claims, 30 Drawing Sheets

(58) Field of Classification Search
CPC .... G01F 15/006; G01F 15/024; G01F 15/063; G01F 15/14; F15D 1/001; F15D 1/025; G01K 1/16; G01K 7/22; G01K 13/026; G01L 19/0092

See application file for complete search history.

(56) References Cited

U.S. PATENT DOCUMENTS

| | | | |
|---|---|---|---|
| 1,808,209 A | 6/1931 | Earl | |
| 1,808,212 A | 6/1931 | Earl | |
| 2,302,529 A | 11/1942 | Cornell et al. | |
| 2,572,175 A | 10/1951 | McPherson | |
| 3,245,651 A | 4/1966 | Erickson | |
| 3,254,660 A | 6/1966 | Ray | |
| 3,430,657 A | 3/1969 | Junck et al. | |
| 3,593,957 A | 7/1971 | Dolter et al. | |
| 3,653,261 A | 4/1972 | Feldman | |
| 3,672,233 A | 6/1972 | Hjermstad | |
| 3,729,026 A | 4/1973 | Wilke | |
| 3,731,534 A | 5/1973 | Painley et al. | |
| 3,795,144 A | 3/1974 | Marchesi | |
| 3,894,432 A | 7/1975 | Coughlin | |
| 4,508,136 A | 4/1985 | Kah, Jr. | |
| 4,901,751 A | 2/1990 | Story | |
| 4,953,403 A | 9/1990 | Springer | |
| 4,967,996 A | 11/1990 | Sonoda et al. | |
| 5,251,480 A | 10/1993 | Brunson, IV et al. | |
| 5,267,587 A | 12/1993 | Brown | |
| 5,519,387 A | 5/1996 | Besier et al. | |
| 5,540,347 A | 7/1996 | Griffin | |
| 5,546,801 A | 8/1996 | Swinson et al. | |
| 5,767,790 A | 6/1998 | Jovellana | |
| 5,979,863 A | 11/1999 | Lousberg | |
| 5,986,573 A | 11/1999 | Franklin et al. | |
| 5,996,608 A | 12/1999 | Hunter et al. | |
| 6,069,571 A | 5/2000 | Tell | |
| 6,115,677 A | 9/2000 | Perthold et al. | |
| 6,150,955 A | 11/2000 | Tracy et al. | |
| 6,152,173 A | 11/2000 | Makowan | |
| 6,208,266 B1 | 3/2001 | Lyons et al. | |
| 6,237,618 B1 | 5/2001 | Kushner | |
| 6,325,099 B1 | 12/2001 | Bunschoten et al. | |
| 6,426,027 B1 | 7/2002 | Scarborough et al. | |
| 6,491,062 B1 | 12/2002 | Croft | |
| 6,536,469 B2 | 3/2003 | Dilger et al. | |
| 6,556,142 B2 | 4/2003 | Dunstan | |
| 6,568,416 B2 | 5/2003 | Tucker | |
| 6,618,709 B1 | 9/2003 | Sneeringer | |
| 6,651,514 B2 | 11/2003 | Zanker | |
| 6,657,552 B2 | 12/2003 | Belski et al. | |
| 6,701,956 B1 | 3/2004 | Berger | |
| 6,880,567 B2 | 4/2005 | Klaver | |
| 6,982,651 B2 | 1/2006 | Fischer | |
| 7,032,461 B2 | 4/2006 | Ueki et al. | |
| 7,058,521 B2 | 6/2006 | Kowal et al. | |
| 7,099,781 B1 | 8/2006 | Heidl et al. | |
| 7,111,817 B2 | 9/2006 | Teti et al. | |
| 7,143,645 B2 | 12/2006 | Benson et al. | |
| 7,213,467 B2 | 5/2007 | Turner et al. | |
| 7,228,726 B2 | 6/2007 | Kates | |
| 7,248,179 B2 | 7/2007 | Smit | |
| 7,250,874 B2 | 7/2007 | Mueller et al. | |
| 7,267,014 B2 | 9/2007 | Winter | |
| 7,304,587 B2 | 12/2007 | Boaz | |
| 7,349,766 B2 | 3/2008 | Rodgers | |
| 7,385,524 B1 | 6/2008 | Orlosky | |
| D583,692 S | 12/2008 | Ball et al. | |
| 7,533,693 B2 | 5/2009 | Colton et al. | |
| 7,549,439 B2 | 6/2009 | Kimura et al. | |
| 7,559,529 B2 | 7/2009 | Affaticati et al. | |
| 7,604,216 B2 | 10/2009 | Gebler | |
| 7,671,480 B2 | 3/2010 | Pitchford et al. | |
| 7,690,393 B2 | 4/2010 | Nagle et al. | |
| 7,694,934 B2 | 4/2010 | Irwin | |
| 7,740,024 B2 | 6/2010 | Brodeur | |
| 7,746,246 B2 | 6/2010 | Salser | |
| 7,775,422 B2 | 8/2010 | Winter et al. | |
| 7,806,382 B1 | 10/2010 | Palumbo et al. | |
| 7,817,063 B2 | 10/2010 | Hawkins et al. | |
| 7,825,793 B1 | 11/2010 | Spillman et al. | |
| 7,880,641 B2 | 2/2011 | Parris et al. | |
| 7,991,510 B2 | 8/2011 | Duan et al. | |
| 8,013,732 B2 | 9/2011 | Petite et al. | |
| 8,347,427 B2 | 1/2013 | Klicpera | |
| 8,424,392 B2 | 4/2013 | Kroemer et al. | |
| 8,482,908 B2 | 7/2013 | Schwartz et al. | |
| 8,516,925 B2 | 8/2013 | Johnson et al. | |
| 8,539,827 B2 | 9/2013 | Benson et al. | |
| 8,596,140 B2 | 12/2013 | Skallebaek et al. | |
| 8,626,466 B2 | 1/2014 | Hackett, III et al. | |
| 8,700,344 B2 | 4/2014 | Wilson | |
| 8,719,187 B2 | 5/2014 | Milanes Garcia-Moreno | |
| 8,776,593 B2 | 7/2014 | Margalit et al. | |
| 8,806,957 B2 | 8/2014 | Laursen et al. | |
| 8,833,390 B2 | 9/2014 | Ball et al. | |
| 8,866,634 B2 | 10/2014 | Williamson et al. | |
| 8,893,559 B2 | 11/2014 | Drachmann | |
| 8,911,191 B2 | 12/2014 | James | |
| 8,928,137 B2 | 1/2015 | Skallebaek et al. | |
| 8,939,016 B2 | 1/2015 | Brasel et al. | |
| 9,019,120 B2 | 4/2015 | Broniak et al. | |
| 9,024,767 B2 | 5/2015 | Ramsay | |
| 9,061,307 B2 | 6/2015 | Klicpera et al. | |
| 9,080,906 B2 | 7/2015 | Sorensen et al. | |
| 9,134,154 B2 | 9/2015 | Ramsay | |
| 9,134,155 B2 | 9/2015 | Ramsay et al. | |
| 9,182,260 B2 | 11/2015 | Nielsen et al. | |
| 9,254,499 B2 | 2/2016 | Klicpera | |
| 9,266,136 B2 | 2/2016 | Klicpera | |
| 9,297,150 B2 | 3/2016 | Klicpera | |
| 9,335,192 B2 | 5/2016 | Nielsen | |
| 9,494,249 B2 | 11/2016 | McCraven | |
| 9,494,452 B2 | 11/2016 | Drachmann | |
| 9,494,480 B2 | 11/2016 | Klicpera | |
| 9,658,090 B2 | 5/2017 | Nielsen | |
| 9,714,855 B2 | 7/2017 | Bar-On | |
| 9,714,858 B2 | 7/2017 | Laursen et al. | |
| 9,726,528 B2 | 8/2017 | Drachmann | |
| 9,733,112 B2 | 8/2017 | Sorensen et al. | |
| 9,749,792 B2 | 8/2017 | Klicpera | |
| 9,909,680 B2 | 3/2018 | McCraven | |
| 9,933,291 B2 | 4/2018 | Drachmann | |
| 9,952,062 B2 | 4/2018 | Laursen et al. | |
| 9,970,799 B2 | 5/2018 | Nielsen et al. | |
| 10,048,108 B2 | 8/2018 | Zhang et al. | |
| RE47,048 E | 9/2018 | Skallebaek et al. | |
| 10,203,234 B2 | 2/2019 | Ishikawa et al. | |
| 10,215,603 B2 | 2/2019 | Drachmann | |
| 10,276,917 B2 | 4/2019 | Christiansen et al. | |
| 10,281,437 B2 | 5/2019 | Leaders et al. | |
| 10,514,288 B2 | 12/2019 | Droin et al. | |
| 10,564,017 B2 | 2/2020 | Nielsen et al. | |
| 10,583,239 B2 | 3/2020 | Loderer et al. | |
| 10,591,329 B2 | 3/2020 | Price | |
| 10,655,999 B2 | 5/2020 | Ball et al. | |
| 10,809,106 B2 | 10/2020 | Stuyvenberg et al. | |
| 10,823,597 B2 | 11/2020 | Bar-On et al. | |
| 10,837,816 B2 | 11/2020 | Mayle et al. | |
| 10,845,223 B2 | 11/2020 | Drachmann | |
| 10,871,240 B2 | 12/2020 | McCraven | |
| 10,900,819 B2 | 1/2021 | Pamakstis et al. | |
| 11,015,967 B2 | 5/2021 | Ball et al. | |
| 2003/0034900 A1 | 2/2003 | Han | |
| 2003/0076241 A1 | 4/2003 | Middleton | |
| 2004/0193329 A1 | 9/2004 | Ransom et al. | |
| 2005/0189018 A1 | 9/2005 | Brodeur et al. | |
| 2005/0236594 A1 | 10/2005 | Lilly et al. | |
| 2005/0246295 A1 | 11/2005 | Cameron | |
| 2006/0012491 A1 | 1/2006 | Mahowald | |
| 2006/0059977 A1 | 3/2006 | Kates | |
| 2006/0137090 A1 | 6/2006 | Jeffries et al. | |
| 2006/0284784 A1 | 12/2006 | Smith et al. | |
| 2007/0284293 A1 | 12/2007 | Pitchford et al. | |
| 2008/0061769 A1 | 3/2008 | Junk et al. | |

(56) References Cited

U.S. PATENT DOCUMENTS

| | | |
|---|---|---|
| 2008/0084260 A1 | 4/2008 | Swartzentruber |
| 2008/0149180 A1 | 6/2008 | Parris et al. |
| 2008/0150750 A1 | 6/2008 | Parris |
| 2008/0169910 A1 | 7/2008 | Greene et al. |
| 2009/0058676 A1 | 3/2009 | Orlosky |
| 2009/0070682 A1 | 3/2009 | Dawes et al. |
| 2009/0153357 A1 | 6/2009 | Bushman et al. |
| 2009/0164050 A1 | 6/2009 | Ahmad |
| 2009/0188313 A1 | 7/2009 | Ball |
| 2009/0255346 A1 | 10/2009 | Hendey et al. |
| 2009/0271045 A1 | 10/2009 | Savelle et al. |
| 2009/0322453 A1 | 12/2009 | Kawaguchi |
| 2010/0060479 A1 | 3/2010 | Salter |
| 2011/0035063 A1 | 2/2011 | Palayur |
| 2011/0108136 A1 | 5/2011 | Margalit et al. |
| 2011/0114202 A1 | 5/2011 | Goseco |
| 2012/0055263 A1 | 3/2012 | Konzelmann |
| 2012/0068476 A1 | 3/2012 | Bradfield |
| 2012/0068477 A1 | 3/2012 | Bradfield |
| 2012/0193559 A1 | 8/2012 | Benson et al. |
| 2012/0271569 A1 | 10/2012 | Wilson |
| 2012/0305084 A1 | 12/2012 | Ball |
| 2013/0214883 A1 | 8/2013 | Yano |
| 2014/0111342 A1 | 4/2014 | Ramsay |
| 2014/0144244 A1* | 5/2014 | Jones .................. G01L 19/148 |
| | | 73/754 |
| 2014/0338464 A1 | 11/2014 | Ball |
| 2015/0300854 A1 | 10/2015 | Nielsen |
| 2015/0323091 A1 | 11/2015 | McCraven |
| 2016/0351028 A1 | 12/2016 | Brennan, Jr. et al. |
| 2017/0023146 A1 | 1/2017 | McCraven |
| 2017/0234712 A1 | 8/2017 | Ball et al. |
| 2018/0149283 A1 | 5/2018 | McCraven |
| 2019/0011303 A1 | 1/2019 | Hashimoto et al. |
| 2019/0310116 A1 | 10/2019 | Pilegaard et al. |
| 2019/0390990 A1 | 12/2019 | Krywyj et al. |
| 2020/0056915 A1* | 2/2020 | Pamakstis ............... G01F 1/667 |
| 2020/0096372 A1 | 3/2020 | Fuchs et al. |
| 2020/0141782 A1 | 5/2020 | Ball et al. |
| 2020/0182669 A1 | 6/2020 | Price |
| 2020/0300680 A1 | 9/2020 | Amar et al. |
| 2020/0386590 A1* | 12/2020 | Stuyvenberg ........... G01F 1/667 |
| 2020/0386591 A1 | 12/2020 | Scarborough, III et al. |

FOREIGN PATENT DOCUMENTS

| | | | | |
|---|---|---|---|---|
| CA | 3077743 | | 6/2023 | |
| CN | 213018943 U | * | 4/2021 | |
| WO | 9934140 | | 7/1999 | |
| WO | WO-2018174121 A1 | * | 9/2018 | |
| WO | WO-2020074050 A1 | * | 4/2020 | ............. G01F 1/662 |
| WO | WO-2020224734 A1 | * | 11/2020 | ............. G01F 1/662 |

OTHER PUBLICATIONS

Ball, Marty Scott; Office Action for Canadian patent application No. 3,077,743, filed May 23, 2012, mailed Jul. 11, 2022, 3 pgs.
Ball, Marty Scott; Issue Notification for U.S. Appl. No. 13/149,720, filed May 31, 2011, mailed Aug. 27, 2014, 1 pg.
Ball, Marty Scott; Non-Final Office Action for U.S. Appl. No. 13/149,720, filed May 31, 2011, mailed Mar. 11, 2014, 75 pgs.
Ball, Marty Scott; Notice of Allowance for U.S. Appl. No. 13/149,720, filed May 31, 2011, mailed Jun. 24, 2014, 29 pgs.
Ball, Marty Scott; Supplemental Notice of Allowability for U.S. Appl. No. 13/149,720, filed May 31, 2011, mailed Aug. 12, 2014, 4 pgs.
Ball, Marty Scott; Applicant-Initiated Interview Summary for U.S. Appl. No. 14/451,896, filed Aug. 5, 2014, mailed May 17, 2018, 4 pgs.
Ball, Marty Scott; Final Office Action for U.S. Appl. No. 14/451,896, filed Aug. 5, 2014, mailed Aug. 10, 2018, 23 pgs.
Ball, Marty Scott; Final Office Action for U.S. Appl. No. 14/451,896, filed Aug. 5, 2014, mailed Sep. 7, 2017, 11 ogs.
Ball, Marty Scott; Non-Final Office Action for U.S. Appl. No. 14/451,896, filed Aug. 5, 2014; mailed Jan. 16, 2018; 18 pgs.
Ball, Marty Scott; Non-Final Office Action for U.S. Appl. No. 14/451,896, filed Aug. 5, 2014, mailed Mar. 18, 2016, 98 pgs.
Ball, Marty Scott; Non-Final Office Action for U.S. Appl. No. 14/451,896; filed Aug. 5, 2014, mailed May 12, 2016; 15 pages.
Ball, Marty Scott; Non-Final Office Action for U.S. Appl. No. 14/451,896, filed Aug. 5, 2014, mailed P/27/2017, 16 pgs.
Ball, Marty Scott; Final Office Action for U.S. Appl. No. 14/451,896, filed Aug. 5, 2014, mailed Oct. 14, 2016; 17 pgs.
Article entitled: "Thermocouple Wire Report", located at <http://www.lieda.co.za/Wordpress/wp-content/uploads/reports/ThermocoupleWireReport.pdf>, webpage last updated on Apr. 8, 2004, 18 pgs.
Ball, Marty Scott; Corrected Notice of Allowance for U.S. Appl. No. 15/584,169, filed May 2, 2017, mailed Jan. 30, 2020, 6 pgs.
Ball, Marty Scott; Final Office Action for U.S. Appl. No. 15/584,169, filed May 2, 2017, mailed Feb. 22, 2018, 19 pgs.
Ball, Marty Scott; Non-Final Office Action for U.S. Appl. No. 15/584,169, filed May 2, 2017, mailed Jun. 27, 2019, 10 pgs.
Ball, Marty Scott; Non-Final Office Action for U.S. Appl. No. 15/584,169, filed May 2, 2017, mailed Sep. 27, 2017, 26 pgs.
Ball, Marty Scott; Notice of Allowance for U.S. Appl. No. 15/584,169, filed May 2, 2017, mailed Oct. 2, 2019, 11 pgs.
Ball, Marty Scott; Final Office Action for U.S. Appl. No. 15/584,169, filed May 2, 2017, mailed Feb. 13, 2019, 16 pgs.
Ball, Marty Scott; Non-Final Office Action for U.S. Appl. No. 15/584,169, filed May 2, 2017, mailed Aug. 13, 2018, 18 pgs.
Ball, Marty Scott; Supplemental Notice of Allowance for U.S. Appl. No. 15/584,169, filed May 2, 2017, mailed Mar. 17, 2020, 4 pgs.
Klicpera, Michael Edward; Petition for Ex Parte Reexamination of U.S. Pat. No. 8,347,427, filed Aug. 2, 2019, 516 pgs.
Klicpera, Michael Edward; Petition for Ex Parte Reexamination of U.S. Pat. No. 9,297,150, filed Aug. 2, 2019, 366 pgs.
Klicpera, Michael Edward; Petition for Ex Parte Reexamination of U.S. Pat. No. 9,749,792, filed Aug. 5, 2019, 587 pgs.
New World Encyclopedia; Article entitled: "Thermocouple", located at <https://web.archive.org/web/20081228234252/https://www.newworldencyclopedia.org/entry/Thermocouple>, archived webpage from Dec. 28, 2008, 5 pgs.
Pacific Gas and Electric Company; "Article entitled: SmartMeter System—How it Works", located at <https://web.archive.org/web/20100712031615/https:/www.pge.com/myhome/customerservice/smartmeter/howitworks/>, accessed on Oct. 24, 2019, 3 pgs.
The Free Dictionary; Article entitled: "Remotely", located at <https://web.archive.org/web/20080821060942/http://www.thefreedictionary.com/remotely>, archived webpage from Aug. 21, 2008, 3 pgs.
Wikipedia; Article entitled: "Flow Measurement", located at <https://web.archive.org/web/20071028063648/https://en.wikipedia.org/wiki/Flow_measurement>, archived webpage from Oct. 28, 2007, 4 pgs.
Mueller Systems, LLC; Petition for Inter Partes Review of U.S. Pat. No. 8,347,427, filed Oct. 29, 2019, 75 pgs.
Mueller Systems, LLC; Petition for Inter Partes Review of U.S. Pat. No. 9,297,150, filed Oct. 29, 2019, 89 pgs.
Mueller Systems, LLC; Petition for Inter Partes Review of U.S. Pat. No. 9,749,792, filed Oct. 29, 2019, 75 pgs.
Wikipedia; Article entitled: "Pressure sensor", located at <https://web.archive.org/web/20071117202257/https://en.wikipedia.org/wiki/Pressure_sensor >, archived webpage from Nov. 17, 2007, 4 pgs.
Ball, Marty Scott; Corrected Notice of Allowance for U.S. Appl. No. 16/733,946, filed Jan. 3, 2020, mailed Mar. 31, 2021, 4 pgs.
Ball, Marty Scott; Non-Final Office Action for U.S. Appl. No. 16/733,946, filed Jan. 3, 2020, mailed Sep. 28, 2020, 38 pgs.
Ball, Marty Scott; Notice of Allowance for U.S. Appl. No. 16/733,946, filed Jan. 3, 2020, mailed Jan. 28, 2021, 10 pgs.
Ball, Marty Scott; Mexico Office Action for serial No. MX/a/2012/006097, filed May 25, 2012, mailed Mar. 19, 2015, 3 pgs.
Linkel, Scott; Office Action for Canadian application No. 2,777,973, filed May 23, 2012, mailed Feb. 18, 2019, 5 pgs.
Linkel, Scott; Office Action for Canadian application No. 2,777,973, filed May 23, 2012, mailed Apr. 4, 2018, 4 pgs.
Ball, Marty Scott; Office Action for Mexico patent application No. MX/a/2015/013381, filed May 25, 2012, mailed Oct. 9, 2019, 7 pgs.

(56) References Cited

OTHER PUBLICATIONS

Ball, Marty Scott; Office Action for Mexico patent application No. MX/a/2015/013381, filed May 25, 2012, mailed Feb. 5, 2020, 7 pgs.
Ball, Marty Scott; Mexico Office Action for serial No. MX/a/2012/006097, filed May 25, 2012, mailed May 26, 2015, 5 pgs.
Ball, Marty Scott; Office Action for Canadian patent application No. 3,077,743, filed May 23, 2012, mailed Dec. 30, 2021, 4 pgs.
Ball, Marty Scott; Office Action for Canadian patent application No. 3,077,743, filed May 23, 2012, mailed May 14, 2021, 3 pgs.
McCraven, Jeremy; Applicant Interview Summary for U.S. Appl. No. 14/273,823, filed May 9, 2014, mailed Jan. 12, 2016, 3 pgs.
McCraven, Jeremy; Issue Notification for U.S. Appl. No. 14/273,823, filed May 9, 2014, mailed Oct. 26, 2016; 1 pg.
McCraven, Jeremy; Non-Final Office Action for U.S. Appl. No. 14/273,823, filed May 9, 2014, mailed Dec. 8, 2015, 18 pgs.
McCraven, Jeremy; Non-Final Office Action for U.S. Appl. No. 14/273,823, filed May 9, 2014, mailed Apr. 12, 2016, 36 pgs.
McCraven, Jeremy; Notice of Allowance for U.S. Appl. No. 14/273,823, filed May 9, 2014, mailed Jul. 7, 2016, 10 pgs.
McCraven, Jeremy; Supplemental Notice of Allowability for U.S. Appl. No. 14/273,823, filed May 9, 2014, mailed Aug. 9, 2016, 6 pgs.
McCraven, Jeremy; Supplemental Notice of Allowance for U.S. Appl. No. 14/273,823, filed May 9, 2014, mailed Oct. 14, 2016; 4 pgs.
Ball, Marty Scott; Notice of Allowance for U.S. Appl. No. 15/584,169, filed May 2, 2017, mailed Mar. 4, 2020, 11 pgs.
Ball, Marty Scott; Office Action for Mexico patent application No. MX/a/2015/016959, filed May 25, 2012, mailed Sep. 9, 2020, 7 pgs.
McCraven, Jeremy; Non-Final Office Action for U.S. Appl. No. 15/288,156, filed Oct. 7, 2016, mailed Jul. 24, 2017, 25 pgs.
McCraven, Jeremy; Notice of Allowance for U.S. Appl. No. 15/288,156, filed Oct. 7, 2016, mailed Oct. 27, 2017, 7 pgs.
McCraven, Jeremy; Corrected Notice of Allowance for U.S. Appl. No. 15/288,156, filed Oct. 7, 2016, mailed Nov. 6, 2017, 5 pgs.
McCraven, Jeremy; Supplemental Notice of Allowance for U.S. Appl. No. 15/288,156, filed Oct. 7, 2016, mailed Nov. 16, 2017, 4 pgs.
McCraven, Jeremy; Response to Amendment under Rule 312 for U.S. Appl. No. 15/288,156, filed Oct. 7, 2016, mailed Nov. 21, 2017, 2 pgs.
McCraven, Jeremy; Supplemental Notice of Allowance for U.S. Appl. No. 15/288,156, filed Oct. 7, 2016, mailed Feb. 6, 2018, 4 pgs.
McCraven, Jeremy; Issue Notification for U.S. Appl. No. 15/288,156, filed Oct. 7, 2016, mailed Feb. 14, 2018, 1 pg.
McCraven, Jeremy; Non-Final Office Action for U.S. Appl. No. 15/877,812, filed Jan. 23, 2018, mailed Jun. 14, 2019, 45 pgs.
McCraven, Jeremy; Non-Final Office Action for U.S. Appl. No. 15/877,812, filed Jan. 23, 2018, mailed Jan. 15, 2020, 15 pgs.
McCraven, Jeremy; Notice of Allowance for U.S. Appl. No. 15/877,812, filed Jan. 23, 2018, mailed May 20, 2020, 14 pgs.
McCraven, Jeremy; Supplemental Notice of Allowance for U.S. Appl. No. 15/877,812, filed Jan. 23, 2018, mailed Jul. 20, 2020, 4 pgs.

\* cited by examiner

ULTRASONIC FLOW METER ASSEMBLY

TECHNICAL FIELD

This disclosure relates to water metering. More specifically, this disclosure relates to an ultrasonic flow meter for water flow monitoring.

BACKGROUND

Water providers deliver water to businesses and individuals via piping systems.

Typically, a water meter will be placed in the water supply line between the water source and a user terminal to measure all water flowing to that user terminal. Water meters can comprise a flow tube through which the water can flow for measurement by the water meter. Materials that are suitable for forming the water meter housings often are not ideal for forming the flow tube, and vice versa.

Meters are read and checked against prior readings to determine the total flow of water to the user terminal. Some water meters reflect ultrasonic signals between reflectors disposed in the supply line and measure the speed of the ultrasonic signals to determine the flow rate of the water. Typical water meters only measure flow rate and fail to measure additional important properties of the water, such as temperature and pressure. Therefore, additional measurement devices must be attached to the water supply line for measurement of these properties. Additionally, ultrasonic water meters usually require a separate disconnect device, often a manual disconnect device, that is attached to the water supply line at a location separate from the water meter. For manual disconnect devices, an operator must be physically present to manually operate the disconnect device.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is an ultrasonic flow meter assembly comprising a meter housing comprising an upper housing and a lower housing, the lower housing defining a first piezo mount, a second piezo mount, a first reflector mount and a second reflector mount; a first piezoelectric transducer supported on the first piezo mount and a second piezoelectric transducer supported on the second piezo mount; a first reflector mounted to the first reflector mount and defining a first reflective surface, the first reflective surface vertically aligned with the first piezoelectric transducer; and a second reflector mounted to the second reflector mount and defining a second reflective surface, the second reflective surface vertically aligned with the second piezoelectric transducer; wherein the first and second reflectors are configured to reflect ultrasonic signals from the first piezoelectric transducer to the second piezoelectric transducer.

Also disclosed is a pressure sensor assembly comprising a printed circuit board defining PCB body, a pressure sensor cut-out formed in the PCB body, and a pressure sensor support extending into the pressure sensor cut-out, the pressure sensor support defining a support island movable relative to the PCB body; a pressure sensor coupled to the support island of the printed circuit board; and a PCB cover engaging the support island to limit movement of the pressure sensor during pressure spikes.

Additionally, disclosed is a method of measuring a flow rate of fluid through an ultrasonic flow meter assembly, the method comprising sending a first ultrasonic signal through a flow tube of the ultrasonic flow meter assembly from a first piezoelectric transducer to a second piezoelectric transducer, the first and second piezoelectric transducers disposed within a meter housing of the ultrasonic flow meter assembly; determining a flow rate of fluid through a flow channel of the flow tube, which comprises measuring an amount of time that it takes the first ultrasonic signal to travel from the first piezoelectric transducer to the second piezoelectric transducer; and sensing a pressure of the fluid with a pressure sensor, the pressure sensor extending through a hole formed through the meter housing and into a pressure sensor channel formed in the flow tube, the pressure sensor channel in fluid communication with the flow channel.

A method of manufacturing an ultrasonic flow meter, the method comprising manufacturing a meter housing from a first material and a flow tube from a second material different from the first material, the meter housing comprising a pair of piezo mounts and a pair of reflector mounts, the flow tube defining a flow channel and a pair of openings allowing access to the flow channel; assembling a piezoelectric transducer with each of the piezo mounts; receiving each of the reflector mounts through one of the tube openings; and sandwiching a reflector between each of the reflector mounts and a support ledge of the flow tube, each of the support ledges disposed within the flow channel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
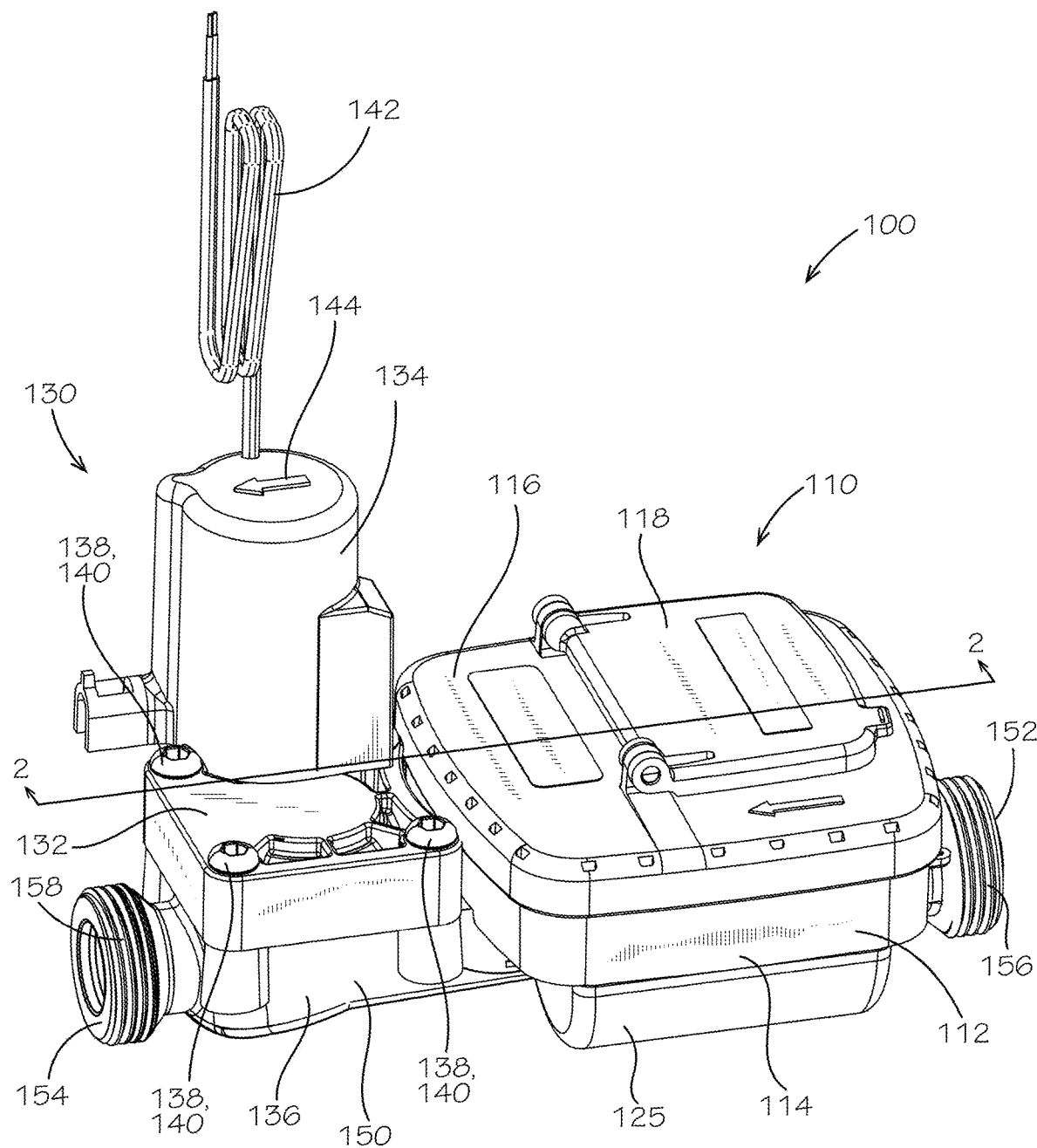
FIG. 1A is a front perspective view of an ultrasonic flow meter assembly comprising an ultrasonic flow meter, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an ultrasonic flow meter assembly and associated methods, systems, devices, and various apparatus. Example aspects of the ultrasonic flow meter assembly can comprise an ultrasonic flow meter. It would be understood by one of skill in the art that the ultrasonic flow meter assembly is described in but a few exemplary embodiments among many. No particular terminology or description should be considered limiting on the disclosure or the scope of any claims issuing therefrom.

Figure 1B:
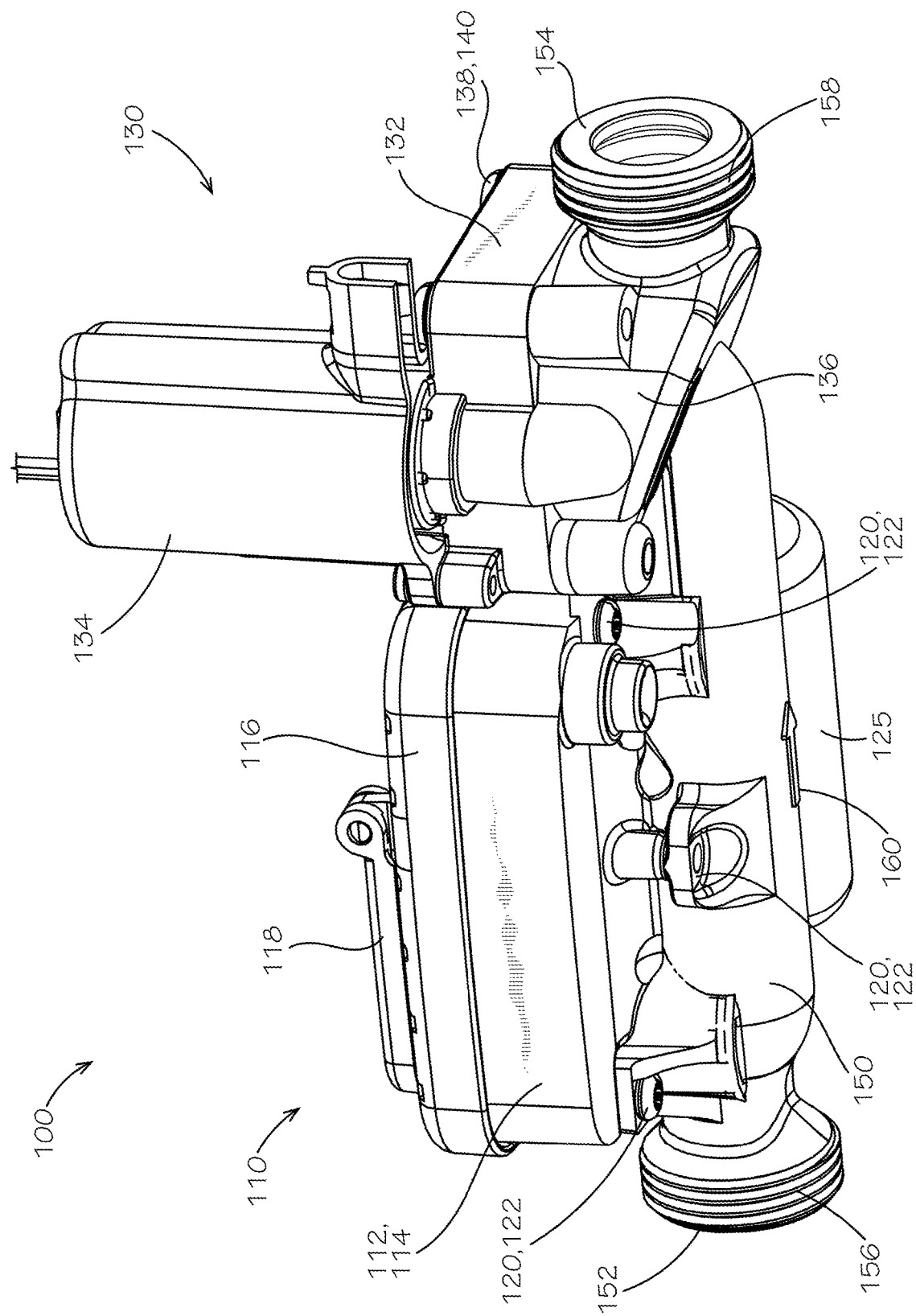
FIG. 1B is a rear perspective view of the ultrasonic flow meter assembly of FIG. 1A.

FIGS. 1A and 1B are front and rear perspective views, respectively, of an ultrasonic flow meter assembly 100, in accordance with one aspect of the present disclosure. The ultrasonic flow meter assembly 100 can be connected to a pipeline system carrying fluid therethrough. The pipeline can be, for example, a municipal water pipeline system carrying water to commercial or residential buildings. The ultrasonic flow meter assembly 100 can measure a flow rate of the water through the ultrasonic flow meter assembly 100. In other aspects, the pipeline system can be any other suitable type of pipeline system, and the ultrasonic flow meter assembly 100 can measure the flow rate any other suitable fluid, including liquids and gases, therethrough. According to example aspects, the ultrasonic flow meter assembly 100 can comprise an ultrasonic flow meter 110 and a water supply valve 130. The ultrasonic flow meter 110 and the water supply valve 130 can be assembled with a flow tube 150, as shown, and water from the pipeline system can flow through the flow tube 150. The water supply valve 130 can control the flow of fluid through the flow tube 150 by opening and closing, and the ultrasonic flow meter 110 can measure the flow rate of the water through the flow tube 150. In some aspects, the position of the water supply valve 130 (e.g., open or closed) can be ascertained by determining whether fluid is flowing through the flow tube 150. Other aspects of the ultrasonic flow meter assembly 100 may not comprise the water supply valve 130. For example, the ultrasonic flow meter assembly 100 shown in FIG. 3 comprises the ultrasonic flow meter 110 and the flow tube 150 only.

The flow tube 150 can define a flow channel 204 (shown in FIG. 2) through which fluid can flow. The flow tube 150 can further define an inlet end 152 through which fluid can enter the flow channel 204 and an outlet end 154 through which fluid can exit the flow channel 204. As shown, an inlet threaded portion 156 can be formed at inlet end 152 of the flow tube 150, and an outlet threaded portion 158 can be formed at the outlet end 154 of the flow tube 150. The inlet and outlet threaded portions 156, 158 can allow for threaded attachment of the flow tube 150 to the pipeline system. The inlet and outlet threaded portions 156, 158 can define external threading in the present aspect; however, in other aspects, either or both of the inlet and outlet threaded portions 156, 158 can define internal threading. According to example aspects, the flow tube can comprise a material that has a high thermal conductivity. A thermally conductive material is a material that conducts heat well. In some aspects, the flow tube 150 can comprise a brass material, for example and without limitation. In other aspects, the flow tube 150 can comprise any other suitable thermally conductive material that conducts heat well, including for example, other metals, such as bronze, and the like. Furthermore, example aspects of the flow tube 150 can define one or more directional arrows 160 formed thereon, which can indicate the direction of fluid flow through the flow channel 204. According to example aspects, the flow meter assembly 100 can be dimensioned from the inlet end 152 to the outlet end 154 such that it can fit within a standard water meter lay-length. The standard water meter lay-length of a standard water meter is designated in various industry standards documents, including the American Water Works Association (AWWA). Specifically, the AWWA C700 standard requires 7.5 inches standard water meter lay-length for meters with ⅝-inch piping diameter. Other AWWA standards, such as C708 and C710, also specify the same laying lengths for meters of like sizes.

The ultrasonic flow meter 110 can be oriented proximate to the inlet end 152 of the flow tube 150 and the water supply valve 130 can be oriented between the ultrasonic flow meter 110 and the outlet end 154 of the flow tube 150. The ultrasonic flow meter 110 can comprise a meter housing 112 mounted to the flow tube 150, as shown. The meter housing 112 can house and protect various components of the ultrasonic flow meter 110 within an interior 202 (shown in FIG. 2) thereof. In example aspects, the meter housing 112 can comprise a lower housing 114 and an upper housing 116, and the lower housing 114 can be mounted to the flow tube 150. Example aspects of the lower housing 114 and the upper housing 116 can be formed from a plastic material. In other aspects, the lower housing 114 and/or upper housing 116 can be formed from any other suitable materials, including but not limited to, various metals, composites, and the like. A display lid 118 can be coupled to the upper housing 116, as shown. In example aspects, like the meter housing 112, the display lid 118 can be formed from a plastic material. However, in other aspects, can be formed from any other suitable materials, including but not limited to, various metals, composites, and the like. The display lid can be transparent, translucent, or opaque. In some aspects, such as the present aspect, the display lid 118 can be pivotably coupled to the upper housing 116 and can pivot between a closed position, as shown, and an open position. In the closed position, a portion of the upper housing 116 can be covered by the display lid 118, as described in further detail below. The lower housing 114 can be coupled to the flow tube 150 by one or more housing fasteners 120 (shown in FIG. 1B), such as housing bolts 122 (shown in FIG. 1B), for example and without limitation. In other aspects, the meter housing 112 can be coupled to the flow tube 150 by any other suitable fastener or fastening technique. Example aspects of the lower housing 114 can define a battery housing portion 125 for receiving a battery 910 (shown in FIG. 19) of the ultrasonic flow meter 110. Other internal components of the ultrasonic flow meter 110 are described in further detail below. According to example aspects, the meter housing 112 can be formed from a plastic material. In other aspects, the lower housing 114 and/or the upper housing 116 can be formed from any other suitable material known in the art, such as metals, composites, or the like.

Figure 2:
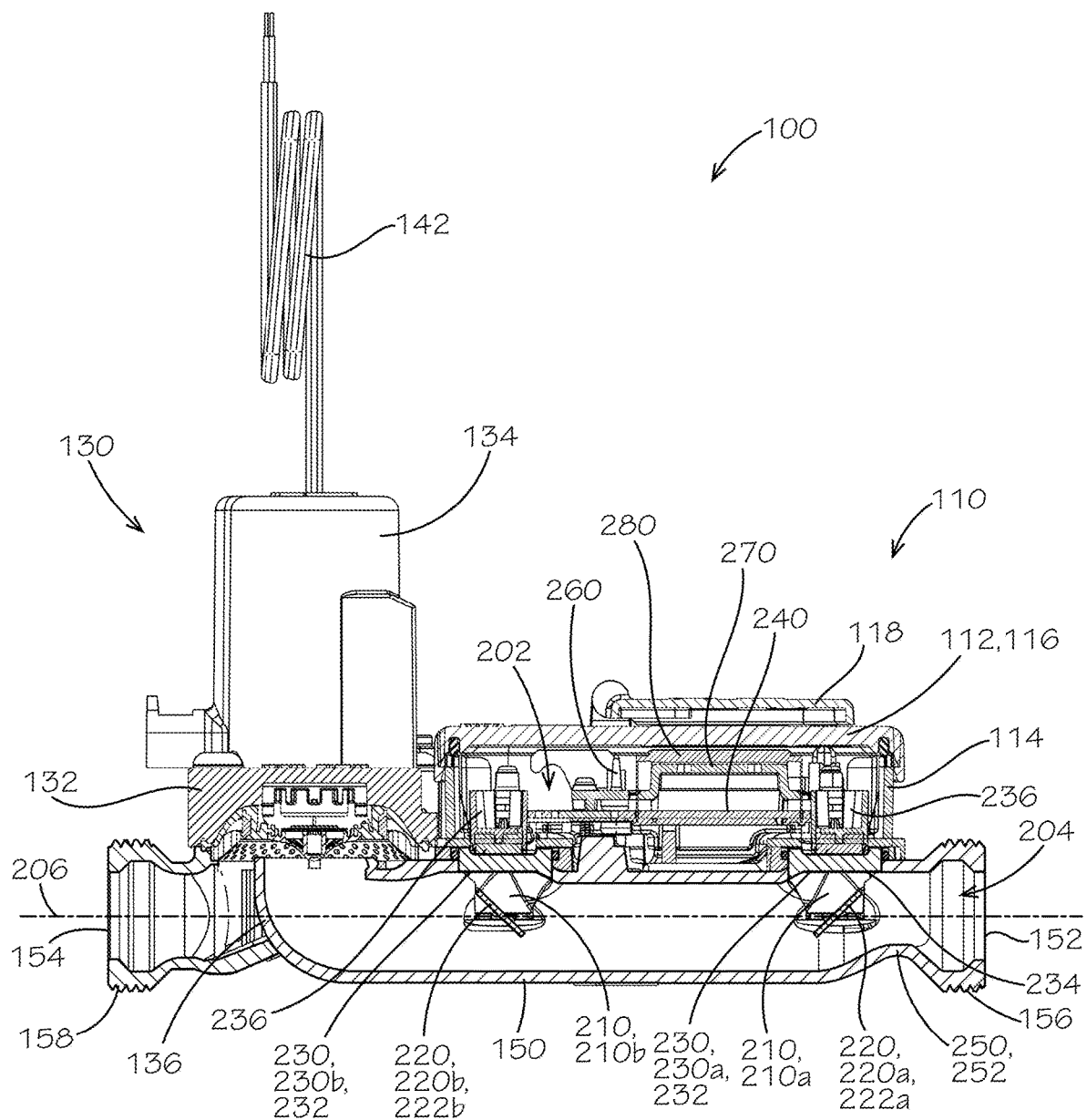
FIG. 2 is a cross-sectional view of the ultrasonic flow meter assembly of FIG. 1A taken along line 2-2 in FIG. 1A.

The water supply valve 130 can comprise a valve cover 132, a solenoid cover 134, and a valve body 136. In example aspects, the water supply valve 130 can be partially integrated with the flow tube 150. Specifically, in the present aspect, the valve body 136 can be monolithically formed (i.e., formed a singular component that constitutes a single material without joints or seams) with the flow tube 150. The valve cover 132 can be coupled to the valve body 136 by one or more valve fasteners 138, such as valve bolts 140, for example and without limitation. In other aspects, the valve cover 132 can be coupled to the flow tube 150 by any other suitable fastener or fastening technique. The valve cover 132 can enclose various components of the water supply valve 130 therein, as illustrated in FIG. 2. The solenoid cover 134 can be mounted on the valve cover 132, and a solenoid of the water supply valve 130 can be housed therein. Some aspects of the water supply valve 130 can be substantially similar to the water supply valve 130 shown and described in U.S. application Ser. No. 13/149,720, filed May 31, 2011, which issued into U.S. Pat. No. 8,833,390 on Sep. 16, 2014, and which is hereby specifically incorporated by reference herein in its entirety. In example aspects, the water supply valve 130 can be remotely operated. As shown, an antenna 142 can extend from the solenoid cover 134, and can be configured to send and receive signals related to the operation of the water supply valve 130. In example aspects, the water supply valve 130 can define one or more directional arrows 144 formed thereon, which can indicate the direction of fluid flow through the flow channel 204. For example, in the present aspect, the directional arrow 144 can be formed on the solenoid cover 134. The directional arrows 144, 160 on the solenoid cover 134 and the flow tube 150, respectively, can aid in properly assembling components of the water supply valve 130 with the flow tube 150, and can further aid in properly assembly the ultrasonic flow meter 110 with the water supply valve 130 and the flow tube 150, as described in further detail below with respect to FIG. 23.

FIG. 2 illustrates a cross-sectional view of the ultrasonic flow meter assembly 100 taken along line 2-2 in FIG. 1A. As shown, the flow tube 150 can define the flow channel 204 extending from the inlet end 152 to the outlet end 154. The flow channel 204 can define a flow axis 206 extending centrally therethrough from the inlet end 152 to the outlet end 154. The ultrasonic flow meter 110 can be disposed adjacent to the inlet end 152 of the flow tube 150. The water supply valve 130 can be disposed between the ultrasonic flow meter 110 and the outlet end 154 of the flow tube 150, and the valve body 136 of the water supply valve 130 can be integrated with the flow tube 150. According to example aspects, the ultrasonic flow meter 110 can comprise reflector mounts 210, such as first and second reflector mounts 210a,b, extending from the lower housing 114 and into the flow channel 204 of the flow tube 150. The reflector mounts 210 can be axially spaced apart within the flow channel 204, as shown. A reflector 220 can be mounted on each of the reflector mounts 210. For example, a first reflector 220a can be mounted on the first reflector mount 210a and a second reflector 220b can be mounted on the second reflector mount 210b. In some aspects, the first reflector 220a can define a first reflective surface 222a that can be angled at about 45° relative to the flow axis 206 towards the second reflector 220b, and the second reflector 220b can define a second reflective surface 222b that can be angled at about 45° relative to the flow axis 206 towards the first connector, as described in further detail below. Thus, about a 90° can be defined between the first and second reflective surfaces 222a,b.

Example aspects of the ultrasonic flow meter 110 can further comprise piezoelectric transducers 230, such as first and second piezoelectric transducers 230a,b, each of which can comprise a piezoelectric material. For example, the piezoelectric material can comprise a piezoelectric ceramic material in some aspects, or can comprise any other suitable piezoelectric material known in the art. In the present aspect, the piezoelectric material can be formed as a piezoelectric disc 232. Each of the piezoelectric discs 232 can be mounted on a piezo mount 234 of the lower housing 114 and can be disposed between the piezo mount 234 and a corresponding piezo housing 236. The piezo housing 236 can apply a downward force against the corresponding piezoelectric disc 232 to produce a polarity in the piezoelectric disc 232. Each of the piezo mounts 234 can be substantially vertically aligned with a corresponding one of the reflector mounts 210, relative to the orientation shown, such that the piezoelectric discs 232 can be substantially vertically aligned with the first and second reflectors 220a,b, respectively. In the present aspect, each of the first and second piezoelectric transducers 230a,b can operate as both a transmitter and a receiver, as described in further detail below. Example aspects of the ultrasonic flow meter 110 can further comprise a printed circuit board 240, also known as a "PCB", mounted within the interior 202 of the meter housing 112. Each of the piezoelectric discs 232 can be electrically connected to the PCB 240, for example by one or more wires 1110 (shown in FIG. 11).

The ultrasonic flow meter 110 can be configured to determine the flow rate of water, or another fluid, through the flow tube 150 of the ultrasonic flow meter assembly 100. According to example aspects, a processor of the PCB 240 can send a first electrical signal, hereinafter referred to as the transmitter electrical signal, to the piezoelectric disc 232 of the first piezoelectric transducer 230a via the wires 1110, which can excite the piezoelectric material of the first piezoelectric transducer 230a and cause the piezoelectric disc 232 to vibrate. The vibrating of the piezoelectric disc 232 can generate a first ultrasonic signal. The first piezoelectric transducer 230a can transmit the first ultrasonic signal substantially downward (i.e., substantially perpendicular to the flow axis 206) through the lower housing 114. The first ultrasonic signal can hit the first reflector 220a and can be reflected downstream through the flow channel 204 in the axial direction towards the second reflector 220b. The first ultrasonic signal can travel from the first reflector 220a to the second reflector 220b at the same speed as the fluid flowing through the flow channel 204. When the first ultrasonic signal hits the second reflector 220b, the second reflector 220b can reflect the first ultrasonic signal substantially upward (i.e., substantially perpendicular to the flow axis 206) to the second piezoelectric transducer 230b. The second piezoelectric transducer can convert the first ultrasonic signal to a second electrical signal, hereinafter referred to as the receiver electrical signal, which can be sent to the processor. The processor of the PCB 240 can measure the amount of time between generating the first electrical signal and receiving the second electrical signal (generally, the amount of time that it takes a signal to travel downstream from the first piezoelectric transducer 230a to the second piezoelectric transducer 230b).

In example aspects, a second ultrasonic signal can then be sent in the reverse direction (i.e., upstream through the flow tube 150) in the same manner from the second piezoelectric transducer 230b to the first piezoelectric transducer 230a, and the processor can again measure the amount of time between generating the first electrical signal and receiving the second electrical signal (generally, the amount of time that it takes a signal to travel upstream). The flow rate of the fluid through the flow channel 204 can then be determined by comparing the time it took for a signal to travel downstream with the time it took for a signal to travel upstream. The time difference between a signal travelling downstream and a signal travelling upstream is the delta Time of Flight. In some example aspects, the flow tube 150 can define a flow conditioning feature 250 oriented between the inlet end 152 of the flow tube 150 and the first reflector mount 210a. As shown, in the present aspect, the flow conditioning feature 250 can be formed as a hump 252 extending generally radially inward from a bottom side of the flow tube 150, relative to the flow axis 206, thereby narrowing the diameter of the flow tube 150 at the hump 252. The flow conditioning feature 250 can be configured to aid in softening the flow of water into the flow tube 150.

In some aspects, the ultrasonic flow meter 110 can further be configured to detect a pressure and/or a temperature of the fluid flowing through the flow tube 150. In example aspects, a pressure sensor 360 (shown in FIG. 3B) can be mounted to the printed circuit board and can contact fluid from the flow channel 204 to detect the pressure of the fluid. The pressure sensor 360 can be oriented between the first and second reflector mounts 210a,b. Similarly, a temperature sensor 260 can be mounted within the meter housing 112 and extend into a blind hole 402 (shown in FIG. 4) formed in the flow tube 150 to detect the temperature of the fluid. As described above, the flow tube 150 can comprise a thermally conductive material that conducts heat well, which can allow the temperature sensor 260 to easily detect the temperature of the fluid in the flow tube 150 without directly contacting the fluid. The temperature sensor 260 can be oriented between the first and second reflector mounts 210a,b. In the present aspect, the temperature sensor 260 can be a thermistor, which can be directly mounted to the PCB 240 and press-fit into the lower housing 114. However, in other aspects, the temperature sensor 260 can be any other suitable sensor for detecting temperature. Each of the pressure sensor 360 and the temperature sensor 260 can be electronically connected to the PCB 240, which can be configured to process the measurements taken by the pressure sensor 360 and the temperature sensor 260. The pressure sensor 360 and the temperature sensor 260 are described in further detail below with respect to FIG. 9. Aspects of the ultrasonic flow meter 110 can further comprise a PCB cover 270 that is secured over the PCB 240 relative to the orientation shown. The PCB cover 270 can contact the PCB 240 and the pressure sensor 360 to limit or prohibit movement of the pressure sensor 360 during pressure spikes, as described in further detail with respect to FIGS. 16-18. Additionally, the ultrasonic flow meter 110 can comprise an LED display 280 mounted over the PCB cover 270 and electrically connected to the PCB 240. The LED display 280 can receive and display information related to the flow rate, pressure, and/or temperature of the fluid flowing through the flow tube 150. The display lid 118 can selectively cover and uncover the LED display 280 in the closed and open positions, respectively. In other aspects, the display may not be an LED-type display and can be any other suitable display for showing the flow rate, temperature, and/or pressure information.

Figure 3A:
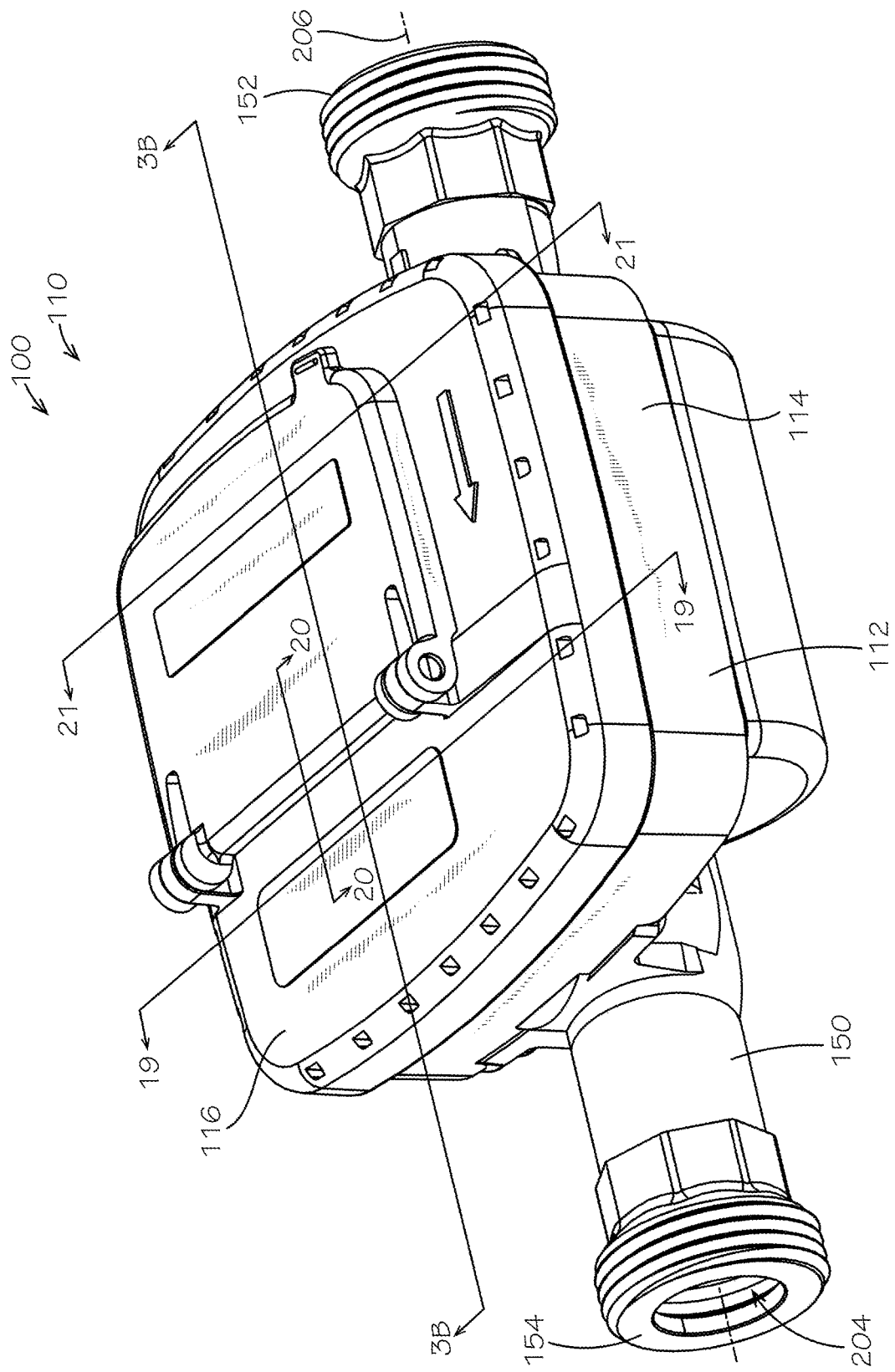
FIG. 3A is a front perspective view of the ultrasonic flow meter assembly, in accordance with another aspect of the present disclosure.
Figure 3B:
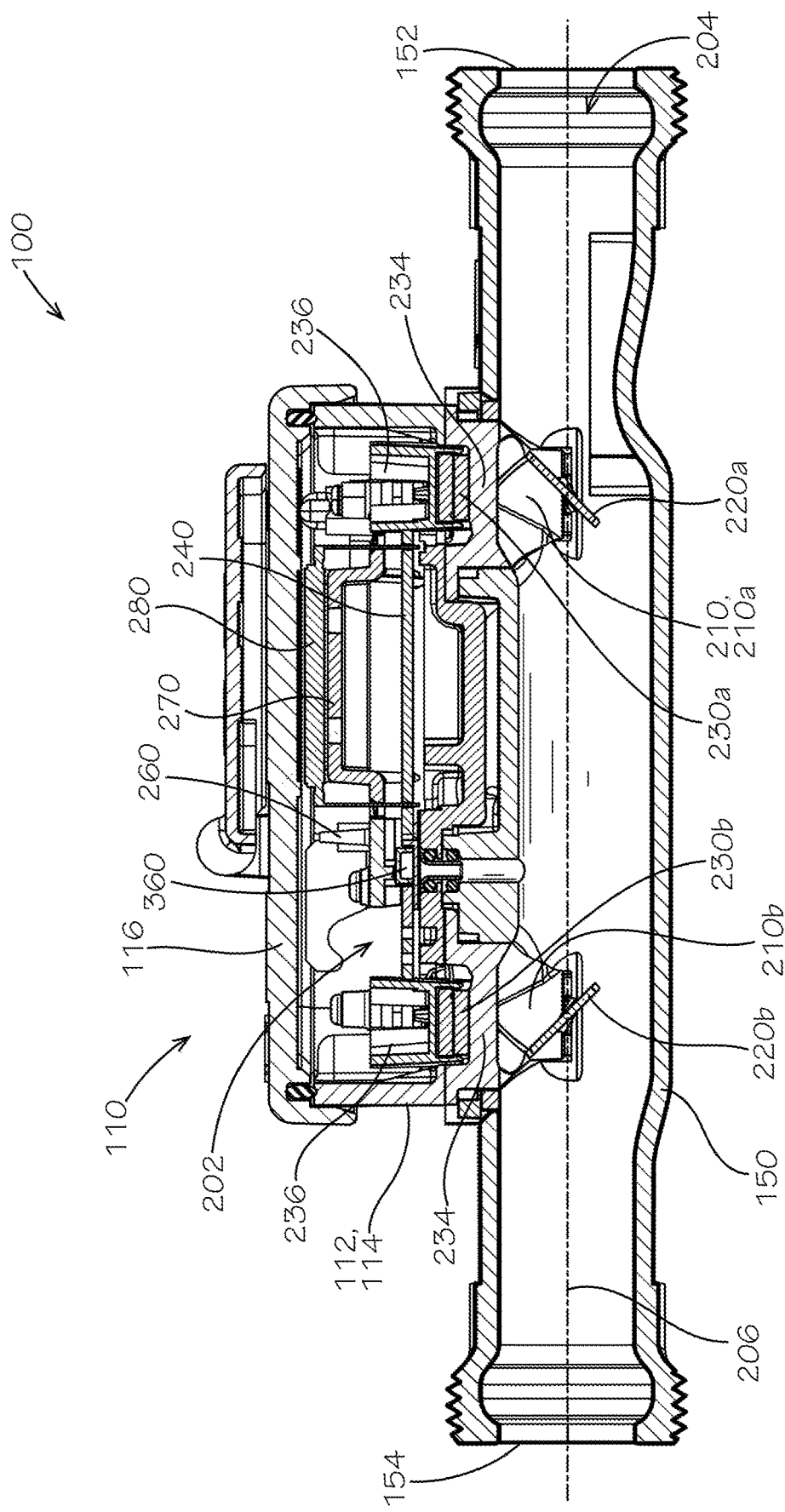
FIG. 3B is a cross-sectional view of the ultrasonic flow meter assembly of FIG. 3A, taken along line 3B-3B in FIG. 3A.

FIGS. 3A and 3B illustrate the ultrasonic flow meter assembly 100 in accordance with another aspect of the present disclosure. In the present aspect, the ultrasonic flow meter assembly 100 can comprise the ultrasonic flow meter 110 and the flow tube 150, but does not comprise the water supply valve 130 (shown in FIG. 1A). Thus, in the present aspect, the valve body 136 (shown in FIG. 1A) of the water supply valve 130 is not monolithically formed with the flow tube 150. Otherwise, the flow tube 150 and the ultrasonic flow meter 110 can be substantially similar to the flow tube 150 and ultrasonic flow meter 110 disclosed in FIGS. 1A-2. Referring to FIG. 3B, the flow tube 150 can define the flow channel 204 extending from the inlet end 152 to the outlet end 154. The flow axis 206 can extend centrally through the flow channel 204 from the inlet end 152 to the outlet end 154. The ultrasonic flow meter 110 can be mounted to the flow tube 150 between the inlet end 152 and the outlet end 154. The meter housing 112 can comprise the lower housing 114 and the upper housing 116. The first and second reflector mounts 210a,b can extend from the lower housing 114 into the flow channel 204, and the first and second reflectors 220a,b can be mounted thereon, respectively. Each of piezo housings 236 can be mounted to a corresponding one of the piezo mounts 234. Each of the first and second piezoelectric transducers 230a,b can be disposed between a corresponding piezo mount 234 and piezo housing 236 and can be substantially vertically aligned with the first and second reflectors 220a,b, respectively. The ultrasonic flow meter 110 can further comprise the PCB 240, the PCB cover 270, the pressure sensor 360, the temperature sensor 260, and the LED display 280 disposed within the interior 202 of the meter housing 112.

Figure 4:
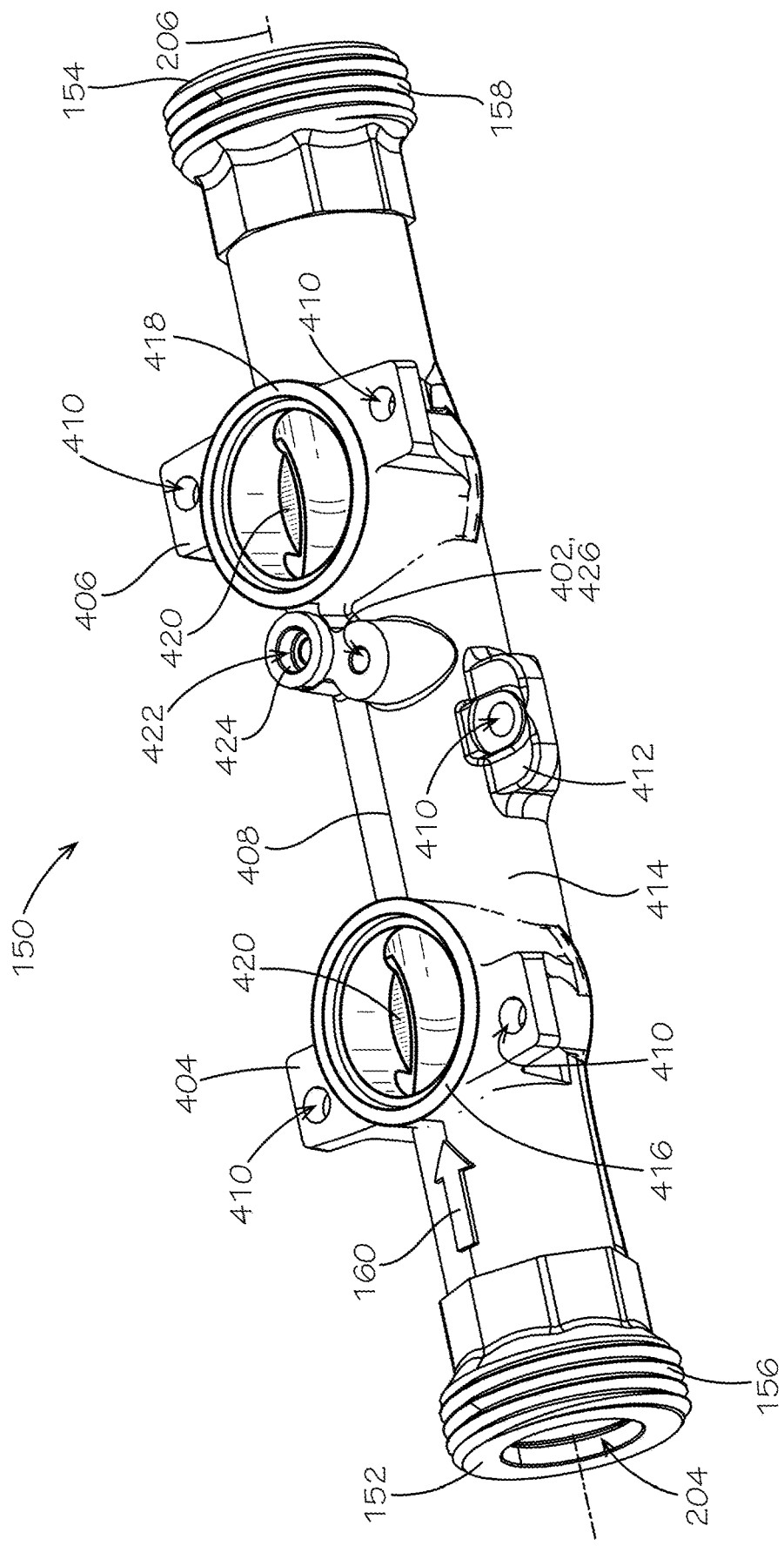
FIG. 4 is a top perspective view of a flow tube of the ultrasonic flow meter assembly of FIG. 3A.

FIG. 4 illustrates an example aspect of the flow tube 150. The flow tube 150 can be substantially cylindrical and can define the inlet end 152 and outlet end 154. The inlet threaded portion 156 can be formed at the inlet end 152 and the outlet threaded portion 158 can be formed at the outlet end 154. The flow channel 204 can be formed through the flow tube 150 and can extend from the inlet end 152 to the outlet end 154. The flow channel 204 can define the flow axis 206 extending centrally therethrough. As shown, the flow tube 150 can define another one of the directional arrows 160 formed thereon to indicate the direction of fluid flow through the flow channel 204. Example aspects of the flow tube 150 can further define a first meter mount 404 and a second meter mount 406 axially spaced from the first meter mount 404. Each of the first and second meter mounts 404, 406 can be disposed at a top side 408 of the flow tube 150, relative to the orientation shown, and can define one or more tube fastener holes 410 formed therethrough. One of the housing fasteners 120 (shown in FIG. 1B) can extend through each of the tube fastener holes 410 and can engage the meter housing 112 (shown in FIG. 1) to couple the ultrasonic flow meter 110 (shown in FIG. 1) to the flow tube 150. Some aspects of the flow tube 150 can further comprise a third meter mount 412 extending from a rear side 414 of the flow tube 150, relative to the orientation shown. The third meter mount 412 can define one or more of the tube fastener holes 410 formed therethrough to allow for further securing the ultrasonic flow meter 110 to the flow tube 150.

A first tube reflector opening 416 can be formed through flow tube 150 at the first meter mount 404, and a second tube reflector opening 418 can be formed through the flow tube 150 at the second meter mount 406. The first and second tube reflector openings 416, 418 can be in fluid communication with and can allow access to the flow channel 204. The first and second reflectors 220a,b (shown in FIG. 2) and the first and second reflector mounts 210a,b (shown in FIG. 2) can be received through the first and second tube reflector openings 416, 418, respectively. In some aspects, the flow tube 150 can comprise one or more reflector support ledges 420 aligned with each of the first and second tube reflector openings 416, 418 and configured to support the corresponding reflectors 220 and reflector mounts 210 within the flow channel 204. For example, in the present aspect, a pair of the reflector support ledges 420 can be aligned with each of the first and second tube reflector openings 416, 418. Each of the reflector support ledges 420 can be substantially coplanar to ensure that each of the reflectors 220 are supported at the proper angle within the flow channel 204.

Example aspects of the flow tube 150 can further comprise a pressure sensor channel 422 extending therethrough and in fluid communication with the flow channel 204. Fluid within the flow channel 204 can flow into and through the pressure sensor channel 422 to the pressure sensor 360 (shown in FIG. 3), and the pressure sensor 360 can detect the pressure of the fluid. In some aspects, a tube pressure packing groove 424 can be defined in the pressure sensor channel 422. The tube pressure packing groove 424 can receive a first pressure packing 1910 (shown in FIG. 19) therein, which can seal with a ferrule 1310 (shown in FIG. 13) of the pressure sensor 360 to prevent fluid from leaking into the interior 202 (shown in FIG. 2) of the meter housing 112. The flow tube 150 further comprises a tube temperature sensor hole 426 into which the temperature sensor 260 can extend. The tube temperature sensor hole 426 may or may not extend fully to the flow channel 204. In the present aspect, the tube temperature sensor hole 426 can be the blind hole 402 and does not extend to the flow channel 204, and the temperature sensor 260 can detect the temperature of the fluid in the flow channel 204 through the brass of the flow tube 150.

Figure 5:
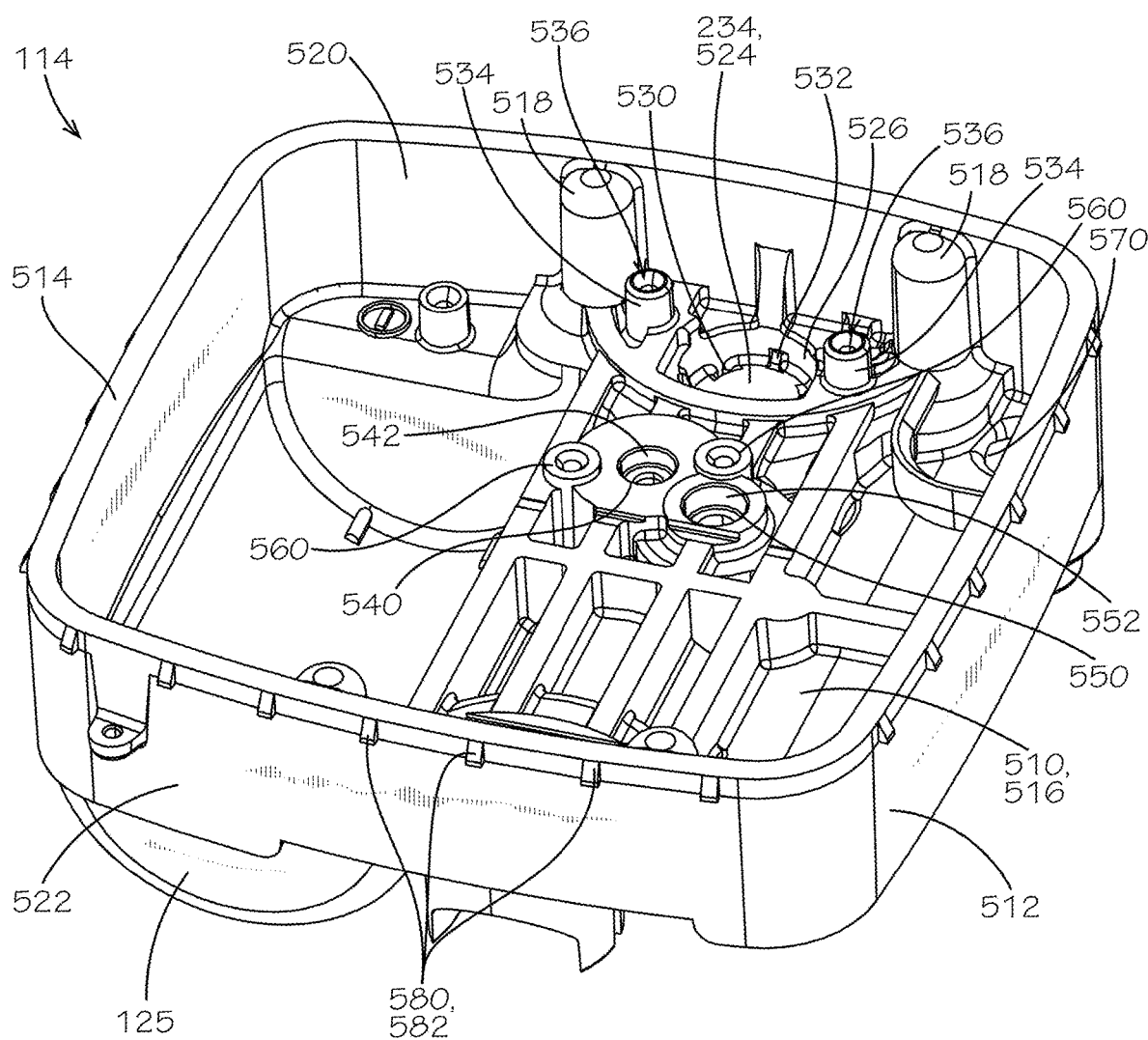
FIG. 5 is a top perspective view of a lower housing of the ultrasonic flow meter assembly of FIG. 3A.
Figure 6:
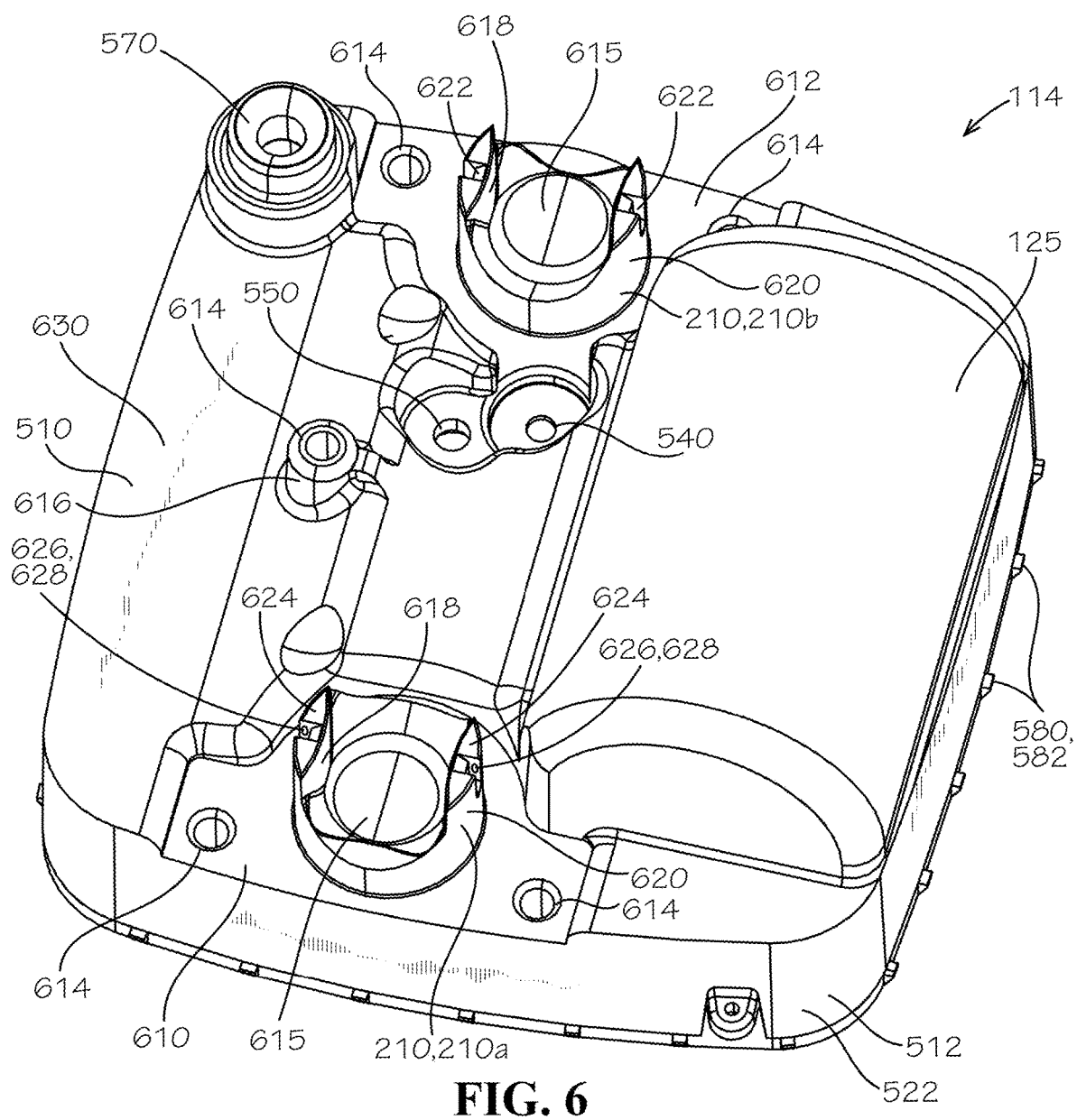
FIG. 6 is a bottom perspective view of the lower housing of FIG. 5.

FIGS. 5 and 6 illustrate top and bottom perspective views of the lower housing 114, respectively. Referring to FIG. 5, the lower housing 114 can define a housing bottom wall 510 and a substantially rectangular lower sidewall 512 extending from the housing bottom wall 510. The housing bottom wall 510 can define a bottom wall inner surface 516 and a bottom wall outer surface 630 (shown in FIG. 6). The lower sidewall 512 can define a sidewall inner surface 520 and a sidewall outer surface 522. The bottom wall inner surface 516 and the sidewall inner surface 520 can at least partially define the interior 202 (shown in FIG. 2) of the meter housing 112 (shown in FIG. 2). According to example aspects, the piezo mounts 234 can be defined by the bottom wall inner surface 516. Each of the piezo mounts 234 can be configured to align with a corresponding one of the tube reflector openings of the flow tube 150 (shown in FIG. 4). Each of the piezo mounts 234 can define a piezo mounting surface 524 and a piezo sidewall 526 extending from the piezo mounting surface 524, both of which are formed as part of the bottom wall inner surface 516. Each of the first and second piezoelectric transducer 230a,b can be received in a corresponding one of the piezo mounts 234. One or more release indentures 530 can be defined at or near a circumference of the piezo mounting surface 524. Additionally, a piezo alignment feature, such as an alignment ridge 532, can extend radially inward from the piezo sidewall 526, as shown. The piezo alignment feature can be configured to engage a mating piezo alignment feature, such as an alignment recess 1005 (shown in FIG. 10), of the corresponding piezo housing 236 (shown in FIG. 2) to properly orient the piezo housing 236 within the piezo mount 234. One or more piezo fastener bosses 534 can extend from the bottom wall inner surface 516 of the housing bottom wall 510, adjacent to the piezo mount 234. Each of the piezo fastener bosses 534 can define a piezo fastener hole 536 configured to receive a piezo fastener 920 (shown in FIG. 9) therethrough to secure the corresponding piezo housing 236 to the lower housing 114.

According to example aspects, the housing bottom wall 510 can define a pressure sensor hole 540 formed therethrough. The pressure sensor hole 540 can be aligned with the pressure sensor channel 422 (shown in FIG. 4) formed through the flow tube 150. Example aspects of the pressure sensor hole 540 can define a housing pressure packing groove 542 configured to receive a second pressure packing 1912 (shown in FIG. 19) therein. The second packing can seal with the ferrule 1310 (shown in FIG. 13) of the pressure sensor 360 (shown in FIG. 3B) to further prevent fluid from leaking into the interior 202 of the meter housing 112. The housing bottom wall 510 can further define a housing temperature sensor hole 550 formed therethrough. The housing temperature sensor hole 550 can be a through-hole and can be aligned with the blind tube temperature sensor hole 426 formed in the flow tube 150. In example aspects, the temperature sensor can be press-fit into the housing temperature sensor hole 550. The housing temperature sensor hole 550 can define a temperature packing groove 552 configured to receive a temperature packing 2010 (shown in FIG. 20). The temperature packing 2010 can seal with the temperature sensor 260 (shown in FIG. 2) to seal the interior 202 of the meter housing 112 off from the tube temperature sensor hole 426 (shown in FIG. 4), as described in further detail below.

Additionally, the housing bottom wall 510 can define one or more cover fastener holes 560. In the present aspect, the housing bottom wall 510 defines one of the cover fastener holes 560 on either side of the pressure sensor hole 540. Each of the cover fastener holes 560 can be configured to receive a cover fastener 930 (shown in FIG. 9) therein, such as a screw or bolt, to secure the PCB 240 (shown in FIG. 3B) and the PCB cover 270 (shown in FIG. 3B) to the lower housing 114. Each of the cover fastener holes 560 can be blind holes, as shown. However, in other aspects, the cover fastener holes 560 may be through holes. Example aspects of the lower housing 114 can further define a cable entrance hole 570 extending through the housing bottom wall 510. The cable entrance hole 570 can allow for the passage of a radio cable, such as an AMI cable, therethrough. The AMI cable can be sealed with the lower housing 114 to prevent leakage of fluid into meter housing 112 through the cable entrance hole 570. For example, in some aspects, the AMI cable can be sealed with the lower housing 114 by an adhesive, such as a Loctite® holt melt adhesive. In other aspects, the AMI cable can be sealed with in the lower housing 114 by any other suitable sealing techniques known in the art. Example aspects of the lower housing 114 can further comprise one or more attachment projections 580, such as barbs 582, extending from the sidewall outer surface 522 at or near a top side 514 of the lower sidewall 512, distal to the housing bottom wall 510. The barbs 582 can be spaced about a periphery of the lower sidewall 512, as shown. Each of the attachment projections 580 can be configured to engage a corresponding attachment recess 2510 (shown in FIG. 25) formed in the upper housing 116 (shown in FIG. 1A) to secure the upper housing 116 to the lower housing 114, as described in further detail below.

Furthermore, in example aspects, one or more housing bosses 518 can extend upward from the housing bottom wall 510 along the sidewall inner surface 520, as shown. Referring to FIG. 6, the bottom wall outer surface 630 can define first and second mounting surfaces 610, 612 configured to rest on the first and second meter mounts 404, 406 (shown in FIG. 4) of the flow tube 150 (shown in FIG. 1A). Each of the first and second mounting surfaces 610, 612 can define one or more housing fastener holes 614 that can extend into a corresponding one of the housing bosses 518. Each of the housing fastener holes 614 can be configured to align with a corresponding one of the tube fastener holes 410 (shown in FIG. 4) of the first and second meter mounts 404, 406. In the present aspect, the lower housing 114 can further define a housing fastener boss 616 extending from the bottom wall outer surface 630 between the first and second mounting surfaces 610, 612. The housing fastener boss 616 can further define another one of the housing fastener holes 614, which can be configured to align with the tube fastener hole 410 of the third meter mount 412 of the flow tube 150. Each of the housing fasteners 120 (e.g., the housing bolts 122, shown in FIG. 1B) can extend through one of the tube fastener holes 410 and into the corresponding housing fastener 120 hole to secure the lower housing 114 to the flow tube 150 (shown in FIG. 1A).

The first and second reflector mounts 210a,b can extend from the bottom wall outer surface 630 of the lower housing 114. In the present aspect, the first and second reflector mounts 210a,b can extend from the first and second mounting surfaces 610, 612, respectively, and can be aligned with a corresponding target surface 615 of the bottom wall outer surface 630, as shown. Each of the target surfaces 615 can be disposed opposite the piezo mounting surface 524 (shown in FIG. 5) of the corresponding piezo mount 234 (shown in FIG. 5). Each of the reflectors 220 (shown in FIG. 2), when mounted on the corresponding reflector mount 210, can be oriented to aim ultrasonic signals reflected off of the reflectors 220 at the corresponding target surface 615. That is, when an ultrasonic signal is transmitted from first reflector 220a to the second reflector 220b, the second reflector 220a can then reflect the ultrasonic signal towards the corresponding target surface 615, and vice versa. In some aspects, such as the present aspect, each of the first and second reflector mounts 210a,b can be monolithically formed with the lower housing 114. Each of the reflector mounts 210 can define a first mounting leg 618 and a second mounting leg 620. A reflector groove 622 can extend into each of the first and second mounting legs 618, 620 at a free end 624 thereof, distal to the bottom wall outer surface 630. The reflector groove 622 can be oriented about perpendicular to the housing bottom wall 510 and can be about perpendicular to the flow axis 206 when the lower housing 114 is secured to the flow tube 150 (shown in FIG. 1A). In example aspects, each of the reflector grooves 622 can define one or more mount retaining features 626 formed therein. The mount retaining features 626 can be, for example, a detent 628 formed within the reflector groove 622 and extending into each of the corresponding first and second mounting legs 618, 620. According to example aspects, each of the mount retaining features 626 can interact with a corresponding reflector retaining feature 710 (shown in FIG. 7) of one of the reflectors 220 (shown in FIG. 7) to secure the corresponding reflector to the first or second reflector mount 210a,b.

Figure 7:
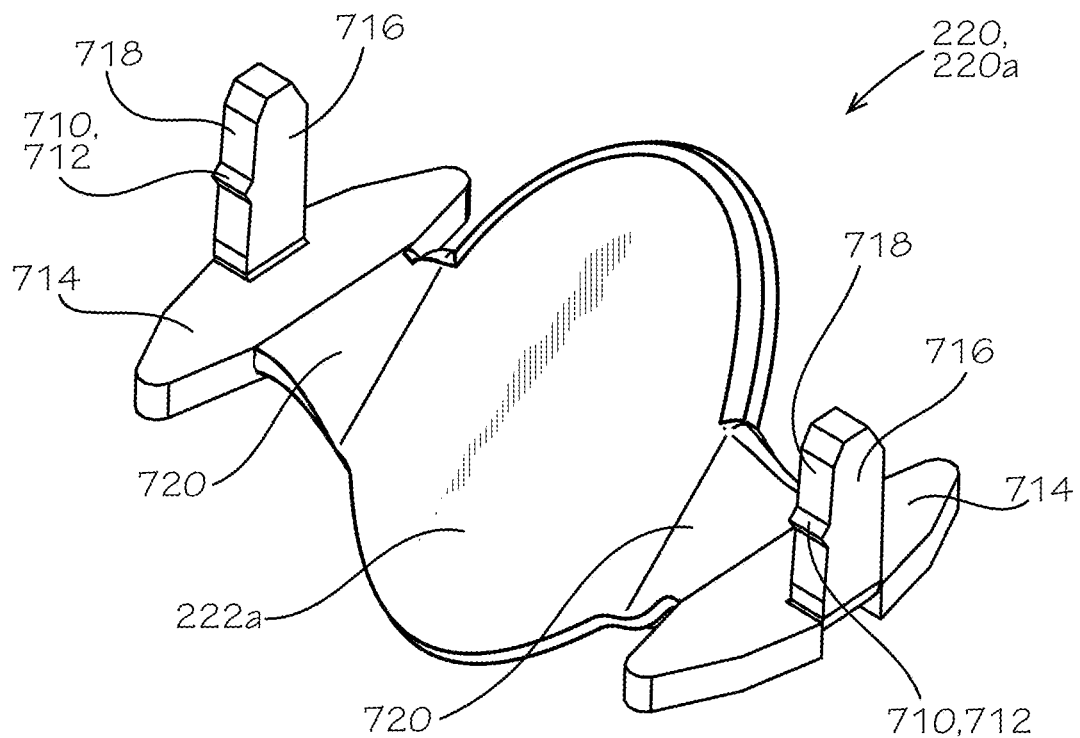
FIG. 7 is a perspective view of a reflector of the ultrasonic flow meter assembly of FIG. 3A.

FIG. 7 illustrates one of the reflectors, in accordance with an example aspect of the disclosure. The first reflector 220a is shown in the present aspect, and the second reflector 220b (shown in FIG. 2) can be substantially the same as the first reflector 220a. As shown, the first reflector 220a can comprise a pair of reflector ledges 714. According to example aspects, each of the reflector ledges 714 can be supported on a corresponding one of the reflector support ledges 420 (shown in FIG. 4) of the flow tube 150 (shown in FIG. 1A) when the ultrasonic flow meter 110 (shown in FIG. 1A) is assembled with the flow tube 150. A reflector tab 716 can extend upward from each of the reflector ledges 714, relative to the orientation shown. One of the reflector retaining features 710 can be defined on each of the reflector tabs 716. In the present aspect, each of the reflector retaining features 710 can be defined as a tab projection 712 extending from a side tab surface 718 of the corresponding reflector tab 716.

The first reflector 220a can further define the first reflective surface 222a, which can be substantially smooth in the present aspect. The first reflective surface 222a can be twisted relative to the reflector ledges 714 at twist joints 720, as shown. The first reflective surface 222a can be angled at about 45° relative to the reflector ledges 714. According to example aspects, at least the first reflective surface 222a of the first reflector 220a can comprise a reflective material suitable for reflecting ultrasonic signals. In some aspects, the entire first reflector 220a can comprise the reflective material. The reflective material can be comprise, for example and without limitation, stainless steel, and more specifically, in some aspects, the first reflector 220a can be formed from stamped stainless steel, which can reduce manufacturing costs. Other aspects of the first reflector 220a can comprise any other suitable reflective material known in the art. Furthermore, in other aspects only a portion of the first reflector 220a may comprise the reflective material. For example, in some aspects, only the first reflective surface 222a can comprise the reflective material. In other aspects, at least the first reflective surface 222a may be coated in a reflective material.

Figure 8:
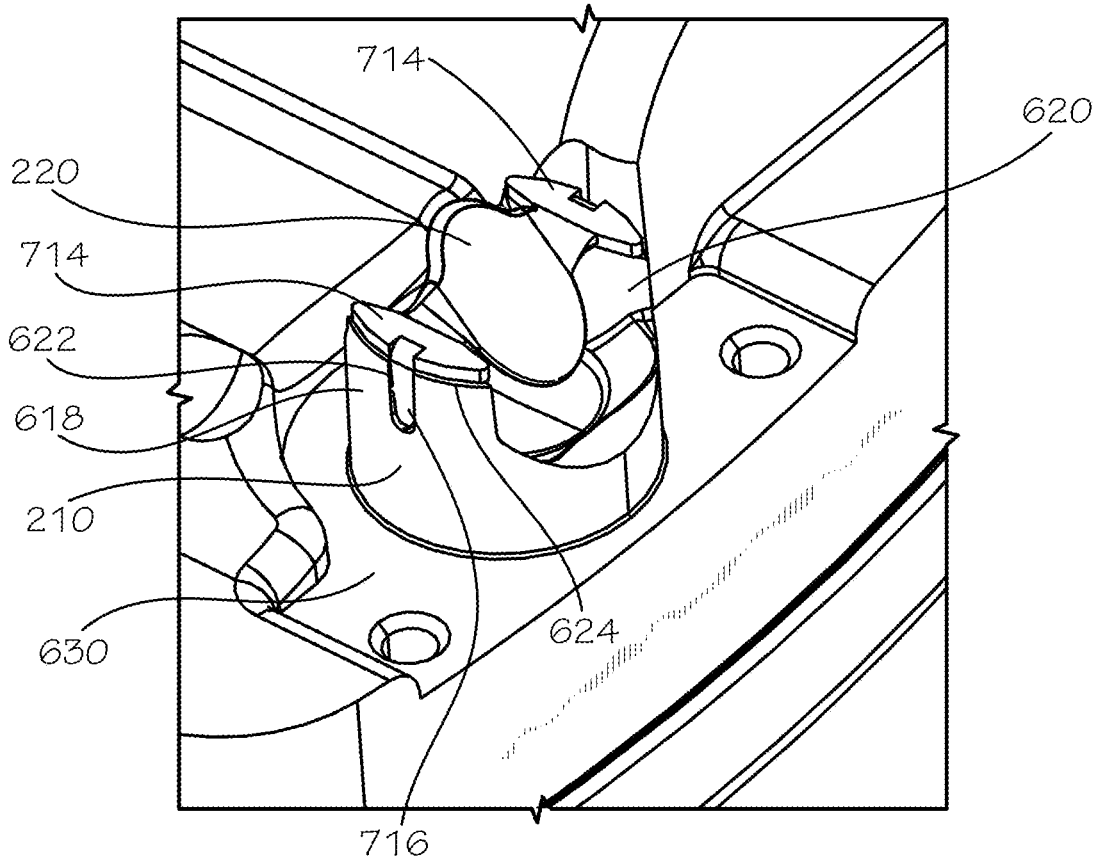
FIG. 8 is a perspective view of the reflector of FIG. 7 mounted to the lower housing of FIG. 5.

FIG. 8 illustrates one of the reflectors mounted to the corresponding reflector mount 210. As shown, the reflector mount 210 can extend from the bottom wall outer surface 630 and can define the first mounting leg 618 and the second mounting leg 620. Each of the first and second mounting legs 618, 620 can define the corresponding reflector groove 622. The reflector can comprise the reflector tabs 716, and each of the reflector tabs 716 can be inserted into a corresponding one of the reflector grooves 622. In some example aspects, the reflector ledges 714 of the reflector can abut the free ends 624 of the corresponding first and second mounting legs 618, 620. In some example aspects, the reflector can be retained on the reflector mount 210 by an interference fit between the reflector tabs 716 and the corresponding first and second mounting legs 618, 620. Furthermore, each of the reflector retaining features 710 (shown in FIG. 7) can engage a corresponding one of the mount retaining features 626 (shown in FIG. 6) to further secure the reflector to the reflector mount 210.

Figure 9:
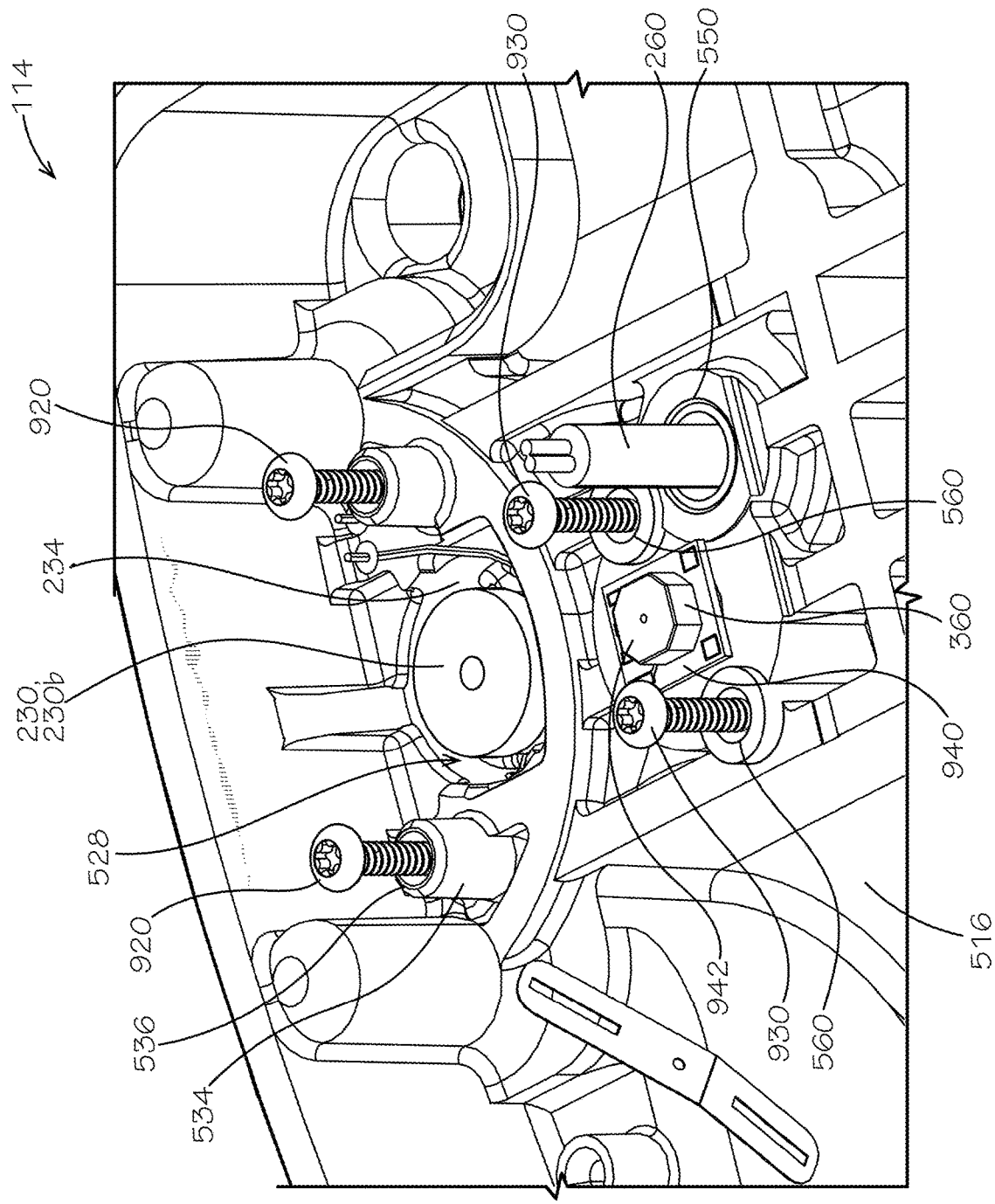
FIG. 9 is a perspective view of a piezo mount of the lower housing of FIG. 5.

FIG. 9 illustrates a detail view of the bottom wall inner surface 516 of the lower housing 114. In the present view, the second piezoelectric transducer 230b is shown disposed within corresponding piezo mount 234. The piezo housing 236 (shown in FIG. 2) is removed for visibility of the piezoelectric transducer 230. The piezoelectric transducer 230 can contact the piezo mounting surface 524 (shown in FIG. 5) of the piezo mount 234. The piezo fasteners 920 can engage the corresponding piezo fastener holes 536 of the piezo fastener bosses 534 to couple the piezo housing 236 to the lower housing 114, and to secure the piezoelectric transducer 230 between the piezo housing 236 and the piezo mounting surface 524, as described in further detail below. The PCB 240 (shown in FIG. 2) and the PCB cover 270 (shown in FIG. 2) are also removed for visibility of the bottom wall inner surface 516. As shown, the cover fasteners 930 can engage the corresponding cover fastener holes 560 to couple the PCB 240 and the PCB cover 270 to the lower housing 114. FIG. 9 also illustrates the pressure sensor 360 and the temperature sensor 260 assembled with the lower housing 114. A portion of the temperature sensor 260 can be press-fit into the housing temperature sensor hole 550. Furthermore, the ferrule 1310 (shown in FIG. 13) of the pressure sensor 360 can extend into, and in some aspects can extend through, the pressure sensor hole 540 (shown in FIG. 5). The ferrule 1310 can extend from an attachment pad 940 of the pressure sensor 360, and the attachment pad 940 can rest atop the bottom wall inner surface 516 of the housing bottom wall 510 (shown in FIG. 5). A sensing element 942 of the pressure sensor 360 can be secured to the attachment pad 940 opposite the ferrule 1310. According to example aspects, the attachment pad 940 can be coupled to the PCB 240, as described in further detail below. For example, in some aspects, the attachment pad 940 can be soldered to the PCB 240.

Figure 10:
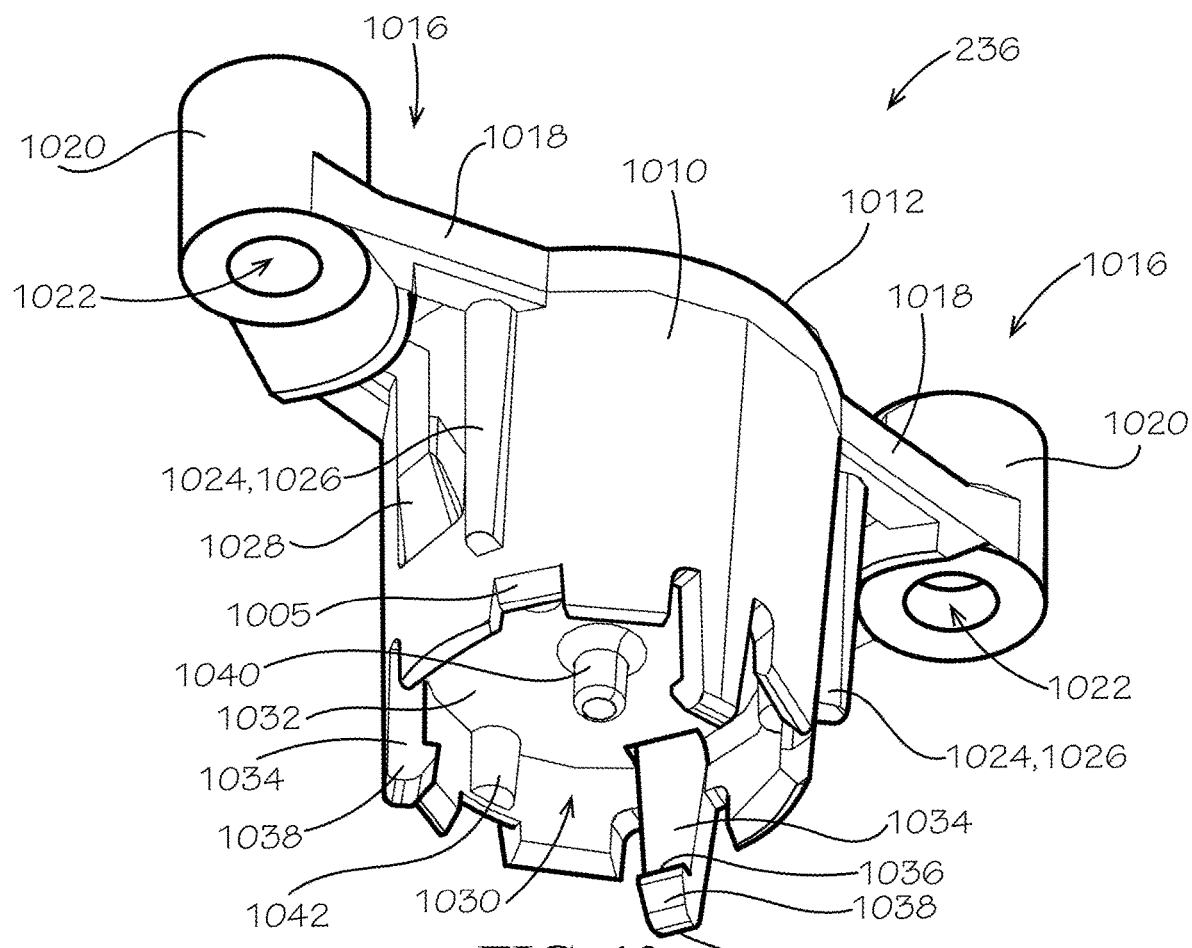
FIG. 10 is a perspective view of a piezo housing of the of the ultrasonic flow meter assembly of FIG. 3A.

FIG. 10 illustrates the piezo housing 236 according to an example aspect of the present disclosure. Example aspects of the piezo housing 236 can be formed from a plastic material. In other aspects, the piezo housing 236 can be formed from any other suitable material known in the art. As shown, the piezo housing 236 defines a substantially cylindrical housing body 1010. The housing body 1010 defines an upper end 1012 and a lower end 1014 opposite the upper end 1012. A pair of housing mounts 1016 can extend substantially radially outward from the cylindrical housing body 1010 at the upper end 1012 thereof. The housing mounts 1016 can be disposed substantially opposite one another. Each of the housing mounts 1016 can define a housing arm 1018 extending from the housing body 1010 and a mounting boss 1020 coupled to the housing arm 1018 distal to the housing body 1010. A piezo fastener bore 1022 can be defined through each of the mounting bosses 1020. In example aspects, each of the piezo fastener bores 1022 can be configured to align with a corresponding one of the piezo fastener holes 536 (shown in FIG. 5) formed in the piezo fastener bosses 534 (shown in FIG. 5) defined by the lower housing 114 (shown in FIG. 1A). One of the piezo fasteners 920 (shown in FIG. 9) can extend through each corresponding piezo fastener bore 1022 and piezo fastener hole 536 to secure the piezo housing 236 to the lower housing 114. In some aspects, the housing arms 1018 can be configured to bend or flex slightly relative to the housing body 1010 as the piezo fasteners 920 are tightened, as described in further detail below.

Example aspects of the piezo housing 236 can comprise the alignment recess 1005 configured to the mate with the alignment ridge 532 (shown in FIG. 5) of the lower housing 114 to properly align the piezo housing 236 with the piezo mount 234 of the lower housing 114. The piezo housing 236 can also define a PCB alignment feature 1024, such as one or more alignment ribs 1026, which can extend along a side of the piezo housing 236. The PCB alignment feature 1024 can be configured to engage a mating PCB alignment feature 1206 (shown in FIG. 12), such as one or more alignment slots 1208 (shown in FIG. 12) of the PCB 240 (shown in FIG. 2) to properly orient the piezo housing 236 relative to the PCB 240. The piezo housing 236 can also define one or more housing spring arms 1028 that can be naturally biased radially outward from the cylindrical housing body 1010, as shown.

The piezo housing 236 can further define a piezo indenture 1030 formed at the lower end 1014 of the piezo housing 236 configured to receive the corresponding first or second piezoelectric transducer 230*a,b* (shown in FIG. 2) therein. The piezo housing 236 can comprise an upper wall 1032, and the upper wall 1032 can at least partially define the piezo indenture 1030. In example aspects, one or more retainer clips 1034 can extend substantially downward from the upper wall 1032, relative to the orientation shown. Each of the retainer clips 1034 can define a shoulder 1036 extending radially inward at or near a distal clip end 1038 of the retainer clip 1034. The shoulders 1036 can be configured to engage the corresponding first or second piezoelectric transducer 230*a,b* to retain the first or second piezoelectric transducer 230*a,b* within the piezo indenture 1030. In some aspects, the retainer clips 1034 can be flexible, or can be semi-rigid with some flexibility. When assembling the piezo housing 236 with the lower housing 114, the distal clip end 1038 of each retainer clip 1034 can engage a corresponding one of the release indentures 530 (shown in FIG. 5) of the lower housing 114. Each of the release indentures 530 can define a ramped surface that can bias the distal clip ends 1038 of the retainer clips 1034 radially outward. In the present aspect, the ramped surface can slope radially outward from the piezo mounting surface 524 (shown in FIG. 5) towards the piezo sidewall 526. For example, in some aspects, tightening the piezo fasteners 920 can push the lower end 1014 of the piezo housing 236 downward into the piezo mount 234 (shown in FIG. 2) of the lower housing 114, thereby pushing the distal clip ends 1038 of the retainer clips 1034 downward into the release indentures 530. As the retainer clips 1034 are biased radially outward, the shoulders 1036 of the retainer clips 1034 can disengage the piezoelectric transducer 230, allowing the piezoelectric transducer 230 to contact the piezo mounting surface 524.

Example aspects of the piezo housing 236 can define a piezo post 1040 extending downward from a center of the upper wall 1032, into the piezo indenture 1030. The corresponding piezoelectric transducer 230 can be positioned between the piezo post 1040 and the shoulder 1036 of the retainer clips 1034 prior to assembling the piezo housing 236 with the lower housing 114. In some aspects, the piezo housing 236 can further define one or more leveling ribs 1042 extending downward from the upper wall 1032 at or near a periphery of the upper wall 1032. The leveling ribs 1042 can ensure that the piezoelectric transducer 230 remains level within the piezo indenture 1030. When the piezo housing 236 is assembled with the lower housing 114, the piezoelectric transducer 230 can be sandwiched between the piezo mounting surface 524 and the piezo post 1040. The piezo fasteners 920 can be tightened to press the piezo post 1040 downward against the piezoelectric transducer 230 to produce a polarity in the piezoelectric disc 232 in the same direction. The piezo fastener 920 can be tightened as desired to set a desired force of the piezo post 1040 against the piezoelectric transducer 230. That is to say, tightening the piezo fasteners 920 to a lesser extent will result in a lessor force applied to the piezoelectric transducer 230 by the piezo post 1040, while tightening the piezo fasteners 920 to a greater extent will drive the piezo post 1040 downward against the corresponding piezoelectric transducer 230 at a greater force. Once sandwiched between the piezo post 1040 and the piezo mounting surface 524, a voltage can be supplied to the piezoelectric transducer 230 from the battery 910 (shown in FIG. 19), which can cause the corresponding piezoelectric transducer 230 to expand and contract. As the piezoelectric transducer 230 expands, the force applied by the piezo post 1040 along the polarization axis can cause the piezoelectric transducer 230 to generate an ultrasonic signal (e.g., a sound wave), which can be transmitted to the corresponding reflector through the piezo mounting surface 524. Adjusting the force applied to the piezoelectric transducer 230 by the piezo post 1040 can alter the frequency of the ultrasonic signals generated by the piezoelectric transducer 230.

Figure 11:
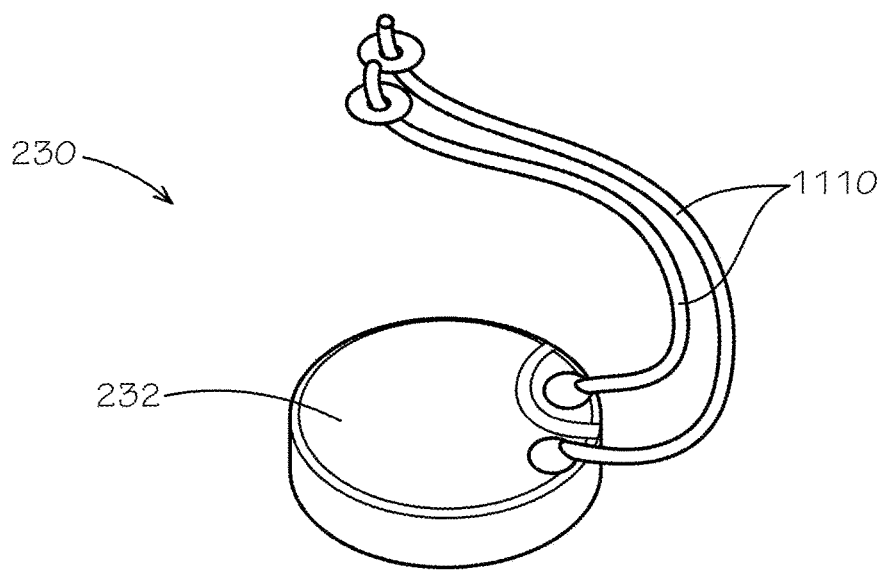
FIG. 11 is a perspective view of a piezoelectric transducer of the ultrasonic flow meter assembly of FIG. 3A.

FIG. 11 illustrates an example aspect of the piezoelectric transducer 230. The piezoelectric transducer 230 can comprise the piezoelectric material, which in the present aspect can be formed as the piezoelectric disc 232. The piezoelectric disc 232 can be received in the piezo indenture 1030 (shown in FIG. 10) of the piezo housing 236 (shown in FIG. 2) and can be sandwiched between the piezo post 1040 (shown in FIG. 10) and the piezo mounting surface 524 (shown in FIG. 5). The piezoelectric transducer 230 can further comprise a pair of wires 1110 coupled to and extending from the piezoelectric material. The wires 1110 can be coupled to the piezoelectric material by soldering, for example. One of the wires 1110 can be a ground wire, while the other wire 1110 can be a positive wire, which can supply the voltage to the piezoelectric material from the battery 910 (shown in FIG. 19). Each of the wires 1110 can be connected to the PCB 240 (shown in FIG. 2) such as by soldering. In other aspects, the wires 1110 can be connected to the PCB 240 and/or the piezoelectric disc 232 by any other suitable means.

Figure 12:
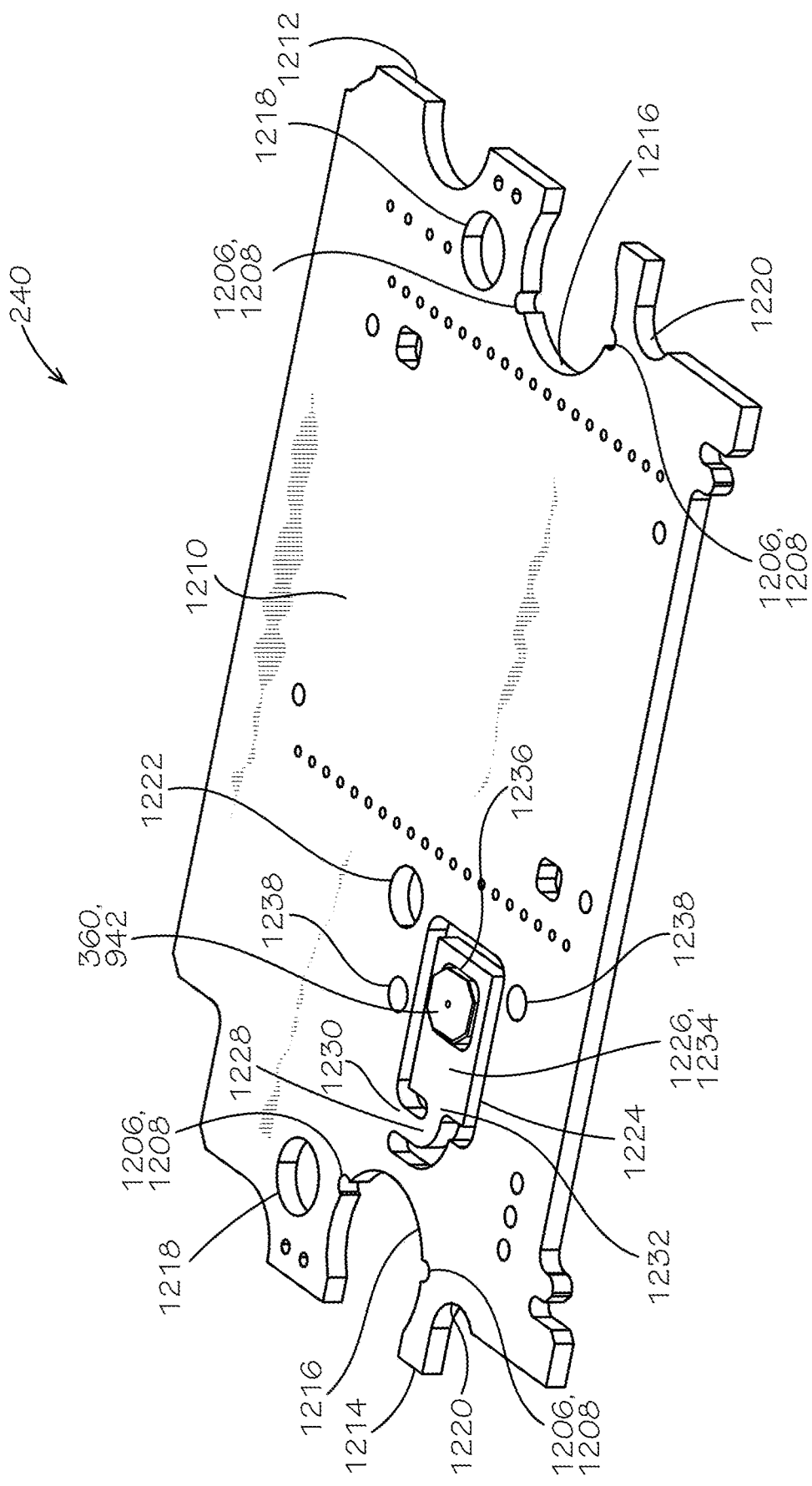
FIG. 12 is a perspective view of a printed circuit board of the ultrasonic flow meter assembly of FIG. 3A.

FIG. 12 illustrates the printed circuit board 240 (i.e., the PCB 240) in accordance with an example aspect of the present disclosure. The PCB 240 can comprise a PCB body 1210 defining a first lateral side 1212 and a second lateral side 1214. As shown, a housing cut-out 1216 can extend into each of the first and second lateral sides 1212, 1214. Each of the piezo housings 236 (shown in FIG. 2) can be configured to fit within a corresponding one of the housing cut-outs 1216. The one or more piezo alignment slots 1208 can be defined in each of the housing cut-outs 1216, which can be configured to receive the alignment ribs 1026 (shown in FIG. 10) of the piezo housing 236 to properly align the piezo housing 236 with the PCB 240. The PCB 240 can further define a fastener opening 1218 and a fastener cut-out 1220 proximate to each of the housing cut-outs 1216. Each of the fastener openings 1218 and the fastener cut-outs 1220 can be configured to receive one of the corresponding piezo fastener bosses 534 (shown in FIG. 5) therethrough. The PCB 240 can further define a temperature sensor opening 1222 through which the temperature sensor 260 (shown in FIG. 2) can extend. In example aspects, the temperature sensor 260 can be directly mounted to and electrically connected to the PCB 240 and can relay signals indicative of the detected temperature of the fluid to the PCB 240.

Example aspects of the PCB 240 can define a pressure sensor cut-out 1224 formed in the PCB body 1210. In the present aspect, the pressure sensor cut-out 1224 can be defined adjacent to one of the housing cut-outs 1216. A pressure sensor support 1226 can extend from the PCB body 1210 into the pressure sensor cut-out 1224. The pressure sensor support 1226 can be disposed within the pressure sensor cut-out 1224, and the pressure sensor cut-out 1224 can substantially surround the pressure sensor support 1226, as shown. In the present aspect, the pressure sensor support 1226 can comprise a gooseneck arm 1228 extending from the PCB body 1210 into the pressure sensor cut-out 1224 at a proximal arm end 1230 thereof. The pressure sensor support 1226 can further comprise a support island 1234 coupled to the gooseneck arm 1228 at a distal arm end 1232 thereof, opposite the proximal arm end 1230. The gooseneck arm 1228 can suspend the support island 1234 within the pressure sensor cut-out 1224 and can allow the pressure sensor support 1226 to move slightly relative to the PCB body 1210 within the pressure sensor cut-out 1224 during installation. According to example aspects, the sensing element 942 (shown in FIG. 9) of the pressure sensor 360 can be mounted within a pressure sensor opening 1236 formed through the support island 1234. In some aspects, the attachment pad 940 (shown in FIG. 9) of the pressure sensor 360 can be soldered to the support island 1234 of the PCB 240 to mount the sensing element 942 within the pressure sensor opening 1236. The PCB 240 can further define pair of PCB openings 1238, each disposed on an opposing side of the support island 1234, as shown. The corresponding cover fasteners 930 (shown in FIG. 9) can extend through the PCB openings 1238 to secure the PCB cover 270 (shown in FIG. 2) and the PCB 240 to the lower housing 114 (shown in FIG. 1A).

Figure 13:
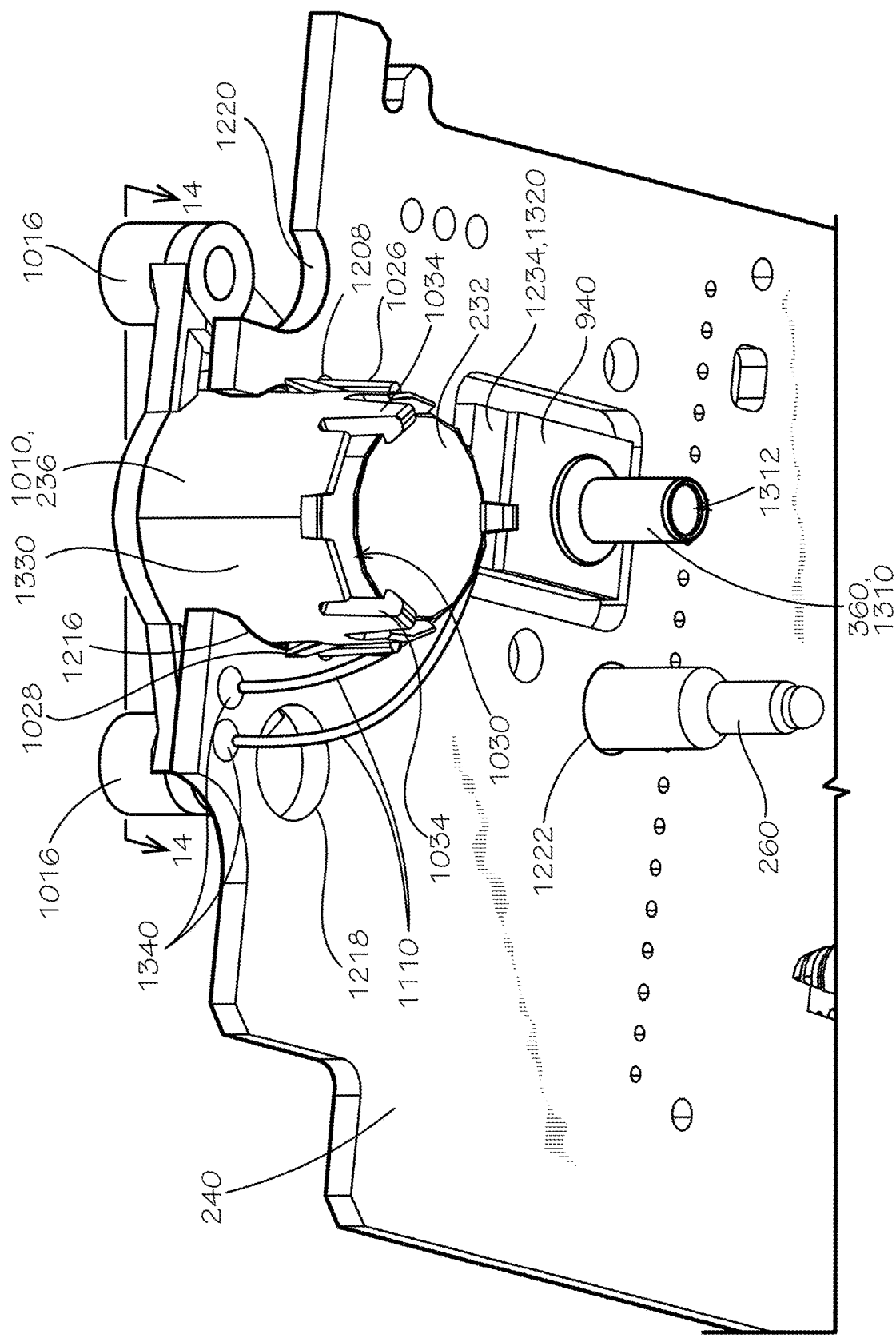
FIG. 13 is a perspective view of the piezo housing of FIG. 10 and the piezoelectric transducer of FIG. 11 assembled with the printed circuit board of FIG. 12.

FIG. 13 is a bottom perspective view of the pressure sensor 360 and the temperature sensor 260 assembled with the PCB 240. As shown, the temperature sensor 260 can extend through the temperature sensor opening 1222 of the PCB 240. The sensing element 942 (shown in FIG. 9) of the pressure sensor 360 can be mounted within the pressure sensor opening 1236 (shown in FIG. 12) of the support island 1234. The attachment pad 940 of the pressure sensor 360 can be attached to a bottom surface 1320 of the support island 1234, for example, by soldering. In other aspects, the attachment pad 940 can be coupled to the PCB 240 by any other suitable fastener or fastening technique. The ferrule 1310 of the pressure sensor 360 can extend downward from the attachment pad 940, relative to the orientation shown. As shown, the ferrule 1310 can define a ferrule channel 1312 into which fluid can flow.

Figure 14:
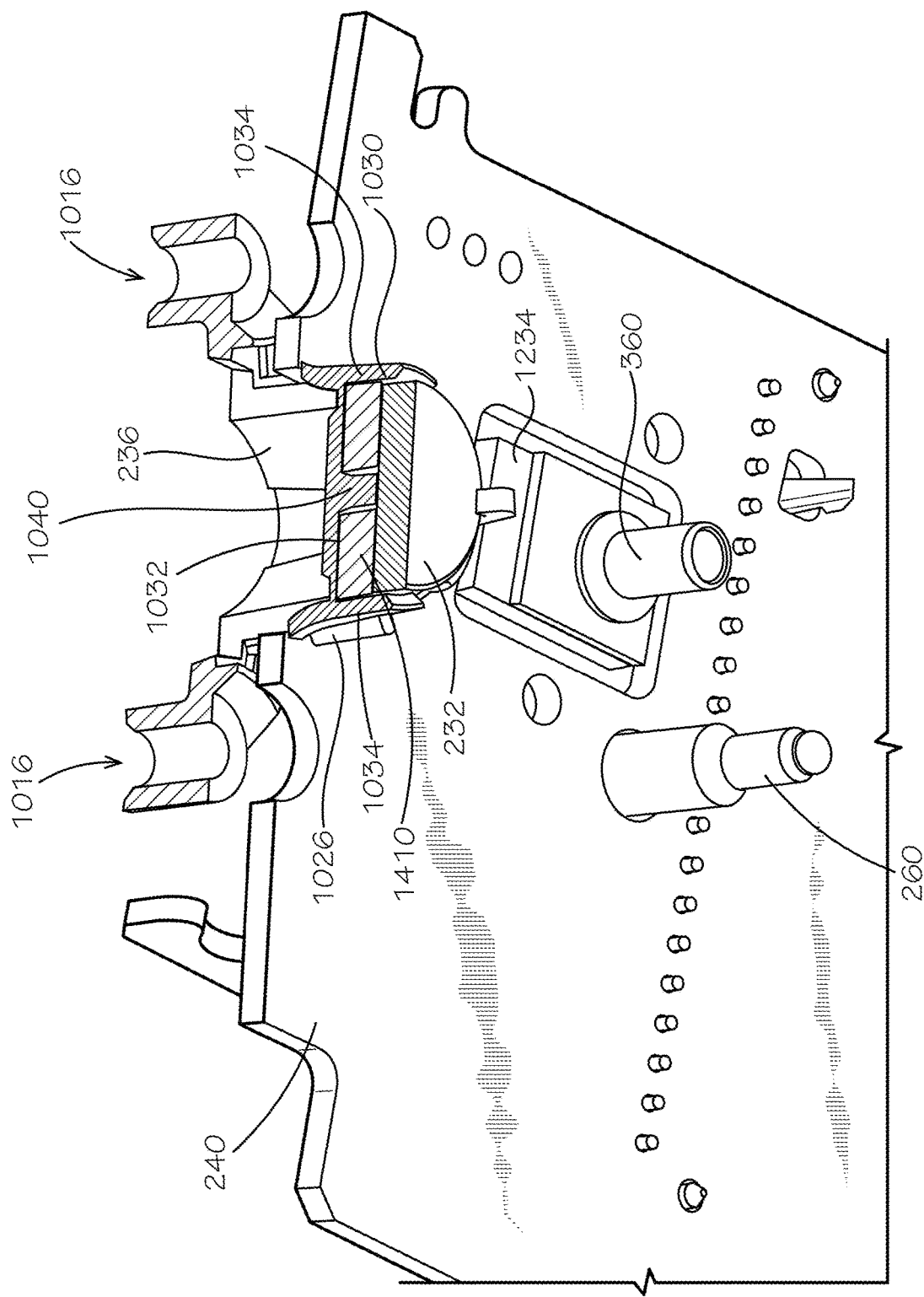
FIG. 14 is a cross-sectional view taken along line 14-14 in FIG. 13.

FIG. 13 also illustrates a bottom perspective view of the piezo housing 236 assembled with the PCB 240, and FIG. 14 illustrates a cross-sectional view of the PCB 240 and piezo housing 236 taken along line 14-14 in FIG. 13. Referring to FIG. 13, as shown, a mid-portion 1330 of the housing body 1010 can be disposed within the corresponding housing cut-out 1216 of the PCB 240. A peripheral edge of the housing cut-out 1216 can engage and bias each of the spring arms 1028 radially inward. As described above, the spring arms 1028 can be naturally biased outward, and the outward force of the spring arms 1028 against the peripheral edge of the housing cut-out 1216 can aid in retaining the piezo housing 236 in position within the housing cut-out 1216. The housing mounts 1016 can be disposed above the PCB 240 and the piezo indenture 1030 can be disposed below the PCB 240, relative to the orientation shown. One of the housing mounts 1016 can align with a corresponding one of the fastener openings 1218, and the other housing mount 1016 can align with a corresponding one of the fastener cut-outs 1220. Each of the alignment ribs 1026 of the piezo housing 236 can extend through the corresponding alignment slot 1208 of the PCB 240 to properly locate the piezo housing 236 relative to the PCB 240. The piezoelectric disc 232 of the piezoelectric transducer 230 can be received within the piezo indenture 1030 and can be retained therein by the retainer clips 1034. The wires 1110 can extend from the piezoelectric disc 232 as shown and can be soldered to PCB 240 at respective solder points 1340.

Referring to cross-sectional view of FIG. 14, the piezo post 1040 can extend downward from the center of the upper wall 1032 into the piezo indenture 1030, and the piezoelectric disc 232 can be positioned between the piezo post 1040 and the shoulders 1036 (shown in FIG. 10) of the retainer clips 1034. In some aspects, a foam backing 1410 can be disposed within the piezo indenture 1030 between the piezoelectric disc 232 and the upper wall 1032 of the piezo housing 236. The foam backing 1410 can surround the piezo post 1040, as shown. In example aspects, the interior 202 (shown in FIG. 2) of the meter housing 112 (shown in FIG. 1A) can be potted. For example, the interior 202 can be potted by filling the interior 202 with an insulating compound, such as, for example, silicone, epoxy, or any other suitable potting compound. The potting can protect the internal components housed therein from undesirable elements, such as moisture, dust, and dirt, and from movement that may dislodge or damage the internal components, such as the meter housing 112 being accidentally bumped or dropped. Potting that is contact with piezoelectric disc 232 can steal energy from the piezoelectric material. However, the foam backing 1410 can aid in insulating the piezoelectric material from the potting to prevent such an occurrence.

Figure 15:
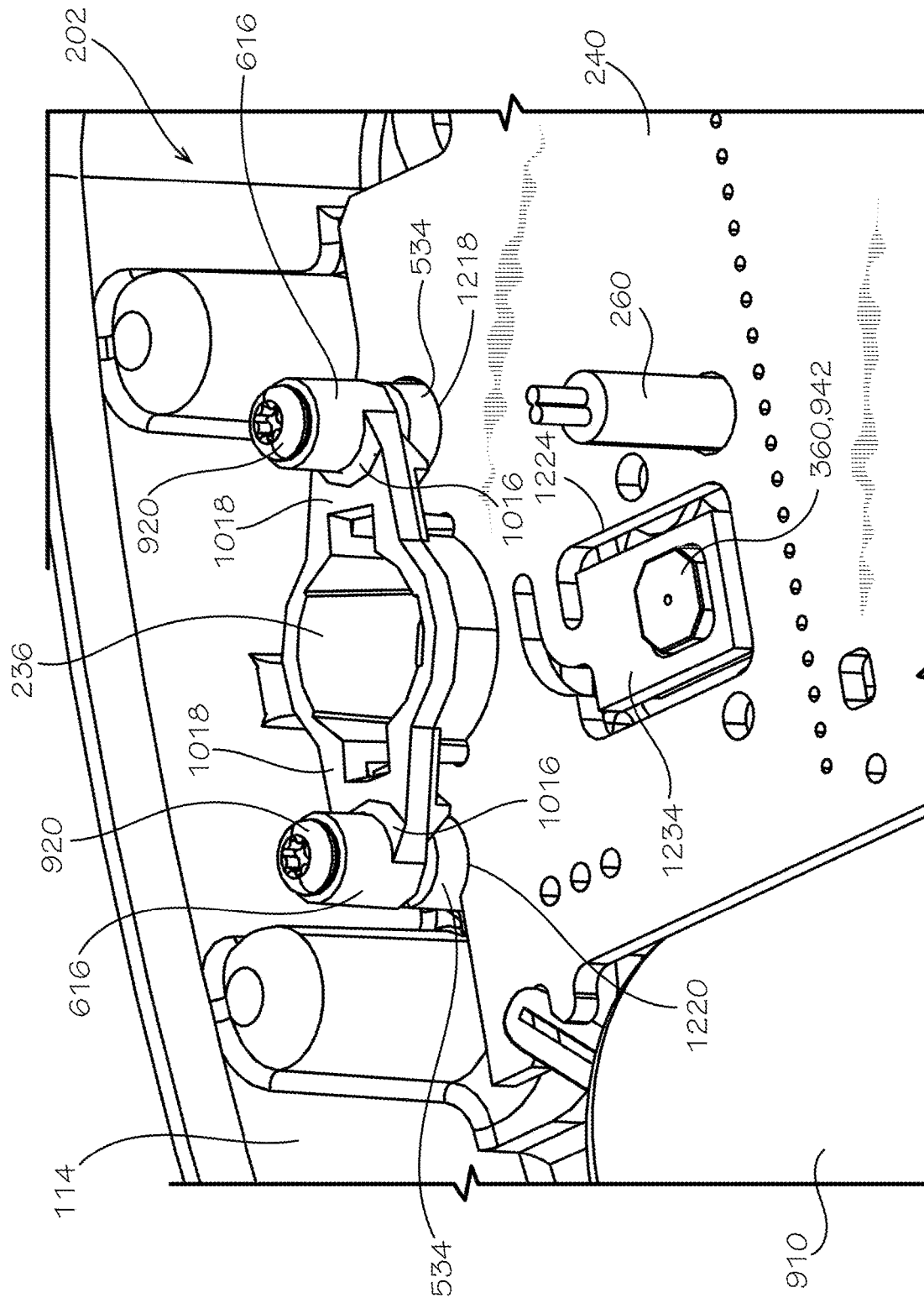
FIG. 15 is a top perspective view of the printed circuit board of FIG. 12 and the piezo housing of FIG. 10 assembled with the lower housing of FIG. 5.

FIG. 15 illustrates the PCB 240 and the piezo housing 236 assembled within the interior 202 of the lower housing 114. As shown, each of the piezo fastener bosses 534 of the lower housing 114 can extend upward through a corresponding one of the fastener openings 1218 and the fastener cut-outs 1220, relative to the orientation shown. Each of the housing fastener bosses 616 of the piezo housing 236 can align with a corresponding one of the piezo fastener bosses 534, and each of the piezo fasteners 920 can extend through an aligned pair of the housing fastener bosses 616 and the piezo fastener bosses 534. In some aspects, the housing arms 1018 of the housing mounts 1016 can deflect or bend slightly as the piezo fasteners 920 are tightened to drive the piezo post 1040 (shown in FIG. 10) downward against the piezoelectric disc 232 (shown in FIG. 2), as described in further detail below with respect to FIG. 21. The stiffness of the housing arms 1018 can determine the extent to which the housing arms 1018 can deflect, and can therefore determine the amount of force applied to the piezoelectric disc 232 by the piezo post 1040.

Figure 16:
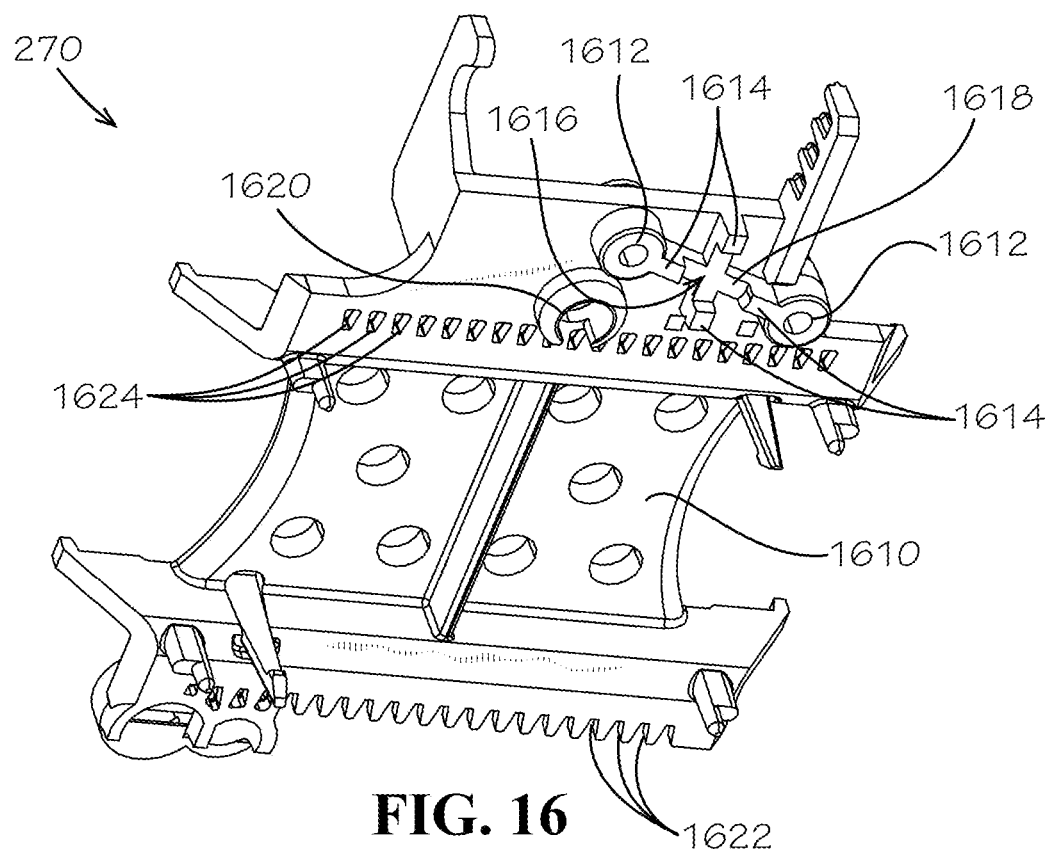
FIG. 16 is a bottom perspective view of a PCB cover of the ultrasonic flow meter assembly of FIG. 3A.
Figure 17:
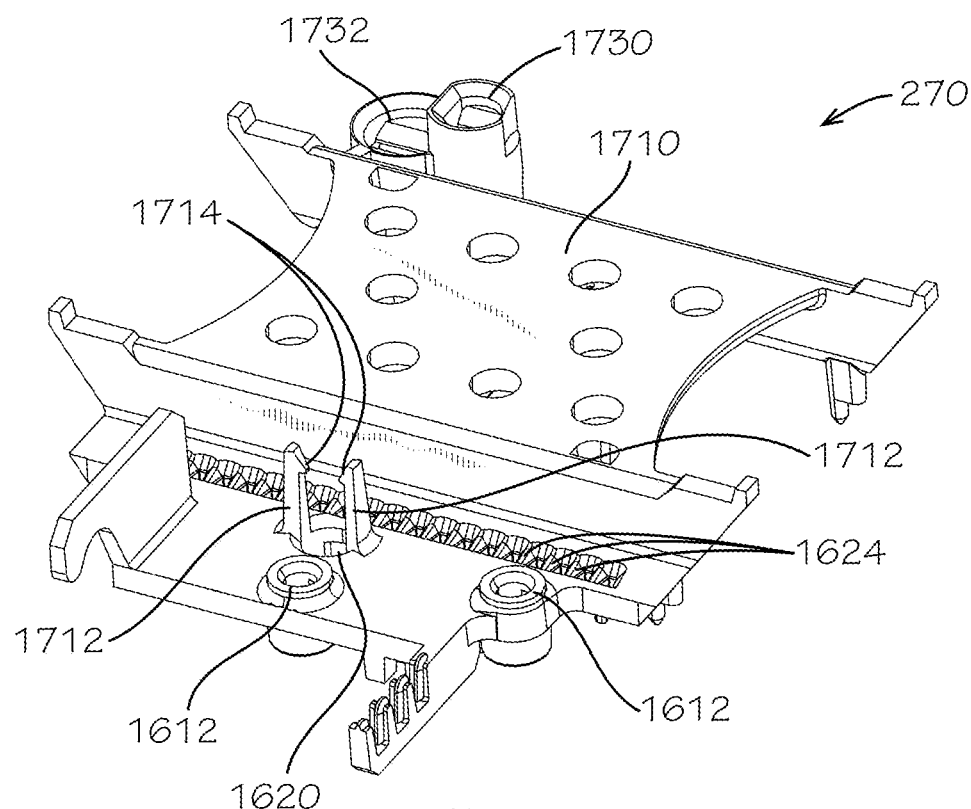
FIG. 17 is a top perspective view of the PCB cover of FIG. 16.

FIGS. 16 and 17 illustrate bottom and top perspective views of the PCB cover 270 in accordance with an example aspect of the present disclosure. The PCB cover 270 can define an upper cover surface 1710 (shown in FIG. 17) and a lower cover surface 1610. As shown, the PCB cover 270 can define a pair of cover fastener openings 1612 formed therethrough. Each of the cover fastener openings 1612 can be configured to align with a corresponding one of the PCB openings 1238 (shown in FIG. 12) and a corresponding one of the cover fastener holes 560 (shown in FIG. 5) of the lower housing 114 (shown in FIG. 1A), and can receive one of the corresponding cover fasteners 930 (shown in FIG. 9) therethrough to secure the PCB cover 270 and the PCB 240 (shown in FIG. 2) to the lower housing 114. Example aspects of the lower cover surface 1610 can define one or more PCB backing areas, such as PCB backing arms 1614 that can confront, and in some instances can contact, the support island 1234 (shown in FIG. 12) of the PCB 240 to prevent to limit the movement of the support island 1234 relative to the PCB body 1210 (shown in FIG. 12). In the present aspect, the PCB backing arms 1614 can surround the sensing element 942 (shown in FIG. 9) of the pressure sensor 360 (shown in FIG. 3B), and the lower cover surface 1610 can define a sensor clearance recess 1616 therebetween for receiving the sensing element 942. The sensor clearance recess 1616 can define a backing surface 1618 than can confront, and in some instances can contact, the sensing element 942, to further limit movement of the pressure sensor 360 and the support island 1234 relative to the PCB body 1210 during spikes in pressure.

In example aspects, the PCB cover 270 can further define a cover sensor opening 1620 through which the temperature sensor 260 (shown in FIG. 2) can extend. Furthermore, example aspects of the PCB cover 270 can further comprise a plurality of pin grooves 1622 and pin openings 1624. Each of the pin grooves 1622 and pin openings 1624 can be configured to receive a corresponding pin 2120 (shown in FIG. 21) of the LED display 280 (shown in FIG. 2) therethrough. As shown in FIG. 17, one or more sensor support arms 1712 can extend from the upper cover surface 1710 at a periphery of the cover sensor opening 1620 to provide support to and limit movement of the temperature sensor 260. Each of the sensor support arms 1712 can further define a retaining projection 1714 distal to the upper cover surface 1710, which can extend over the temperature sensor 260 to retain the temperature sensor 260 in position within the tube temperature sensor hole 426 (shown in FIG. 4) of the flow tube 150 (shown in FIG. 1). In some aspects, the sensor support arms 1712 can flex outward to allow the temperature sensor 260 to be pushed through the cover sensor opening 1620 and can then snap back to secure the temperature sensor 260 therein. Additionally, example aspects of the PCB cover can further define a first IR reader support 1730 and a second IR reader support 1732. According to example aspects, a first IR reader 2130 (i.e., a first infra-red reader, shown in FIG. 21) can be mounted on the first IR reader support 1730 and a second IR Reader 2132 (i.e., a second infra-red reader, shown in FIG. 21) can be mounted on the second IR reader support 1732.

Figure 18:
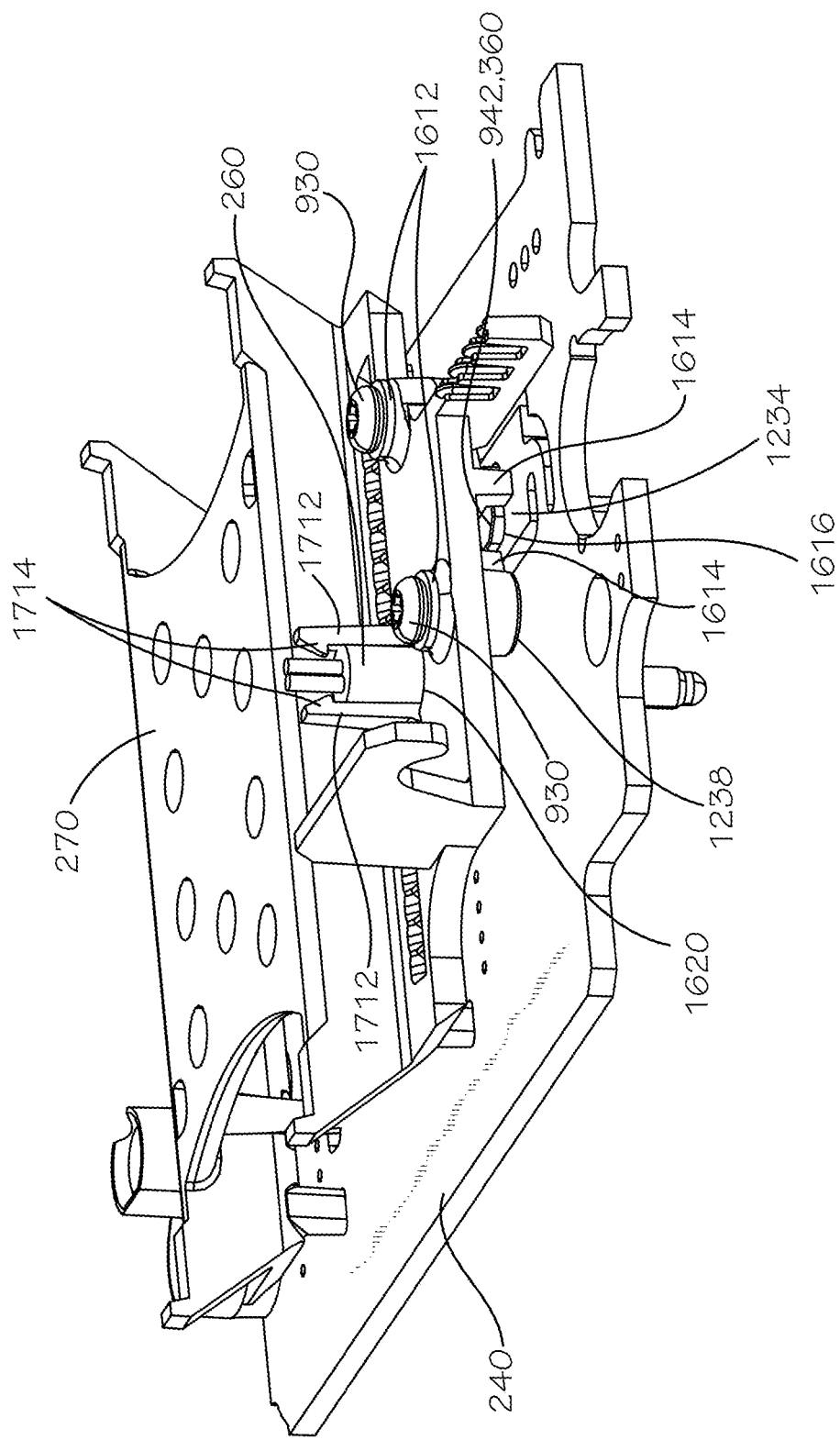
FIG. 18 is a perspective view of the PCB cover of FIG. 16 assembled with the printed circuit board of FIG. 12.

FIG. 18 is a perspective view of the PCB cover 270 assembled with the PCB 240. As shown, each of the cover fasteners 930 can extend through a corresponding one of the cover fastener openings 1612 of the PCB cover 270 and a corresponding one of the PCB openings 1238 of the PCB 240. The temperature sensor 260 can extend through the cover sensor opening 1620 of the PCB cover 270 and the sensor support arms 1712 can provide lateral support to the temperature sensor 260. The temperature sensor 260 can further extend through the temperature sensor opening 1222 (shown in FIG. 13) of the PCB 240. Furthermore, as shown, the PCB backing arms 1614 can confront, and in some instances can contact, the support island 1234 of the PCB 240 to prevent to limit the movement of the support island 1234. The sensing element 942 of the pressure sensor 360 can be received in the sensor clearance recess 1616 of the PCB cover 270.

Figure 19:
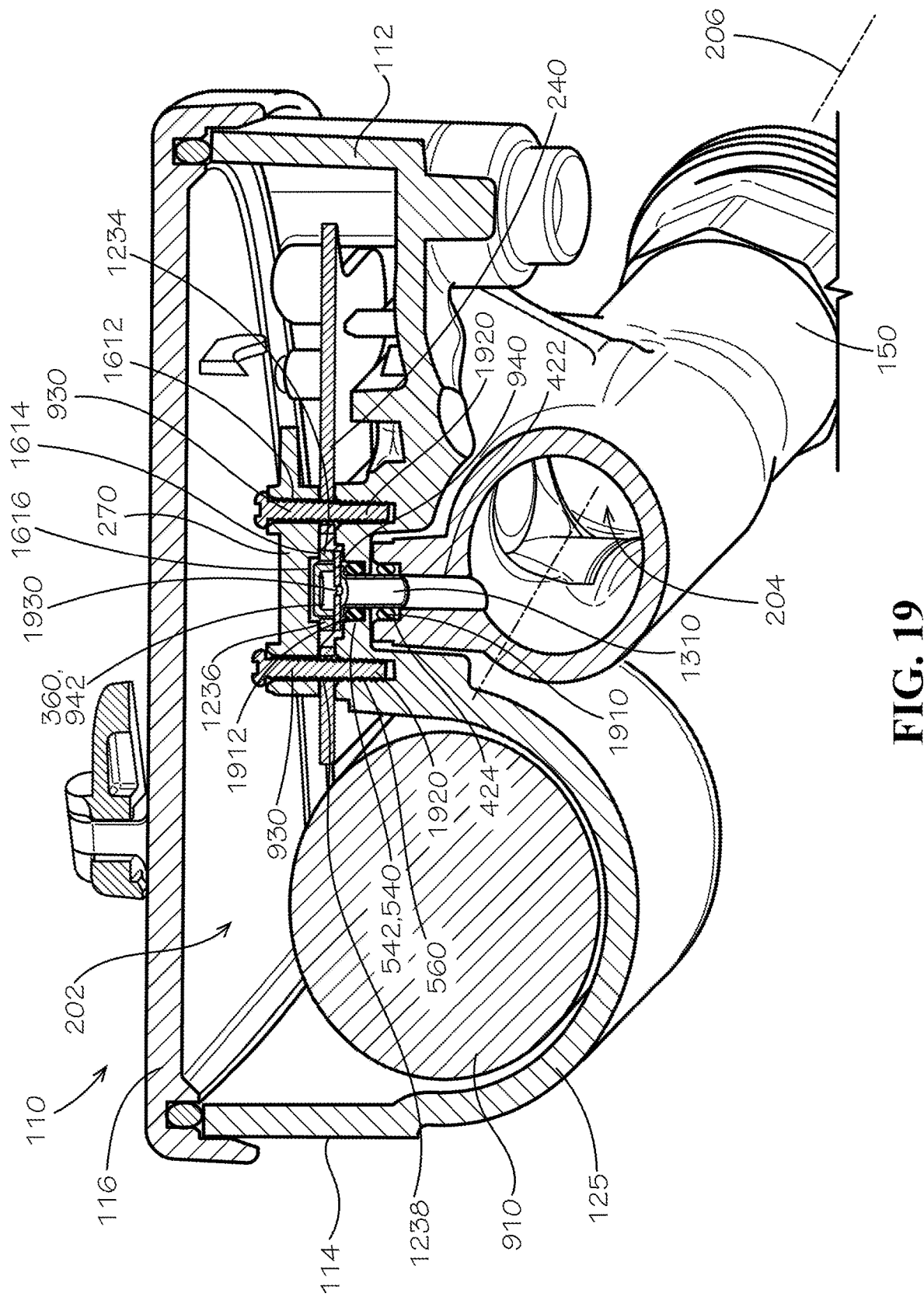
FIG. 19 is a cross-sectional view of the ultrasonic flow meter assembly of FIG. 3A, taken along line 19-19 in FIG. 3A.

FIG. 19 illustrates a cross-sectional view of the ultrasonic flow meter 110 assembled with the flow tube 150, taken along line 19-19 in FIG. 3A. As shown, the battery 910 can be received within the battery housing portion 125 of the lower housing 114. Furthermore, each of the cover fasteners 930 can extend through the corresponding cover fastener opening 1612 and PCB opening 1238 and into the corresponding cover fastener hole 560 of the lower housing 114 to secure the PCB cover 270 and the PCB 240 to the lower housing 114. In example aspects, the cover fastener holes 560 can be blind holes, as shown. In other aspects, the cover fastener holes 560 can be formed as through-holes. Furthermore, according to example aspects, each of the cover fasteners 930 can define a threaded shaft 1920 configured to rotationally engage internal threading defined by the cover fastener holes 560. The sensing element 942 of the pressure sensor 360 can be mounted within the pressure sensor opening 1236 of the support island 1234 of the PCB 240 by the attachment of the attachment pad 940 to the support island 1234. The PCB backing arms 1614 of the PCB cover 270 can contact the support island 1234 and the sensing element 942 of the pressure sensor 360 can be received within the sensor clearance recess 1616. The ferrule 1310 of the pressure sensor 360 can extend from the attachment pad 940, through the pressure sensor hole 540 formed through the lower housing 114, and into the pressure sensor channel 422 formed in the flow tube 150. The pressure sensor channel 422 can be in fluid communication with the flow channel 204 of the flow tube 150, such that fluid in the flow tube 150 can flow into the ferrule 1310 of the pressure sensor 360. A small fluid opening 1930 can be formed in the attachment pad 940 to allow fluid to flow from the ferrule 1310 to the sensing element 942, and the sensing element 942 can detect the pressure of the fluid. Additionally, in example aspects, the first pressure packing 1910 can be received within the tube pressure packing groove 424 and the second pressure packing 1912 can be received within the housing pressure packing groove 542. Each of the first and second pressure packings 1910, 1912 can seal with the ferrule 1310 to prevent fluid from leaking into the interior 202 of the meter housing 112. In example aspects, each of the first and second pressure packings 1910, 1912 can be an O-ring; however, in other aspects, either or both of the first and second pressure packings 1910, 1912 can be any other suitable packing for sealing with the corresponding pressure sensor 360.

Figure 20:
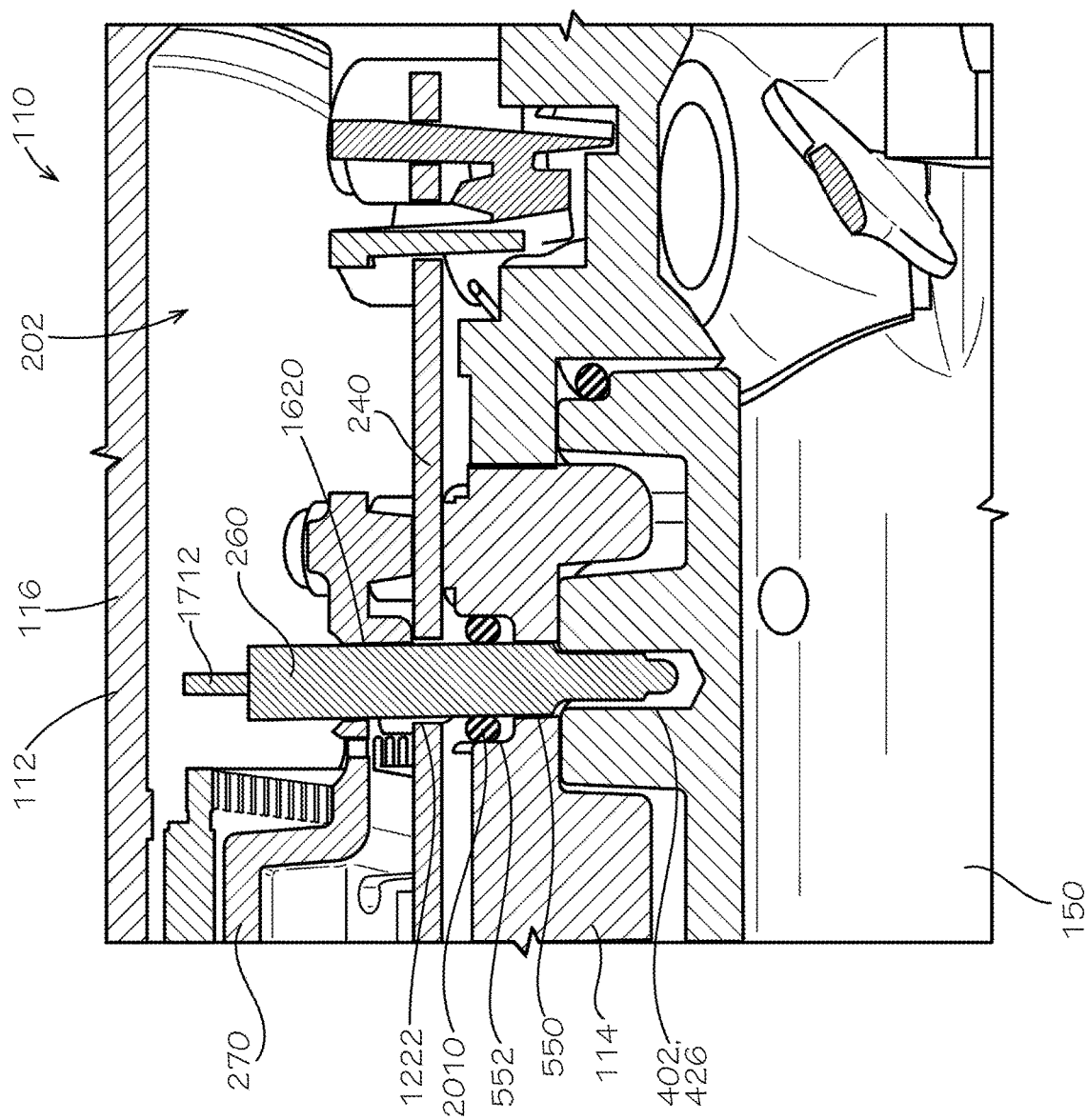
FIG. 20 is a cross-sectional view of the ultrasonic flow meter assembly of FIG. 3A, taken along line 20-20 in FIG. 3A.

FIG. 20 is a detail cross-sectional view of the ultrasonic flow meter 110 assembled with the flow tube 150, taken along line 20-20 in FIG. 3A. FIG. 20 illustrates the temperature sensor 260 in cross-section. As shown, the housing temperature sensor hole 550 of the lower housing 114 can be aligned with the tube temperature sensor hole 426 (i.e., the blind hole 402) of the flow tube 150, and the lower housing 114 can abut the flow tube 150 surrounding the housing and tube temperature sensor holes 550, 426. The temperature sensor 260 can extend through the cover sensor opening 1620 of the PCB cover 270, the temperature sensor opening 1222 of the PCB 240, and the housing temperature sensor hole 550 of the lower housing 114 and into the tube temperature sensor hole 426 of the flow tube 150. According to example aspects, the housing temperature sensor hole 550 can define the temperature packing groove 552, and the temperature packing 2010 can be received within the temperature packing groove 552. The temperature packing 2010 can seal with the temperature sensor 260 to seal the interior 202 of the meter housing 112 off from the tube temperature sensor hole 426. Thus, in the event of fluid leaking into the tube temperature sensor hole 426 between the lower housing 114 and flow tube 150, the fluid can be prohibited from entering into the interior 202 of the meter housing 112 by the temperature packing 2010. In example aspects, the temperature packing 2010 can be an O-ring; however, in other aspects, the temperature packing 2010 can be any other suitable packing for sealing with the temperature sensor 260. Furthermore, the temperature sensor 260 can be supported by the sensor support arms 1712 of the PCB cover 270, which can retain the temperature sensor 260 in a substantially upright orientation, relative to the orientation shown.

Figure 21:
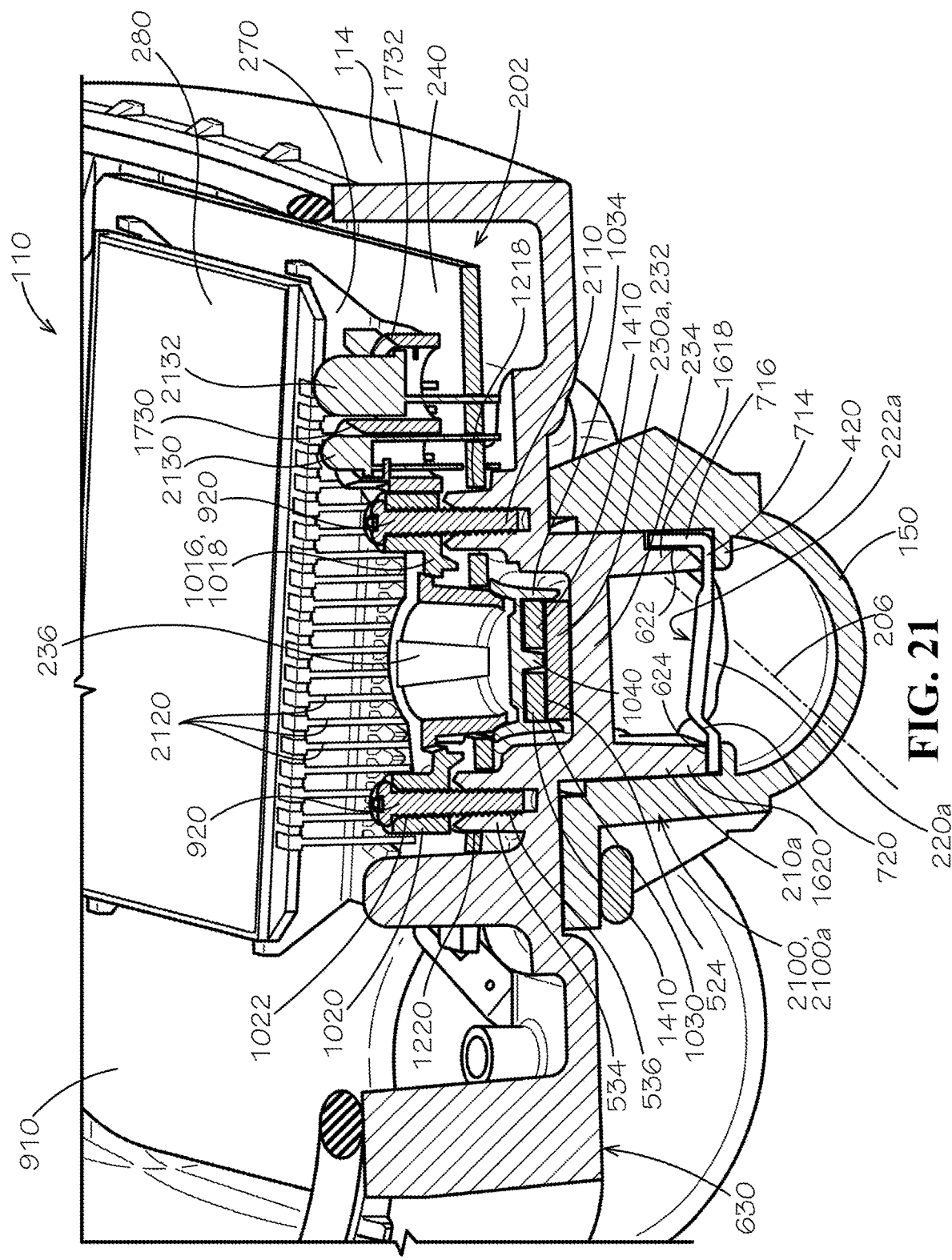
FIG. 21 is a cross-sectional view of the ultrasonic flow meter assembly of FIG. 3A, taken along line 21-21 in FIG. 3A.
Figure 22:
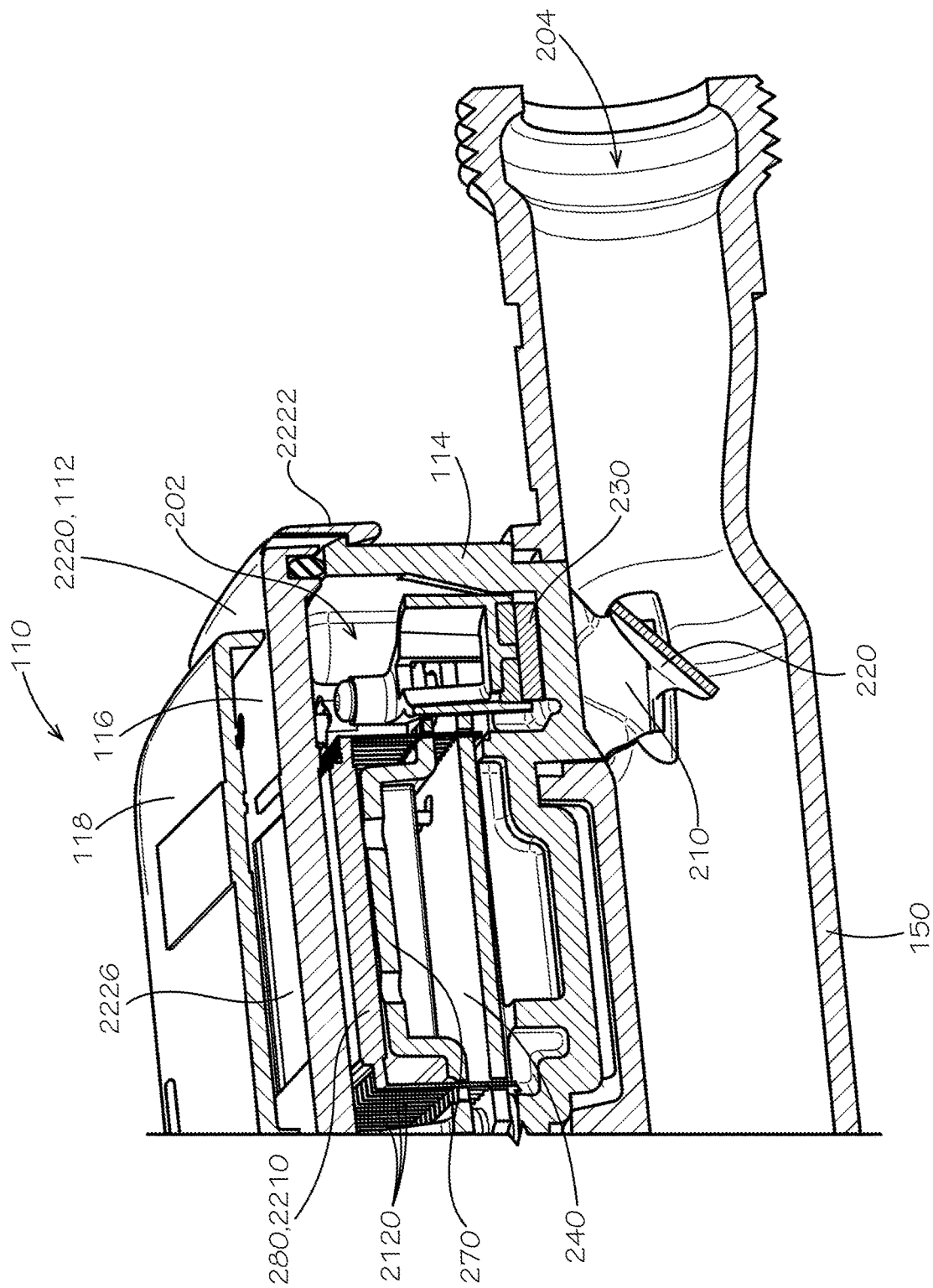
FIG. 22 is a cross-sectional view of the ultrasonic flow meter assembly of FIG. 3A, taken along line 3B-3B in FIG. 3A.

FIGS. 21 and 22 illustrate additional cross-sectional views of the ultrasonic flow meter 110 assembled with the flow tube 150, taken along lines 21-21 and 3B-3B in FIG. 3A, respectively. Each of FIGS. 21 and 22 illustrate a piezo/reflector assembly 2100 of the ultrasonic flow meter 110 in cross-section. The piezo/reflector assembly 2100 can be a first piezo/reflector assembly 2100a comprising the first piezoelectric transducer 230a, the corresponding piezo housing 236 (shown in FIG. 2), foam backing 1410, and piezo mount 234, the first reflector mount 210a, and the first reflector 220a. The first piezo/reflector assembly 2100a can be substantially the same as a second piezo/reflector assembly comprising the second piezoelectric transducer 230b (shown in FIG. 2), the corresponding piezo housing 236, foam backing 1410, and piezo mount 234, the second reflector mount 210b (shown in FIG. 2), and the second reflector 220b (shown in FIG. 2).

Referring to FIG. 21, each of the first and second IR readers 2130, 2132 can be mounted to the corresponding first and second IR reader supports 1730, 1732 of the PCB cover 270. According to example aspects, a utility worker can be provided with a reading device that can communicate with the ultrasonic flow meter 110 through the IR readers 2130, 2132. Various information from the ultrasonic flow meter 110 (e.g., flow rate, temperature, pressure) can be shared to the reading device, saving the utility worker from having to manually record the information. Furthermore, the utility worker can clear any alerts and alarm records and can reset the accumulated water amount via the IR readers 2130, 2132. Each of the piezo fastener bosses 534 of the lower housing 114 can extend through the corresponding fastener opening 1218 or fastener cut-out 1220 of the PCB 240. Each of the piezo fasteners 920 can extend through the piezo fastener bore 1022 of the corresponding mounting boss 1020 of the piezo housing 236 and into the piezo fastener hole 536 of the corresponding piezo fastener boss 534 to couple the piezo housing 236 to the lower housing 114. In example aspects, the piezo fastener holes 536 can be blind holes, as shown. In other aspects, the piezo fastener holes 536 can be formed as through-holes. Furthermore, according to example aspects, each of the piezo fasteners 920 can define a threaded shaft 2110 configured to rotationally engage internal threading of the piezo fastener boss 534. As the piezo fasteners 920 are tightened, each of the retainer clips 1034 can be biased radially outward by engaging a corresponding one of the release indentures 530 (shown in FIG. 5) of the lower housing 114, which can allow the piezoelectric disc 232 to contact the piezo mounting surface 524.

Once the piezoelectric disc 232 has been released by the retainer clips 1034, the piezo fasteners 920 can be further tightened to increasingly push the piezo post 1040 downward against the piezoelectric disc 232. In some aspects, the housing arms 1018 of the housing mounts 1016 can deflect or bend slightly as the piezo post 1040 is driven downward against the piezoelectric disc 232. The stiffness of the housing arms 1018 can determine the extent to which the housing arms 1018 can deflect as the piezo fasteners 920 are tightened, and thus, the stiffness of the housing arms 1018 can determine how far downward the piezo post 1040 can travel. Thus, the stiffness of the housing arms 1018 can determine the amount of force that can be applied to the piezoelectric disc 232 by the piezo post 1040. In some aspects, the flexibility of the housing arms 1018 can allow the piezo fasteners 920 to be tightened until the distal clip ends 1038 (shown in FIG. 10) of the retaining clips 1034 bottom out within the release indentures 530 and/or the mounting bosses 1020 contact the corresponding piezo fastener bosses 534. The foam backing 1410 can be disposed within the piezo indenture 1030 between the piezoelectric disc 232 and the upper wall 1032 (shown in FIG. 10) of the piezo housing 236 and can surround the piezo post 1040.

As shown, the first reflector mount 210a can extend downward from the bottom wall outer surface 630 of the lower housing 114 into the flow tube 150, relative to the orientation shown. The corresponding first reflector 220a can be mounted to the first reflector mount 210a. Each of the first and second mounting legs 618, 620 (shown in FIG. 6) of the first reflector mount 210a can define the corresponding reflector groove 622, and each of the reflector tabs 716 of the first reflector 220a can be inserted into a corresponding one of the reflector grooves 622 to couple the first reflector 220a to the first reflector mount 210a. In example aspects, each of the reflector tabs 716 can define the reflector retaining feature 710 (shown in FIG. 7) which can engage the corresponding mount retaining feature 626 (shown in FIG. 6) to further secure the first reflector 220a to the first reflector mount 210a. When the ultrasonic flow meter 110 is assembled with the flow tube 150, each of the reflector ledges 714 of the first reflector 220a can be supported on the corresponding reflector support ledge 420 of the flow tube 150, and can be sandwiched between the reflector support ledge 420 and the free end 624 of the corresponding first or second mounting leg 618, 620. The first reflective surface 222a can be twisted relative to the reflector ledges 714 at the twist joints 720 and can be angled at about 45° relative to the flow axis 206 towards the second reflector 220b (shown in FIG. 2).

The ultrasonic flow meter 110 can further comprise the battery 910, the PCB 240, the PCB cover 270, and the LED display 280 assembled within the interior 202 of the meter housing 112 (shown in FIG. 22). Referring now to FIG. 22, the upper housing 116 can be assembled the lower housing 114 to define the meter housing 112, as described in further detail below with respect to FIG. 26. The LED display 280 can be mounted over the PCB cover 270, such that the LED display 280 can be oriented in proximity to the upper housing 116. Example aspects of the LED display 280 can comprise a display panel 2210 and the plurality of the pins 2120 extending from the display panel 2210 and electronically connecting the display panel 2210 to the PCB 240. Information related to the flow rate, pressure, and/or temperature of the fluid flowing through the flow tube 150 can be displayed on the display panel 2210. The pins 2120 can be configured to transfer signals representative of such information from the PCB 240 to the display panel 2210. In some aspects, each of the pins 2120 can extend through a corresponding one of the pin grooves 1622 (shown in FIG. 16) or pin openings 1624 (shown in FIG. 16) of the PCB cover 270.

Example aspects of the upper housing 116 can define a housing top wall 2220 and a substantially rectangular upper sidewall 2222 extending from the housing top wall 2220. As described above, the upper housing 116 can comprise a plastic material in some aspects. In the present aspect, the plastic material of the upper housing 116 can be a fogged, translucent plastic. According to example aspects, the display panel 2210 can be oriented about parallel to the housing top wall 2220 and the display lid 118. As shown, example aspects of the housing top wall 2220 can define a window pane 2226 through which the display panel 2210 can be seen. In example aspects, the window pane 2226 can comprise a plastic material and can be monolithically formed with the upper housing 116. In other aspects, the window pane 2226 can be formed separately from the upper housing 116 and/or can comprise any other suitable material. For example, the window pane 2226 can be ultrasonically welded to the upper housing 116, if both the window pane 226 and the upper housing 116 comprise plastic. The plastic material of the window pane 2226 can be substantially transparent for clear visibility of the display panel 2210, so that the information displayed on the display panel 2210 can be read by a utility worker from outside of the meter housing 112. According to example aspects, the translucent plastic of the upper housing 116 and the transparent plastic of the window pane 2226 can be cast together in a single casting. Example aspects of the display lid 118 can selectively cover and uncover the window pane 2226 in the closed and open positions, respectively. In the closed position, the window pane 2226 can be protected by the display lid 118 from dirt, moisture, and other undesirable elements.

Figure 23:
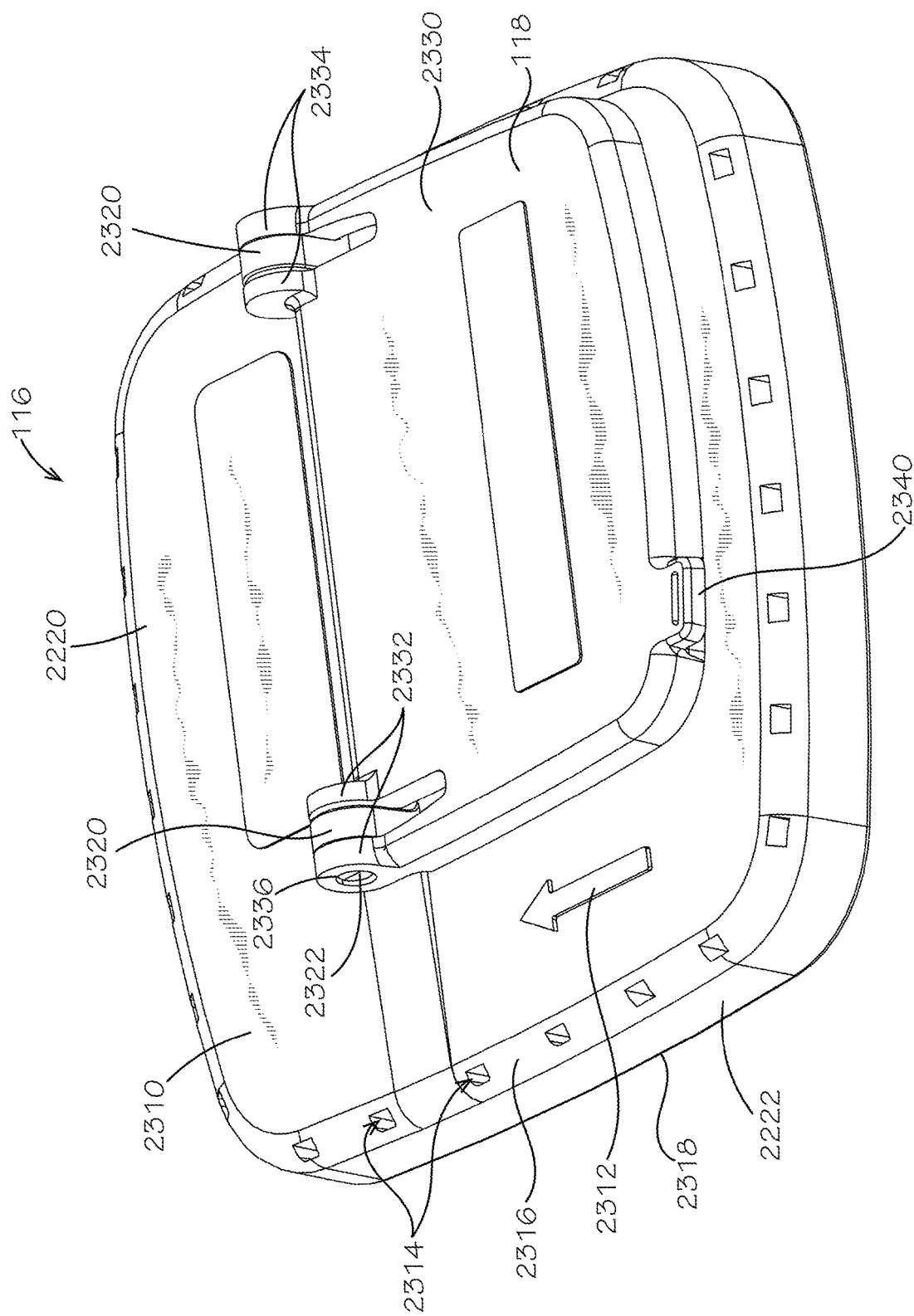
FIG. 23 is a top perspective view of an upper housing of the ultrasonic flow meter assembly of FIG. 3A assembled with a display lid of the ultrasonic flow meter assembly of FIG. 3A.

FIG. 23 illustrates a top perspective view of the upper housing 116 of the meter housing 112 (shown in FIG. 1A) and the display lid 118 pivotably coupled thereto. The upper housing 116 can define the housing top wall 2220 and the upper sidewall 2222 extending therefrom. The upper housing 116 can further define an outer upper surface 2310 and an inner upper surface 2520 (shown in FIG. 25). In some aspects, the upper housing can be substantially translucent to allow for some visibility therethrough. Some or all of the outer upper surface 2310 and/or the inner upper surface 2520 can be textured in some aspects. Moreover, example aspects the outer upper surface 2310 can define a directional arrow 2312, or other indicia, formed on the housing top wall 2220 indicating the direction of fluid flow through the flow tube 150 (shown in FIG. 1), which can aid in properly orienting the ultrasonic flow meter 110 (shown in FIG. 1) when assembling the ultrasonic flow meter 110 with the flow tube 150 and/or in properly orienting the ultrasonic flow meter assembly 100 (shown in FIG. 1) when assembling the ultrasonic flow meter assembly 100 with the pipeline system. For example, the ultrasonic flow meter assembly 100 (shown in FIG. 1) can be properly assembled by ensuring that the directional arrows 2312, 144, 160 (directional arrows 144 and 160 shown in FIGS. 1A and 1B, respectively) of the meter housing 112, the water supply valve 130 (shown in FIG. 1A), and the flow tube 150 (shown in FIG. 1A), are pointing in the same direction.

Example aspects of the upper housing 116 can define a plurality of attachment channels 2314 formed through the upper sidewall 2222, as shown. The plurality of attachment channels 2314 can be spaced apart about a periphery of the upper housing 116 and can extend from the outer upper surface 2310 to the inner upper surface 2520. Each of the attachment channels 2314 can extend substantially vertically into the upper sidewall 2222, from a top side 2316 of the upper sidewall 2222 towards a bottom side 2318 thereof. As described in further detail below with respect to FIG. 26, each of the attachment channels 2314 can define a corresponding one of the attachment recesses 2510 (shown in FIG. 25).

According to example aspects, two housing axle mounts 2320 can extend from the outer upper surface 2310 of the upper housing 116. The display lid 118 can define a lid body 2330. A first pair of lid axle tabs 2332 and second pair of lid axle tabs 2334 can extend from the lid body 2330. The first pair of lid axle tabs 2332 can be positioned on either side of the first housing axle mount 2320 and the second pair of lid axle tabs 2334 can be positioned on either side of the second housing axle mount 2320. In example aspects, an axle 2322 can extend from each of the housing axle mounts 2320. One of the first pair of lid axle tabs 2332 can define an axle opening 2336 therethrough and one of the second pair of lid axle tabs 2334 can define another axle opening 2336 therethrough. The display lid 118 can be snapped onto the upper housing 116, with each of the axles 2322 extending into the corresponding axle opening 2336 to pivotably couple the display lid 118 to the upper housing 116.

In the present aspect, each of the axles 2322 can be monolithically formed with the corresponding housing axle mount 2320. In other aspects, the axles 2322 may not be monolithically formed with the housing axle mounts 2320. For example, in other aspects, each of the axles 2322 can be formed as a separate axle pin or bolt, which can extend through the corresponding housing axle mount 2320 and corresponding pair of lid axle tabs 2332, 2334. In such an aspect, each pair of lid axle tabs 2332, 2334 can rotate on the corresponding axle pin or bolt relative to the corresponding housing axle mount 2320 to allow the display lid 118 to pivot relative to the upper housing 116.

Example aspects of the display lid 118 can further define a lift tab 2340, as shown. The lift tab 2340 can extend from the lid body 2330 and can be spaced from the outer upper surface 2310 of the upper housing 116 to allow a finger, or fingers, to be inserted between the lift tab 2340 and the upper housing 116 in the closed position. The utility worker can then lift their finger or fingers upward against the lift tab 2340, relative to the orientation shown, to pivot the lift tab 2340 away from the upper housing 116, thereby moving the display lid 118 to the open position.

Figure 24:
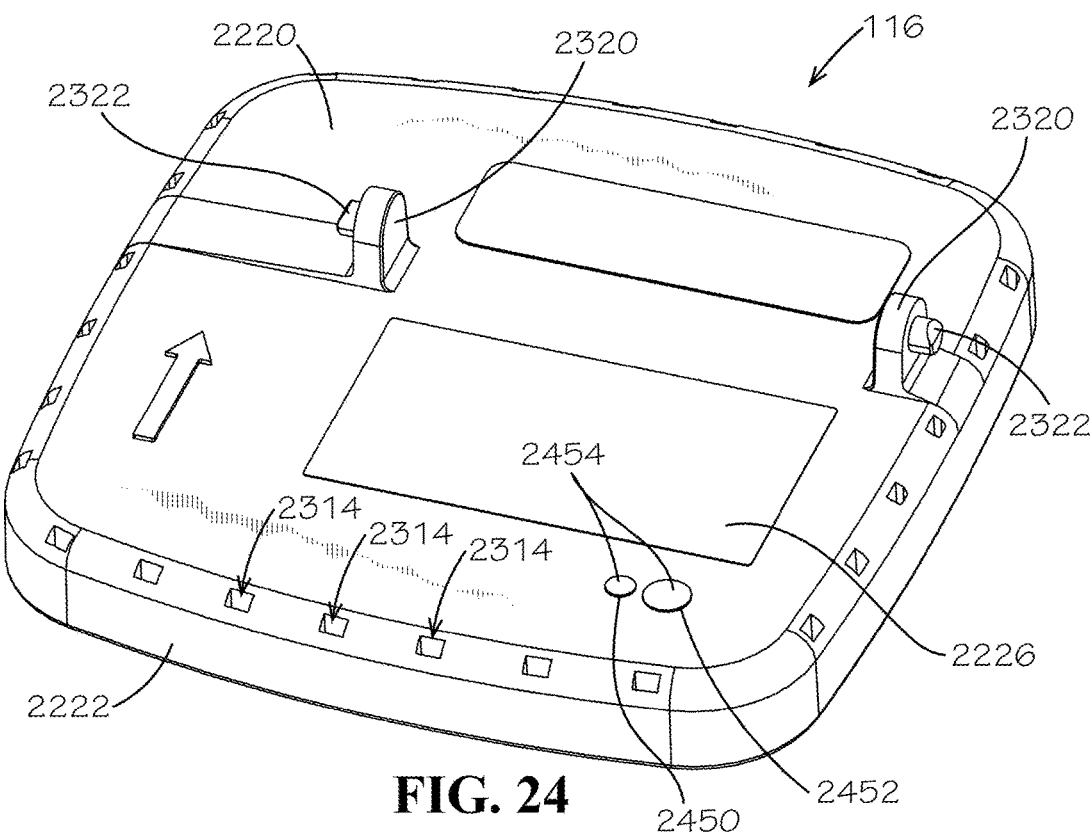
FIG. 24 is a top perspective view of the upper housing of FIG. 23.
Figure 25:
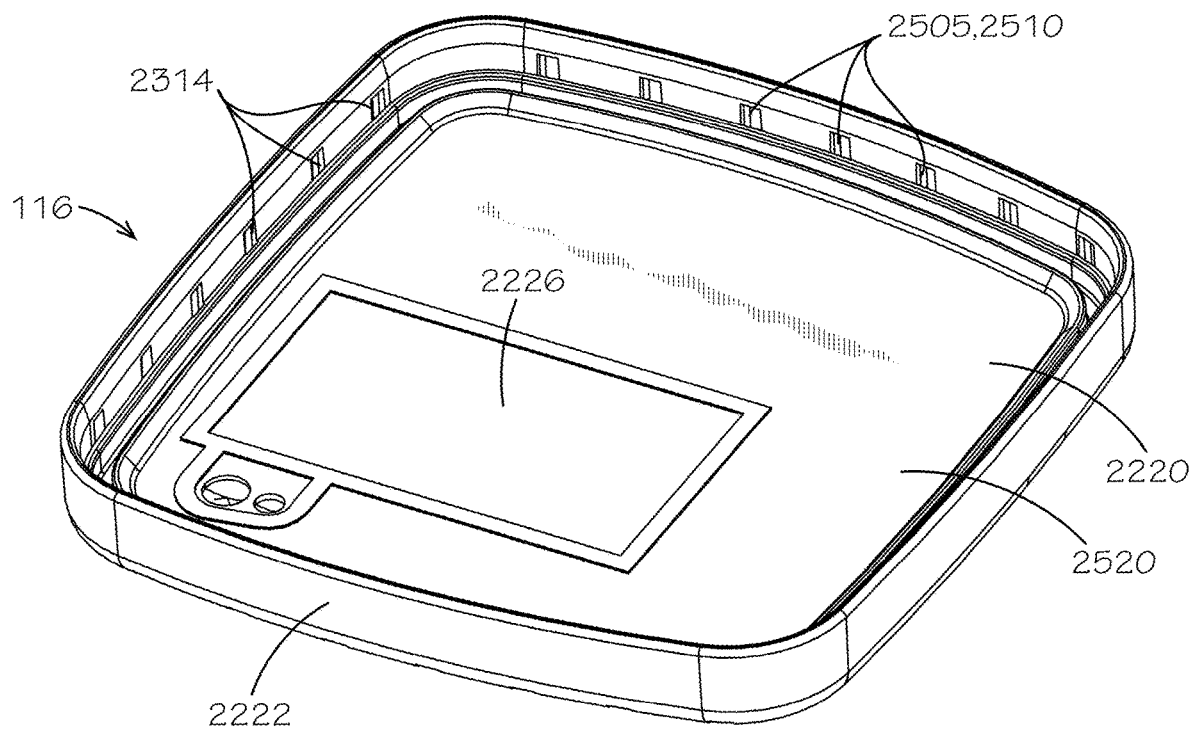
FIG. 25 is a bottom perspective view of the upper housing of FIG. 23.

FIGS. 24 and 25 illustrate top and bottom perspective views of the upper housing 116 with the display lid 118 (shown in FIG. 1) removed. Referring to FIG. 24, the upper housing 116 can define the housing top wall 2220 and the upper sidewall 2222 extending therefrom. As shown, each of the housing axle mounts 2320 can extend from the housing top wall 2220 and can define the corresponding axle 2322 extending therefrom. The attachment channels 2314 can be formed through the upper sidewall 2222 and can be spaced apart about the periphery of the upper housing 116. The housing top wall 2220 can define the window pane 2226, which can be substantially transparent for visibility therethrough. Example aspects of the housing top wall 2220 can further define first and second lens openings 2450, 2452 therethrough. Each of the first and second lens openings 2450, 2452 can be covered by a lens pane 2454. In example aspects, each of the lens panes 2454 can be substantially transparent or translucent, such that light from the first and second IR readers 2130, 2132 (shown in FIG. 21) can be visible through the lens panes 2454. In some aspects, the window pane 2226 and lens panes 2450, 2452 can comprise the same translucent material of the upper housing 116, but can be polished to make the window pane 2226 and lens panes 2450, 2452 substantially transparent. Referring to FIG. 25, a lower portion 2505 of each of the attachment channels 2314 can define a corresponding one of the attachment recesses 2510.

Figure 26:
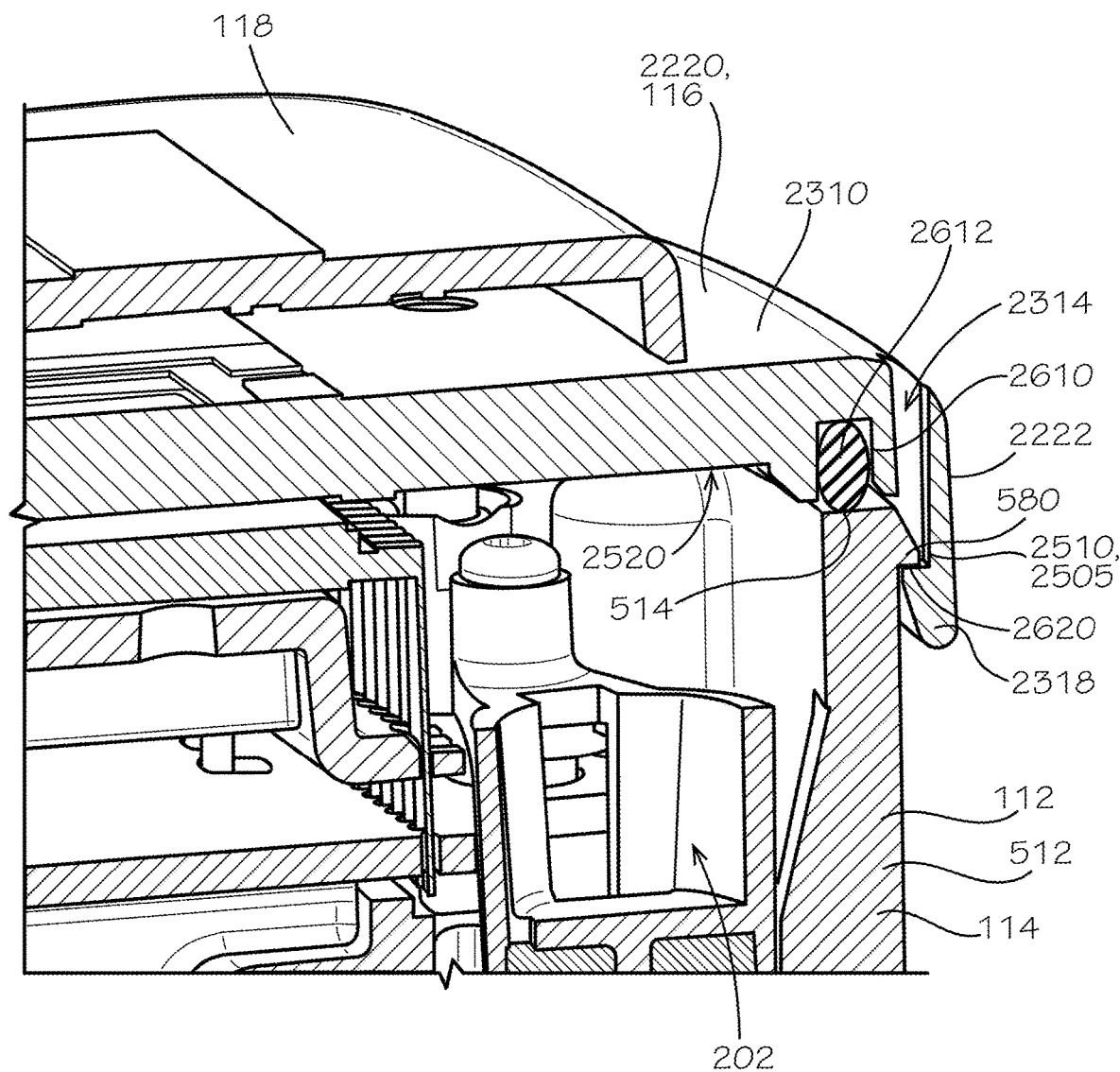
FIG. 26 is a detail cross-sectional view of the lower housing of FIG. 5 assembled with the upper housing of FIG. 23, taken along line 3B-3B in FIG. 3A.

FIG. 26 illustrates a detailed view of the upper housing 116 coupled to the lower housing 114. The upper housing 116 can define the housing top wall 2220 and the upper sidewall 2222. The lower housing 114 can define the housing bottom wall 510 (shown in FIG. 5) and the lower sidewall 512. According to example aspects, the top side 514 of the lower sidewall 512 can confront, and in some instances can abut, the inner upper surface 2520 of the upper housing 116 around a periphery of the housing top wall 2220. The upper sidewall 2222 can extend along an outside of the lower sidewall 512 proximate to the top side 514 of the lower sidewall 512. In example aspects, the inner upper surface 2520 can define a sealing groove 2610 extending generally about the periphery of the housing top wall 2220. A housing seal 2612 can be received within the sealing groove 2610 and can seal with the top side 514 of the lower sidewall 512 to prohibit dirt, moisture, and other undesirable elements from entering the interior 202 of the meter housing 112 between the upper housing 116 and the lower housing 114.

Example aspects of the upper housing 116 can further define a plurality of the attachment recesses 2510, each of which can receive a corresponding one of the attachment projections 580 of the lower housing 114. In the present aspect, as shown, each of the attachment channels 2314 can extend substantially vertically through the upper sidewall 2222 from the outer upper surface 2310 to the inner upper surface 2520. The lower portion 2505 of each the attachment channel 2314 can define a corresponding one of the attachment recesses 2510. Example aspects of the inner upper surface 2520 can further define a plurality of securing lips 2620 projecting inward from the upper sidewall 2222 adjacent to the bottom side 2318 thereof. Each of the securing lips 2620 can project inward beneath a corresponding one of the attachment recesses 2510. Each of the securing lips 2620 can be configured to catch on a corresponding one of the attachment projections 580 to secure the upper housing 116 to the lower housing 114.

Figure 27:
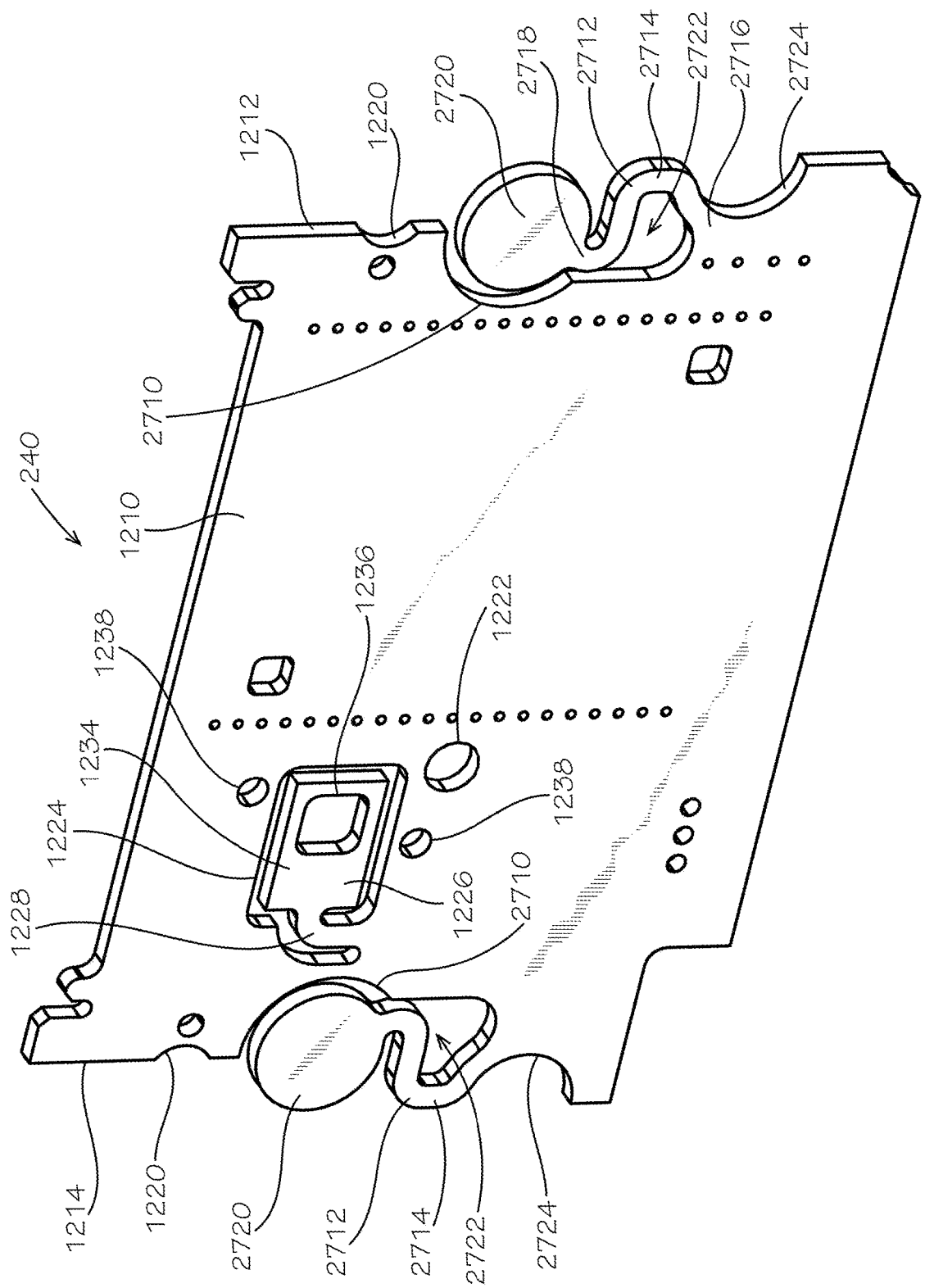
FIG. 27 is a bottom perspective view of the printed circuit board, in accordance with another aspect of the present disclosure.

FIG. 27 illustrates the printed circuit board 240 (i.e., the PCB 240) in accordance with another example aspect of the present disclosure. As shown, the PCB 240 can comprise the PCB body 1210 defining the first lateral side 1212 and the second lateral side 1214. The PCB 240 can define the temperature sensor opening 1222 through which the temperature sensor 260 (shown in FIG. 2) can extend. The pressure sensor cut-out 1224 can also be formed in the PCB body 1210, and the pressure sensor support 1226 can extend from the PCB body 1210 into the pressure sensor cut-out 1224. The pressure sensor support 1226 can comprise the gooseneck arm 1228 and the support island 1234. The sensing element 942 (shown in FIG. 9) of the pressure sensor 360 (shown in FIG. 3B) can be mounted within the pressure sensor opening 1236 formed through the support island 1234. The PCB 240 can further define the PCB openings 1238, each configured to receive a corresponding one of the cover fasteners 930 (shown in FIG. 9) therethrough.

As shown, a piezo cut-out 2710 can extend into each of the first and second lateral sides 1212, 1214. In the present aspect, a piezo engagement member 2712 can extend from the PCB body 1210 at each of the first and second lateral sides 1212, 1214. Each of the piezo engagement members 2712 can comprise a gooseneck arm 2714 extending from the PCB body 1210 at a proximal arm end 2716 thereof and into the corresponding piezo cut-out 2710. The piezo engagement member 2712 can further comprise a piezo engagement island 2720 coupled to the gooseneck arm 2714 at a distal arm end 2718 thereof, opposite the proximal arm end 2716. The gooseneck arm 2714 can suspend the piezo engagement island 2720 within the piezo cut-out 2710, as shown, and can allow the piezo engagement member 2712 to move slightly relative to the PCB body 1210. In example aspects, the piezo engagement island 2720 can be substantially circular. In some aspects, a diameter of the piezo engagement island 2720 can be about equal to a diameter of the piezoelectric disc 232 (shown in FIG. 30). In other aspects, the piezo engagement island 2720 can be greater or lesser in diameter than the piezoelectric disc 232.

The PCB 240 can further define one of the fastener cut-outs 1220 formed at each of the first and second lateral sides 1212, 1214. Each of the fastener cut-outs 1220 can be arranged proximate to a corresponding one of the piezo cut-outs 2710, and a corresponding one of the piezo fastener bosses 534 (shown in FIG. 5) can nest within each of the fastener cut-outs 1220. The PCB 240 can further define a fastener channel 2722 defined between the PCB body 1210 and each of the gooseneck arms 2714 of the piezo engagement members 2712. Each of the fastener channels 2722 can be configured to receive a corresponding one of the piezo fastener bosses 534 therethrough. In example aspects, the PCB 240 can further define a boss cut-out 2724 at each of the first and second lateral sides 1212, 1214, within which a corresponding one of the housing bosses 518 (shown in FIG. 29) can nest.

Figure 28:
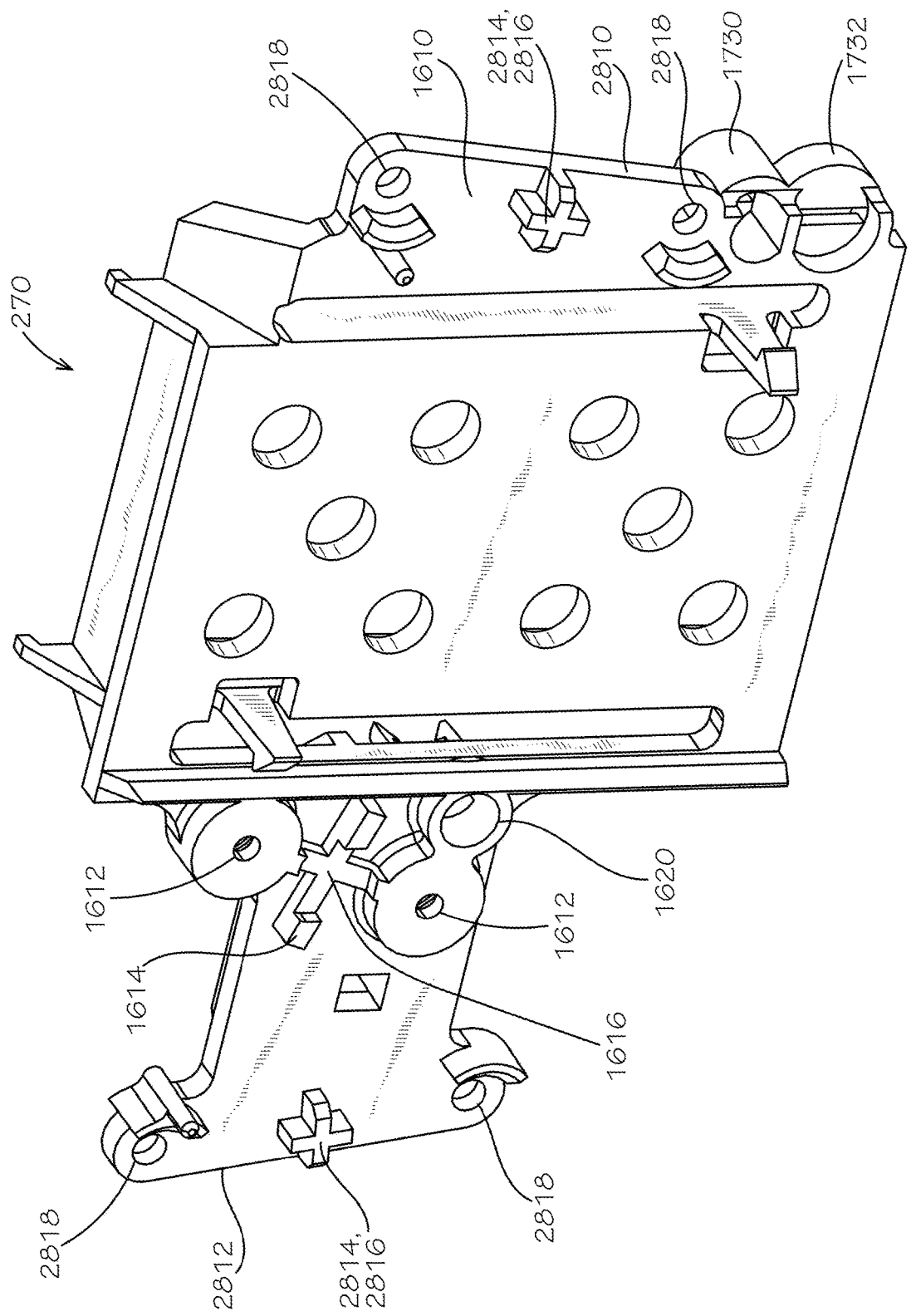
FIG. 28 is a bottom perspective view of the PCB cover, in accordance with another aspect of the present disclosure.

FIG. 28 illustrates a perspective views of the PCB cover 270 in accordance with another example aspect of the present disclosure. The PCB cover 270 can define the upper cover surface 1710 (shown in FIG. 17) and the lower cover surface 1610. The PCB cover can further define a first lateral side 2810 and a second lateral side 2812. According to example aspects, the PCB cover 270 can define the cover fastener openings 1612, each of which can receive a corresponding one of the cover fasteners 930 (shown in FIG. 9) therethrough to secure the PCB cover 270 and the PCB 240 (shown in FIG. 27) to the lower housing 114 (shown in FIG. 29). In example aspects, the PCB cover 270 can further define the cover sensor opening 1620 through which the temperature sensor 260 (shown in FIG. 2) can extend. Example aspects of the PCB cover 270 can further define a first IR reader support 1730 and a second IR reader support 1732. According to example aspects, a first IR reader 2130 (i.e., a first infra-red reader, shown in FIG. 21) can be mounted on the first IR reader support 1730 and a second IR Reader 2132 (i.e., a second infra-red reader, shown in FIG. 21) can be mounted on the second IR reader support 1732.

Example aspects of the lower cover surface 1610 can further define the PCB backing areas (i.e., the PCB backing arms 1614) that can confront, and in some instances can contact, the support island 1234 (shown in FIG. 27) of the PCB 240, as described above. The lower cover surface 1610 can further define the sensor clearance recess 1616 for receiving the sensing element 942 (shown in FIG. 9) therein. Additionally, in the present aspect, the lower cover surface 1610 of the PCB cover 270 can further define a piezo backing area 2814 formed adjacent to each of the first and second lateral sides 2810, 2812. In example aspects, each of the piezo backing areas 2814 can be formed as a substantially cross-shaped piezo backing arm 2816, as shown. Each of the cross-shaped piezo backing arms 2816 can contact the piezo engagement island 2720 (shown in FIG. 27) of a corresponding one of the piezo engagement members 2712 (shown in FIG. 27), as illustrated in FIG. 30. In other aspects, the piezo backing arms 2816 can define any other suitable shape, such as a ring-shape, for example and without limitations. In the present aspect, the PCB cover 270 can further define a pair of boss attachment holes 2818 disposed on opposing sides of each piezo backing area 2814. Each of the boss attachment holes 2818 can be aligned with a corresponding one of the piezo fastener bosses 534 (shown in 29) of the lower housing 114 (shown in FIG. 29). The corresponding piezo fastener 920 (shown in FIG. 30) can extend through the boss attachment hole 2818 and into the piezo fastener boss 534 to secure the PCB cover 270 to the lower housing 114 and to press the piezo backing areas 2814 against the corresponding piezo engagement islands 2720, as described in further detail below.

Figure 29:
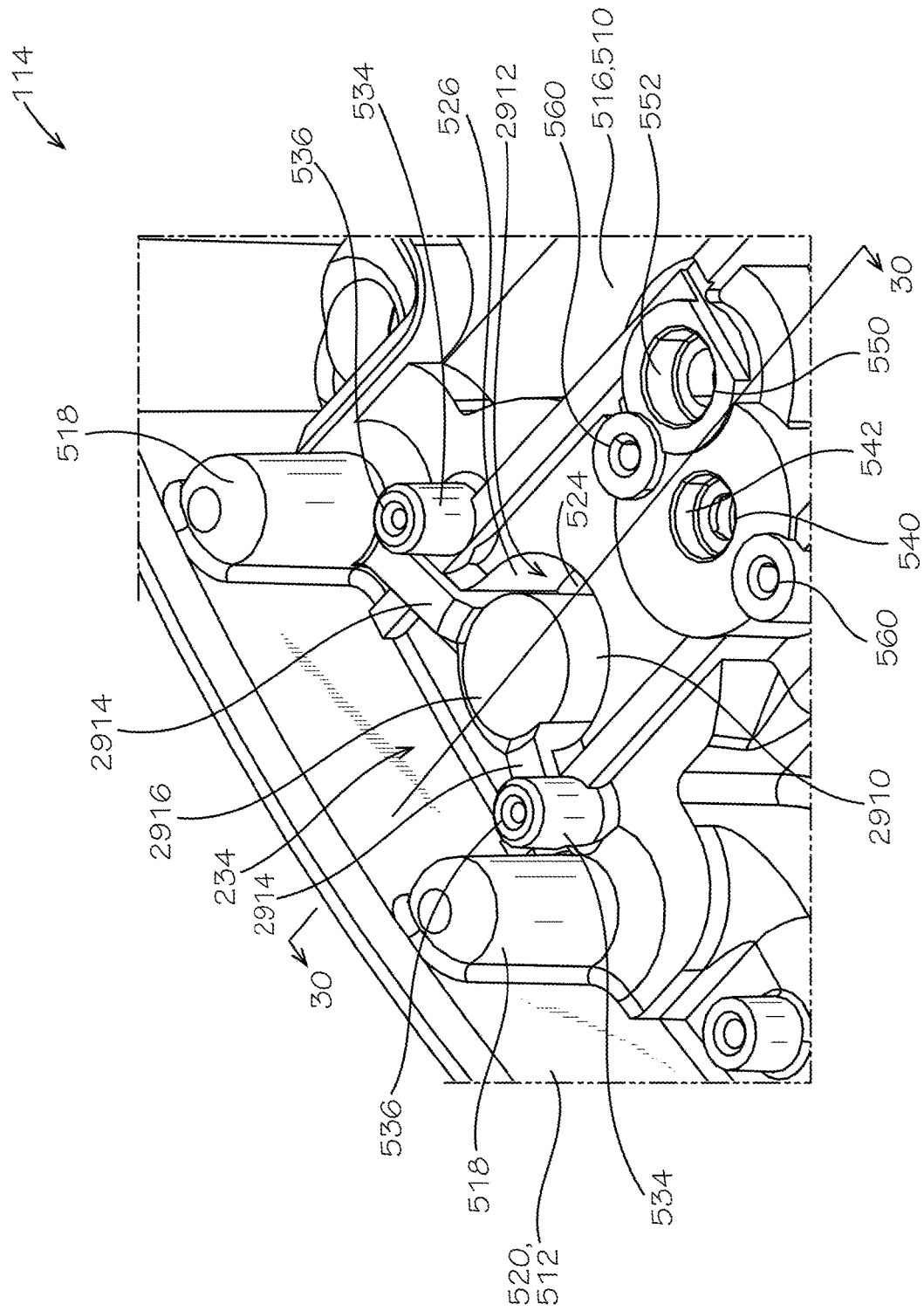
FIG. 29 is a perspective view of the piezo mount of the lower housing, in accordance with another aspect of the present disclosure.
Figure 30:
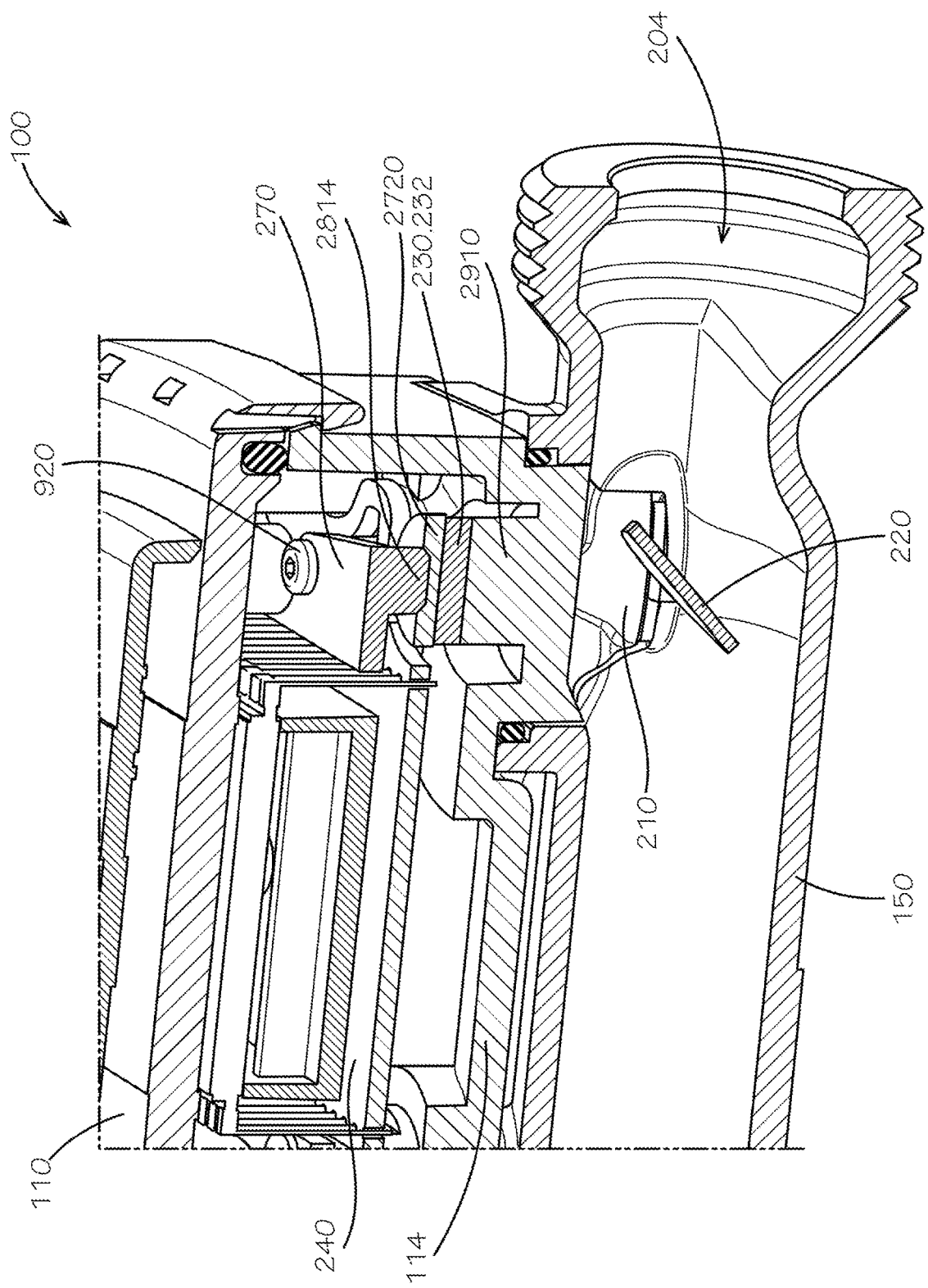
FIG. 30 is a cross-sectional view of the ultrasonic flow meter according to another aspect of the present disclosure, wherein the ultrasonic flow meter comprises the printed circuit board of FIG. 27, the PCB cover of FIG. 28, and the lower housing of FIG. 29, taken along line 30-30 in FIG. 29.

FIG. 29 illustrates a detail view of the bottom wall inner surface 516, in accordance with another example aspect of the lower housing 114. As shown, the lower housing 114 can define the housing bottom wall 510 and the lower sidewall 512 extending from the housing bottom wall 510. The housing bottom wall 510 can define the bottom wall inner surface 516, and the lower sidewall 512 can define the sidewall inner surface 520. According to example aspects, the bottom wall inner surface 516 can define the piezo mounts 234. Each of the piezo mounts 234 can define the piezo mounting surface 524 and the piezo sidewall 526 extending from the piezo mounting surface 524, both of which are formed as part of the bottom wall inner surface 516. However, in the present aspect, the piezoelectric transducers 230 (shown in FIG. 30) are not received on the piezo mounting surface 524.

Rather, in the present aspect, each of the piezo mounts 234 can further define a piezo support column 2910 extending upward from a center of the corresponding piezo mounting surface 524, relative to the orientation shown. Each of the piezo support columns 2910 can be substantially surrounded by the corresponding piezo sidewall 526, as shown, with a substantially annular recess 2912 defined therebetween. The piezo support column 2910 can be connected to the corresponding piezo sidewall 526 by one or more connector arms 2914, as shown. In example aspects, each of the piezo support columns 2910 can define an upper piezo support surface 2916 on which the corresponding piezoelectric transducer 230 can be received. In some aspects, the connector arms 2914 of the piezo mounts 234 can extend upward beyond the upper piezo support surface 2916, as shown, and can limit or prohibit lateral movement of the piezoelectric transducer 230 supported on the piezo support column 2910. The ultrasonic signals generated by the piezoelectric transducers 230 can be transmitted through the piezo support columns 2910 between the piezoelectric transducers 230 and the corresponding reflectors 220 (shown in FIG. 30).

Furthermore, one or more of the piezo fastener bosses 534 can extend from the bottom wall inner surface 516 of the housing bottom wall 510, adjacent to each of the piezo mounts 234. Each of the piezo fastener bosses 534 can define one of the piezo fastener holes 536 configured to receive the corresponding piezo fastener 920 (shown in FIG. 30) therethrough. In the present aspect, as described above, each of the boss attachment holes 2818 of the PCB cover 270 (shown in FIG. 28) can be aligned with a corresponding one of the piezo fastener bosses 534, and the printed circuit board 240 (shown in FIG. 27) can be disposed between the PCB cover 270 and the lower housing 114. The corresponding piezo fastener 920 can extend through the boss attachment hole 2818 and into the piezo fastener hole 536 of the piezo fastener boss 534 to secure the PCB cover 270 and the printed circuit board 240 to the lower housing 114.

The housing bottom wall 510 can further define the pressure sensor hole 540 formed therethrough. Example aspects of the pressure sensor hole 540 can define the housing pressure packing groove 542 configured to receive the second pressure packing 1912 (shown in FIG. 19) therein. The housing bottom wall 510 can further define the housing temperature sensor hole 550 formed therethrough. The housing temperature sensor hole 550 can define the temperature packing groove 552 configured to receive the temperature packing 2010 (shown in FIG. 20). Additionally, the housing bottom wall 510 can define the one or more cover fastener holes 560. In the present aspect, the cover fastener holes 560 are defined on either side of the pressure sensor hole 540. Each of the cover fastener holes 560 can be configured to receive the corresponding cover fastener 930 (shown in FIG. 9) therein, to secure the PCB 240 and the PCB cover 270 to the lower housing 114. Each of the cover fastener holes 560 can be blind holes, as shown. However, in other aspects, the cover fastener holes 560 may be through holes.

FIG. 30 illustrates a cross-sectional view of the ultrasonic flow meter 110 assembled with the flow tube 150, in accordance with another example aspect of the present disclosure. In the present aspect, the ultrasonic flow meter 110 can comprise the printed circuit board 240 of FIG. 27, the PCB cover 270 of FIG. 28, and the lower housing 114 of FIG. 29. As shown, in the present aspect, the ultrasonic flow meter 110 does not comprise the piezo housings 236 (shown in FIG. 2). Rather, each of the piezoelectric transducers 230 (i.e., the piezoelectric discs 232) can be sandwiched between the corresponding piezo engagement island 2720 of the PCB 240 and the corresponding piezo support column 2910 of the lower housing 114. The piezo fasteners 920 can extend through the boss attachment holes 2818 (shown in FIG. 28) of the PCB cover 270 and into the piezo fastener bosses 534 (shown in FIG. 29) of the lower housing 114. The piezo fasteners 920 can be tightened to bias the piezo backing areas 2814 of the PCB cover 270 downward, and the piezo backing areas 2814 can push the piezo engagement island 2720 down against the corresponding piezoelectric disc 232. As shown, each of the piezo support columns 2910 can be aligned with a corresponding one the reflectors 220 and can transmit ultrasonic signals between the corresponding piezoelectric disc 232 and reflector 220.

Figure 31:
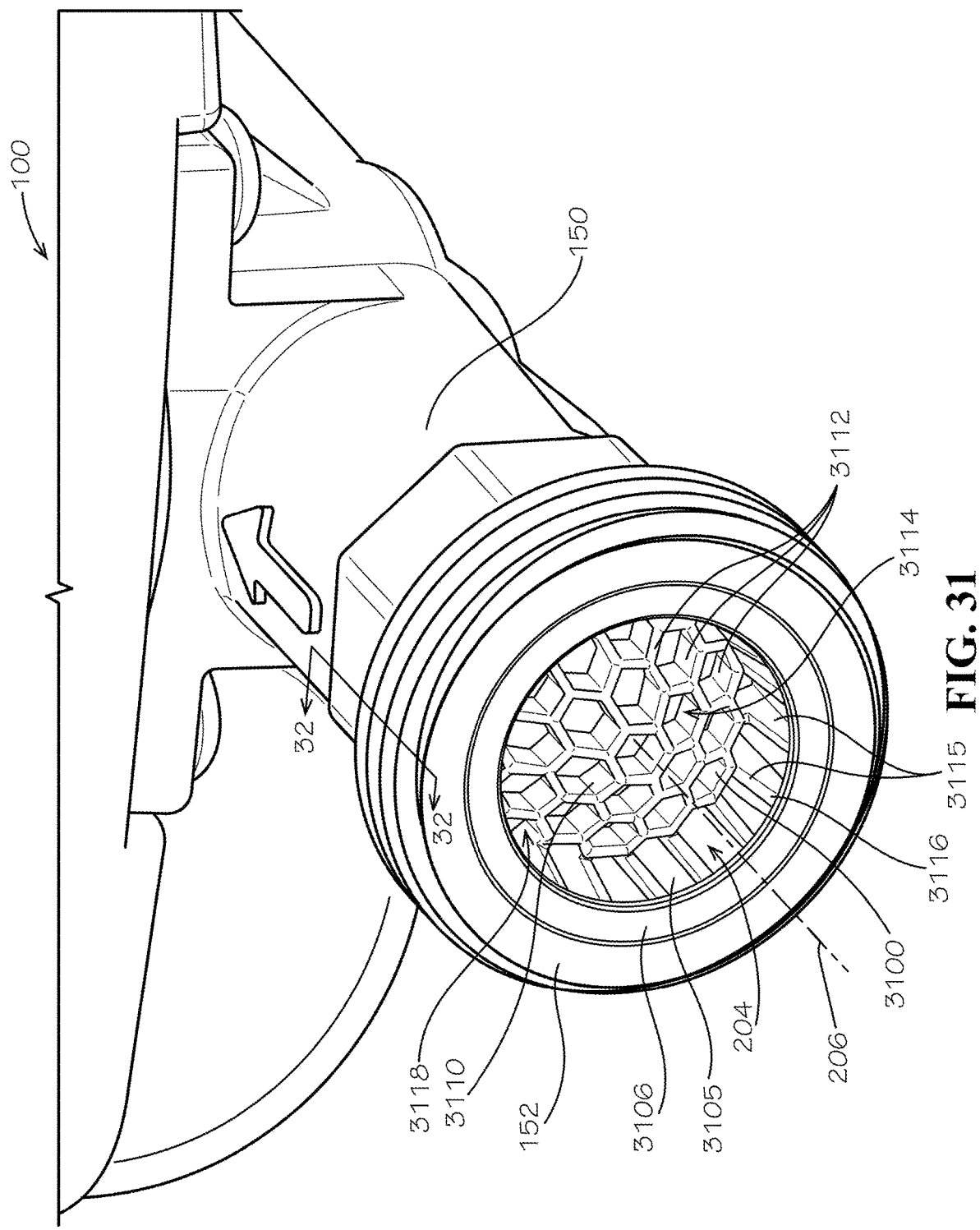
FIG. 31 is a perspective view an inlet end of the ultrasonic flow meter assembly, in accordance with another aspect of the present disclosure.
Figure 32:
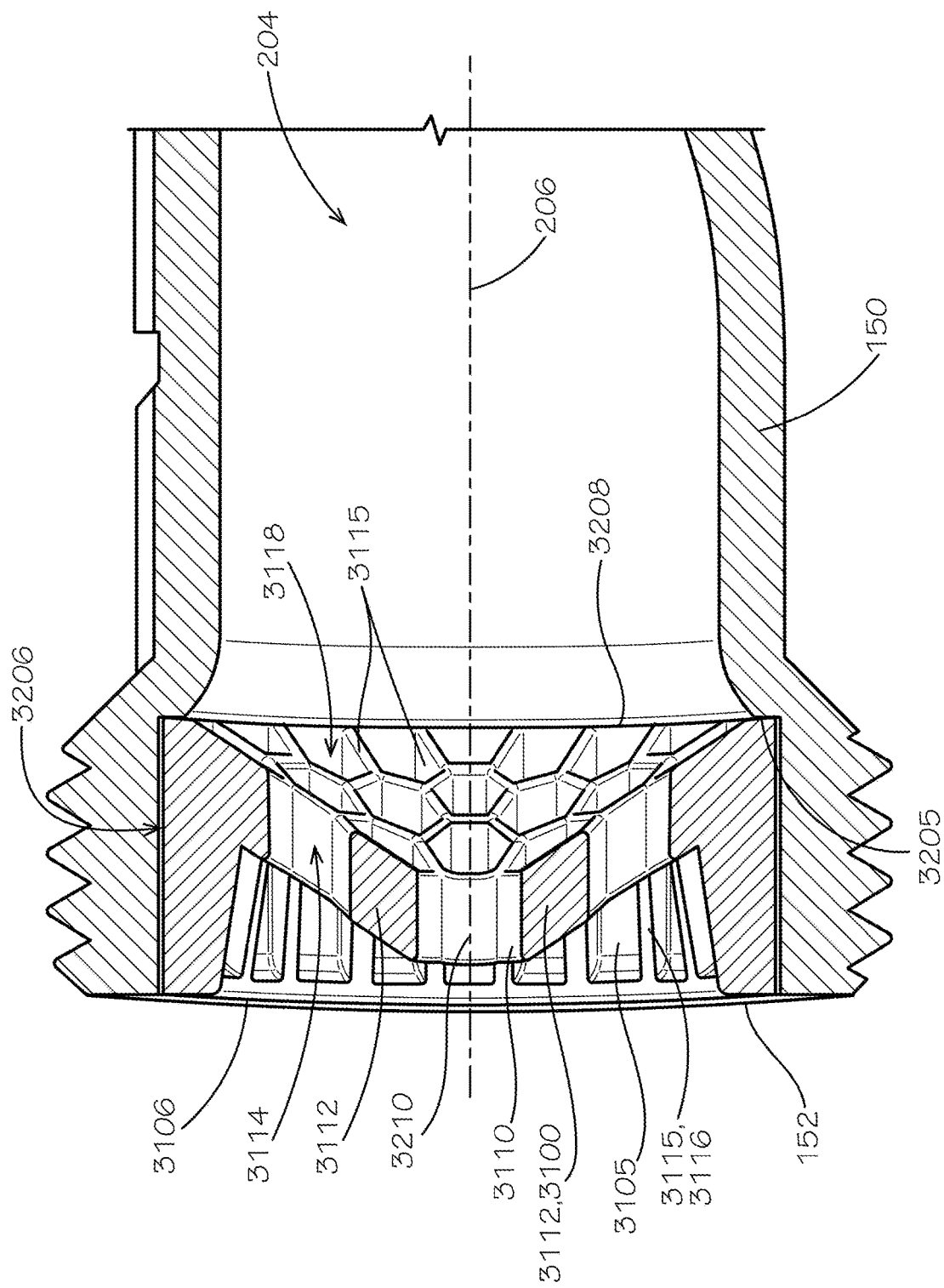
FIG. 32 is a cross-sectional view of the inlet end of FIG. 31, taken along line 32-32 in FIG. 31.

As shown in FIGS. 31 and 32, example aspects of the ultrasonic flow meter assembly 100 can further comprise a flow straightener 3100 disposed within the flow channel 204 of the flow tube 150 at or near the inlet end 152 thereof. The flow straightener 3100 can be configured to straighten the fluid flow into the flow channel 204. Straightening the fluid flow through the flow channel 204 can reduce energy losses of the fluid flow through the ultrasonic flow meter assembly 100 and can improve the propagation of the ultrasonic signals between the first and second reflectors 220a,b (shown in FIG. 2). Additionally, the flow straightener 3100 can provide some sound isolation from adjacent meters, when a plurality of meters are arranged in series. Referring to FIG. 31, according to example aspects, the flow straightener 3100 can comprise a straightener body 3105 and a vane structure 3110 extending substantially radially inward from the straightener body 3105 relative to the flow axis 206. The straightener body 3105 can define a substantially cylindrical outer body surface 3206 (shown in FIG. 32). The straightener body 3105 can further define a front end 3106 positioned at or near the inlet end 152 and a rear end 3208 (shown in FIG. 32) positioned between the front end 3106 and the outlet end 154 (shown in FIG. 1) of the flow tube 150. The vane structure 3110 can define a plurality of straightener vanes 3112 a plurality of flow openings 3114 therebetween. Fluid (e.g., water) can flow through the flow openings 3114 and into the flow channel 204 at the inlet end 152. In the present aspect, the vane structure 3110 can be a honeycomb-like vane structure 3110. For example, as shown, one or more of the flow openings 3114 can define a substantially hexagonal shape.

In example aspects, the flow straightener 3100 can further comprise one or more outer vanes 3115 extending radially inward from the straightener body 3105, and the honeycomb-like vane structure 3110 can be coupled to each of the outer vanes 3115. As shown, the outer vanes 3115 can define a plurality of outer openings 3118 formed between the straightener body 3105 and the vane structure 3110, and fluid can also flow through the outer openings 3118 into the flow channel 204. In some aspects, each of the outer vanes 3115 can extend substantially along a length of the straightener body 3105 from the front end 3106 to the rear end 3208. In the present aspect, the vane structure 3110 can be coupled to the outer vanes 3115 at or near the rear end 3208 of the straightener body 3105. Additionally, a front portion 3116 of each of the outer vanes 3115 can taper radially inward in an axially rearward direction (i.e., towards the outlet end 154), from the front end 3106 of the straightener body 3105 to the vane structure 3110. In other aspects, the outer vanes 3115 may not taper radially inward. In other aspects, the vane structure 3110 can be coupled to the outer vanes 3115 at any other suitable location. In other aspects, flow straightener 3100 may not comprise the outer vanes 3115, and the vane structure 3110 can be affixed directly to the straightener body 3105. The flow straightener 3100 can be monolithically formed in the present aspect; however, other aspects of the flow straightener 3100 can be formed from a plurality of components.

Referring to the cross-sectional view of FIG. 32, the flow straightener 3100 can be positioned within the flow channel 204 at or near the inlet end 152 of the flow tube 150. In some aspects, the flow tube 150 can define a tube shoulder 3205 extending radially inward relative to the flow axis 206. The rear end 3208 of the straightener body 3105 can abut the tube shoulder 3205 to properly locate the flow straightener 3100 within the flow channel 204 and to prevent further advancement of the flow straightener 3100 therethrough. As shown, each of the outer vanes 3115 can extend substantially from the front end 3106 of the straightener body 3105 to the rear end 3208 of the straightener body 3105. The straightener vanes 3112 of the vane structure 3110 can be coupled to and extend radially inward from the outer vanes 3115 proximate to the rear end 3208 of the straightener body 3105. In example aspects, the honeycomb-like vane structure 3110 of the flow straightener 3100 can be substantially dome-shaped or cone-shaped. That is, the vane structure 3110 can taper radially inward in an axially forward or rearward direction (i.e., away from or towards the outlet end 154, shown in FIG. 1), generally from the outer vanes 3115 to a center 3210 of the vane structure 3110. For example, in the present, the flow straightener 3100 can taper forward towards the inlet end 152 and away from the outlet end 154. In other aspects, the flow straightener 3100 can taper rearward towards the outlet end 154 and away from the inlet end 152. Thus, a circumference or width of the flow structure 3110 can be less at the center 3210 thereof than the width of the vane structure 3110 at the outer vanes 3115. According to example aspects, the dome or cone-shape of the vane structure 3110 can limit the drop in pressure of the fluid as it flows across the vane structure 3110.

It should be noted that various components of the ultrasonic flow meter assembly 100 can be utilized in any other suitable flow meter, including existing flow meters. One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An ultrasonic flow meter assembly comprising:
a meter housing comprising an upper housing and a lower housing, the lower housing defining a first piezo mount, a second piezo mount, a first reflector mount and a second reflector mount;
a first piezoelectric transducer supported on the first piezo mount and a second piezoelectric transducer supported on the second piezo mount;
a first reflector mounted to the first reflector mount and defining a first reflective surface, the first reflective surface vertically aligned with the first piezoelectric transducer;
a second reflector mounted to the second reflector mount and defining a second reflective surface, the second reflective surface vertically aligned with the second piezoelectric transducer; and
a flow tube defining a flow channel, a first tube reflector opening allowing access to the flow channel, and a second tube reflector opening allowing access to the flow channel;
wherein the first and second reflectors are configured to reflect ultrasonic signals from the first piezoelectric transducer to the second piezoelectric transducer;
the meter housing is mounted to the flow tube;
the first reflector mount extends through the first tube reflector opening and the second reflector mount extends through the second tube reflector opening; and
each of the first reflector and the second reflector are oriented within the flow channel.

2. The ultrasonic flow meter assembly of claim 1, wherein:
the ultrasonic flow meter assembly further comprises a pair of piezo housings, each of the piezo housings defining an upper wall and a piezo indenture, a piezo post extending from the upper wall into the piezo indenture,
each first and second piezoelectric transducers are received in a corresponding one of the piezo indentures; and
each of the piezo posts contacts the corresponding first or second piezoelectric transducer.

3. The ultrasonic flow meter assembly of claim 2, further comprising a foam backing received between each upper wall and the corresponding first or second piezoelectric transducer and surrounding the corresponding piezo post.

4. The ultrasonic flow meter assembly of claim 2, wherein each of the first and second piezo mounts define a piezo mounting surface, each of the first and second piezoelectric transducers sandwiched between the corresponding piezo post and piezo mounting surface.

5. The ultrasonic flow meter assembly of claim 4, wherein:
each of the first and second piezoelectric transducers are retained in the corresponding piezo indenture by a retainer clip; and
each of the first and second piezo mounts defines a release indenture configured to bias the retainer clip away from and to disengage the retainer clip from the corresponding first or second piezoelectric transducer.

6. The ultrasonic flow meter assembly of claim 4, wherein each of the first and second piezo mounts defines a piezo alignment feature and each of the piezo housings defines a mating piezo alignment configured to engaging the piezo alignment feature to align the piezo housings relative to the corresponding first and second piezo mounts.

7. The ultrasonic flow meter assembly of claim 2, wherein:
each of the piezo housings comprises a housing body and a housing mount extending from the housing body, the housing body defining the piezo indenture; and
the lower housing defines a pair of housing fastener bosses, each of the housing fastener bosses aligned with a corresponding one of the housing mounts; and
a piezo fastener engages each aligned pair of the housing mounts and housing fastener bosses to couple the piezo housings to the lower housing.

8. The ultrasonic flow meter assembly of claim 7, wherein:
each of the housing mounts defines a housing arm extending from the housing body and a mounting boss coupled to the housing arm distal to the housing body;
a piezo fastener bore is defined through each of the mounting bosses and is configured to receive a corresponding one of the piezo fasteners therethrough; and
the housing arm is configured to flex relative to the housing body.

9. The ultrasonic flow meter assembly of claim 1, wherein:
each of the first and second reflector mounts defines a first mounting leg and a second mounting leg;
each of the first mounting legs and second mounting legs defines a free end and a reflector groove extending into corresponding first or second mounting leg at the free end thereof; and
each of the first and second reflectors defines a pair of reflector tabs, each of the reflector tabs extending into a corresponding one of the reflector grooves to couple the first and second reflectors to the corresponding first and second reflector mounts.

10. The ultrasonic flow meter assembly of claim 9, wherein each of the first and second reflector mounts defines a mount retaining feature, and each of the first and second reflectors defines a reflector retaining feature configured to engage a corresponding one of the mount retaining features to further secure the first and second reflectors to the corresponding first and second reflector mounts.

11. The ultrasonic flow meter assembly of claim 10, wherein the mount retaining feature is a detent formed within a corresponding one of the reflector grooves and extending into the corresponding first or second mounting leg, and wherein the reflector retaining feature is a tab projection extending from a corresponding one of the reflector tabs and into the detent.

12. The ultrasonic flow meter assembly of claim 1, wherein:
the flow tube defines pair of reflector support ledges within the flow channel and aligned with each of the first and second tube reflector openings;
the reflector support ledges are coplanar;
each of the first and second reflectors defines a pair of reflector ledges;
the pair of reflector ledges of the first reflector are each supported on a corresponding one of the reflector support ledges aligned with the first tube reflector opening; and
the pair of reflector ledges of the second reflector are each supported on a corresponding one of the reflector support ledges aligned with the second tube reflector opening.

13. The ultrasonic flow meter assembly of claim 1, wherein the flow tube defines a blind tube temperature sensor hole, a temperature sensor extending through a housing temperature sensor hole in the lower housing and into the blind tube temperature sensor hole, a packing disposed within a packing groove of the housing temperature sensor hole, the packing configured to seal with the temperature sensor to seal an interior of the meter housing off from the blind tube temperature sensor hole, and wherein the flow tube comprises a thermally conductive material that conducts heat well.

14. The ultrasonic flow meter assembly of claim 1, wherein:
the flow tube defines an inlet end and an outlet end;
a flow straightener is positioned within the flow tube proximate to the inlet end;
the flow straightener comprises a vane structure comprising a plurality of straightener vanes and a plurality of flow openings;
the vane structure tapers radially inward relative to the flow axis in one of a forward direction away from the outlet end and a rearward direction towards the outlet end.

15. The ultrasonic flow meter assembly of claim 14, wherein the flow straightener further comprises a straightener body, the vane structure extending radially inward from the straightener body and defining a honeycomb-like shape, the straightener body defining a front end and a rear end opposite the front end, the front end positioned proximate the inlet end and the rear end positioned between the front end and the outlet end.

16. The ultrasonic flow meter assembly of claim 15, wherein the flow tube defines a tube shoulder extending radially inward relative to the flow axis, and wherein the rear end of the straightener body abuts the tube shoulder.

17. The ultrasonic flow meter assembly of claim 15, wherein the flow straightener further comprises a plurality of outer vanes extending radially inward from the straightener body relative to the flow axis, and wherein the vane structure is coupled to the plurality of outer vanes.

18. The ultrasonic flow meter assembly of claim 1, wherein the flow tube further defines a pressure sensor channel, the pressure sensor channel is fluid communication with the flow channel, a pressure sensor extending through a pressure sensor hole in the lower housing and into the pressure sensor channel.

19. The ultrasonic flow meter assembly of claim 18, wherein:

a first packing is disposed within a first packing groove of the pressure sensor channel, the first packing configured to seal with a ferrule of the pressure sensor to seal an interior of the meter housing off from the flow channel; and
a second packing is disposed within a second packing groove of the pressure sensor hole, the second packing configured to seal with the ferrule of the pressure sensor to further seal the interior of the meter housing off from the flow channel.

20. The ultrasonic flow meter assembly of claim 18, further comprising a PCB and a PCB cover, wherein the pressure sensor is coupled to the PCB, and wherein the PCB cover engages the PCB to limit movement of the pressure sensor during pressure spikes.

21. The ultrasonic flow meter assembly of claim 1, further comprising a water supply valve assembled with the flow tube, the water supply valve comprising a valve body monolithically formed with the flow tube, the water supply valve configured to control a flow of fluid through the flow tube.

22. The ultrasonic flow meter assembly of claim 1, wherein the meter housing comprises a plastic material and the flow tube comprises a metal material.

23. The ultrasonic flow meter assembly of claim 1, wherein:
the lower housing defines a housing bottom wall and a lower sidewall, a plurality of attachment projections extending from the lower sidewall distal to the housing bottom wall, the attachment projections spaced about a periphery of the lower sidewall; and
the upper housing defines a housing top wall and an upper sidewall, a plurality of attachment recesses formed in the upper sidewall, the attachment recesses spaced about a periphery of the upper sidewall, each of the attachment projections engaging one of the attachment recesses to couple the upper housing to the lower housing.

24. The ultrasonic flow meter assembly of claim 23, wherein the upper housing defines an inner surface and an outer surface, a plurality of attachment channels extending through the upper sidewall from the inner surface to the outer surface, a lower portion of each of attachment channels defining one of the attachment recesses.

25. The ultrasonic flow meter assembly of claim 23, wherein the upper housing further defines a sealing groove extending about the periphery of the housing top wall, a housing seal received within the sealing groove and sealing with a top side of the lower sidewall distal to the housing bottom wall.

26. The ultrasonic flow meter assembly of claim 1, wherein:
the ultrasonic flow meter assembly further comprises a display panel and an IR reader; and
the upper housing comprises a window pane through which the display panel is visible and a lens pane through which light from the IR reader is visible.

27. A pressure sensor assembly comprising:
a printed circuit board defining a PCB body, a pressure sensor cut-out formed in the PCB body, the pressure sensor cut-out defining a pressure sensor support extending into the pressure sensor cut-out, the pressure sensor support defining a support island movable relative to the PCB body;
a pressure sensor coupled to the support island of the printed circuit board; and a PCB cover engaging the support island to limit movement of the pressure sensor during pressure spikes.

28. The pressure sensor assembly of claim 27, wherein the pressure sensor support further comprises a gooseneck arm defining a proximal arm end and a distal arm end, the gooseneck arm extending from the PCB body at the proximal arm end, the support island coupled to the gooseneck arm at the distal arm end.

29. The pressure sensor assembly of claim 28, wherein the support island defines a pressure sensor opening, and wherein the pressure sensor defines a sensing element and an attachment pad, the sensing element received through the pressure sensor opening and the attachment pad attached to the support island.

30. The pressure sensor assembly of claim 29, wherein the pressure sensor further defines a ferrule extending from the attachment pad opposite the sensing element, and wherein a fluid opening is formed through the attachment pad to allow fluid to flow from the ferrule to the sensing element.

31. The pressure sensor assembly of claim 29, wherein the PCB cover defines a backing area and a sensor clearance recess, the backing area confronting the support island, the sensing element received in the sensor clearance recess, a backing surface of the sensor clearance recess confronting the sensing element.

32. The pressure sensor assembly of claim 31, wherein:
the printed circuit board further defines a temperature sensor opening formed therethrough;
the PCB cover further defines a cover sensor opening formed therethrough and a sensor arm, the sensor arm defining a retaining projection; and
a temperature sensor extends through the temperature sensor opening and the cover sensor opening and is retained within the temperature sensor opening and the cover sensor opening by the retaining projection.

33. A method of measuring a flow rate of fluid through an ultrasonic flow meter assembly, the method comprising:
obtaining an ultrasonic flow meter assembly comprising a meter housing and a pressure sensor assembly disposed therein, the pressure sensor assembly comprising a printed circuit board defining a PCB body, a pressure sensor cut-out formed in the PCB body, the pressure sensor cut-out defining a pressure sensor support extending into the pressure sensor cut-out, the pressure sensor support defining a support island movable relative to the PCB body, and a pressure sensor coupled to the support island of the printed circuit board;
sending a first ultrasonic signal through a flow tube of the ultrasonic flow meter assembly from a first piezoelectric transducer to a second piezoelectric transducer, the first and second piezoelectric transducers disposed within the meter housing of the ultrasonic flow meter assembly;
determining a flow rate of fluid through a flow channel of the flow tube, which comprises measuring an amount of time that it takes the first ultrasonic signal to travel from the first piezoelectric transducer to the second piezoelectric transducer; and
sensing a pressure of the fluid with the pressure sensor, the pressure sensor extending through a hole formed through the meter housing and into a pressure sensor channel formed in the flow tube, the pressure sensor channel in fluid communication with the flow channel.

34. The method of claim 33, wherein:
sending the first ultrasonic signal through the flow tube comprises:
transmitting the first ultrasonic signal from the first piezoelectric transducer to a first reflector positioned within the flow channel of the flow tube;
reflecting the first ultrasonic signal off the first reflector towards a second reflector positioned within the flow channel; and
reflecting the first ultrasonic signal off the second reflector towards the second piezoelectric transducer;
the method further comprises sending a second ultrasonic signal through the flow tube from the first piezoelectric transducer to the second piezoelectric transducer, which comprises:
transmitting the second ultrasonic signal from the second piezoelectric transducer to the second reflector;
reflecting the second ultrasonic signal off the second reflector towards the first reflector; and
reflecting the second ultrasonic signal off the first reflector towards the first piezoelectric transducer; and
determining a flow rate of fluid through a flow channel of the flow tube further comprises:
measuring an amount of time that it takes the second ultrasonic signal to travel from the second piezoelectric transducer to the first piezoelectric transducer; and
comparing the amount of time that it takes the first ultrasonic signal to travel from the first piezoelectric transducer to the second piezoelectric transducer to the amount of time that it takes the second ultrasonic signal to travel from the second piezoelectric transducer to the first piezoelectric transducer.

35. The method of claim 34, further comprising sending a first voltage signal to the first piezoelectric transducer to excite the first piezoelectric transducer and generate the first ultrasonic signal and sending a second voltage signal to the second piezoelectric transducer to excite the second piezoelectric transducer and generate the second ultrasonic signal.

36. The method of claim 33, further comprising sensing a temperature of the fluid with a temperature sensor, the temperature sensor extending through a through-hole formed through the meter housing and into a blind hole formed in the flow tube.

37. The method of claim 33, further comprising remotely operating a fluid supply valve to control the flow of the fluid through the flow channel.

38. The method of claim 37, wherein a valve body of the fluid supply valve is monolithically formed with the flow tube.

39. The method of claim 33, further comprising conditioning the flow of the fluid into the flow channel, which comprises passing the fluid across a flow structure of a flow straightener, the flow structure comprising a plurality of straightener vanes and flow openings, the flow structure defining a honeycomb-like shape.

40. A method of manufacturing an ultrasonic flow meter assembly comprising:
manufacturing a meter housing from a first material and a flow tube from a second material different from the first material, the meter housing comprising a pair of piezo mounts and a pair of reflector mounts, the flow tube defining a flow channel and a pair of openings allowing access to the flow channel;
positioning a pair of piezoelectric transducers on each of the piezo mounts;
receiving each of the reflector mounts through one of the tube openings; and sandwiching a pair of reflectors between each of the reflector mounts and a pair of support ledges of the flow tube, each of the support ledges disposed within the flow channel.

41. The method of claim 40, wherein positioning the pair of piezoelectric transducers on each of the piezo mounts comprises:
- retaining each of the piezoelectric transducers within a piezo indenture of a piezo housing;
- receiving each of the piezo indentures within one of the piezo mounts; and
- fastening each of the piezo housings to the meter housing.

42. The method of claim 41, wherein each of the piezoelectric transducers is retained within the corresponding the piezo indenture by a retaining clip, and wherein fastening each of the piezo housings to the meter housing comprises:
- biasing the retainer clip away from the piezoelectric transducer with a ramped surface of the piezo mount; and
- sandwiching the piezoelectric transducer between a piezo post of the piezo housing and a piezo mounting surface of the piezo mount.

43. The method of claim 40, further comprising installing a PCB and a PCB cover with the meter housing, which comprises confronting the PCB with a backing area of the PCB cover to limit movement of the PCB.

44. The method of claim 43, wherein:
- the PCB defines a PCB body, a pressure sensor cut-out formed in the PCB body, and a pressure sensor support extending into the pressure sensor cut-out, the pressure sensor support defining a support island;
- a pressure sensor is coupled to the support island; and
- the PCB backing area engages the support island to limit movement of the pressure sensor during pressure spikes.

* * * * *